(12) United States Patent
Zhou et al.

(10) Patent No.: US 11,019,257 B2
(45) Date of Patent: May 25, 2021

(54) 360 DEGREE VIDEO CAPTURE AND PLAYBACK

(71) Applicant: Avago Technologies General IP (Singapore) Pte. Ltd., Singapore (SG)

(72) Inventors: Minhua Zhou, San Diego, CA (US); Xuemin Chen, Rancho Santa Fe, CA (US); Brian A. Heng, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 638 days.

(21) Appl. No.: 15/599,447

(22) Filed: May 18, 2017

(65) Prior Publication Data

US 2017/0336705 A1    Nov. 23, 2017

Related U.S. Application Data

(60) Provisional application No. 62/339,040, filed on May 19, 2016, provisional application No. 62/408,652, (Continued)

(51) Int. Cl.
*G06T 9/00* (2006.01)
*G01S 3/00* (2006.01)
(Continued)

(52) U.S. Cl.
CPC ........... *H04N 5/23238* (2013.01); *G01S 3/00* (2013.01); *G06T 3/0062* (2013.01);
(Continued)

(58) Field of Classification Search
CPC ..... H04N 5/23238; G01S 3/00; G06T 3/0062; G06T 3/4038; G06T 9/00; G06T 15/10
(Continued)

(56) References Cited

U.S. PATENT DOCUMENTS

2002/0074669 A1   6/2002   Watanabe et al.
2004/0247173 A1   12/2004  Nielsen et al.
(Continued)

FOREIGN PATENT DOCUMENTS

CN    1922544       2/2007
CN    103096008     5/2013
(Continued)

OTHER PUBLICATIONS

European Office Action from European Patent Application No. 12006331.8, dated Nov. 19, 2018, 6 pages.

*Primary Examiner* — Jae N Noh
(74) *Attorney, Agent, or Firm* — Morgan, Lewis & Bockius LLP

(57) ABSTRACT

In a system for 360 degree video capture and playback, 360 degree video may be captured, stitched, encoded, decoded, rendered, and played-back. In one or more implementations, a stitching device may be configured to stitch the 360 degree video using an intermediate coordinate system between an input picture coordinate system and a capture coordinate system. In one or more implementations, the stitching device may be configured to stitch the 360 degree video into at least two different projection formats using a projection format decision, and an encoding device may be configured to encode the stitched 360 degree video with signaling that indicates the at least two different projection formats. In one or more implementations, the stitching device may be configured to stitch the 360 degree video with multiple viewing angles, and a rendering device may be configured to render the decoded bitstream using one or more suggested viewing angles.

12 Claims, 39 Drawing Sheets

Related U.S. Application Data filed on Oct. 14, 2016, provisional application No. 62/418,066, filed on Nov. 4, 2016.

(51) Int. Cl.
*H04N 5/232* (2006.01)
*G06T 15/10* (2011.01)
*G06T 3/40* (2006.01)
*G06T 3/00* (2006.01)

(52) U.S. Cl.
CPC .............. *G06T 3/4038* (2013.01); *G06T 9/00* (2013.01); *G06T 15/10* (2013.01)

(58) Field of Classification Search
USPC .......................................................... 348/43
See application file for complete search history.

(56) References Cited

U.S. PATENT DOCUMENTS

| | | |
|---|---|---|
| 2004/0263636 A1 | 12/2004 | Cutler |
| 2005/0185047 A1 | 8/2005 | Hii |
| 2009/0324010 A1 | 12/2009 | Hou |
| 2010/0001997 A1 | 1/2010 | Kajikawa |
| 2010/0157016 A1 | 6/2010 | Sylvain |
| 2010/0270667 A1 | 10/2010 | Tong et al. |
| 2011/0069146 A1 | 3/2011 | Tsaur et al. |
| 2012/0307004 A1* | 12/2012 | Budagavi ................ G06T 15/50 348/42 |
| 2013/0089301 A1 | 4/2013 | Chen et al. |
| 2013/0202265 A1 | 8/2013 | Arrasvuori et al. |
| 2016/0352791 A1 | 12/2016 | Adams |
| 2016/0353089 A1 | 12/2016 | Gallup |
| 2016/0353090 A1 | 12/2016 | Esteban |
| 2017/0220879 A1 | 8/2017 | Akiyama et al. |
| 2017/0251208 A1 | 8/2017 | Adsumilli |
| 2017/0287200 A1 | 10/2017 | Forutanpour |
| 2017/0301065 A1 | 10/2017 | Adsumilli |
| 2017/0323423 A1 | 11/2017 | Lin |
| 2017/0332107 A1 | 11/2017 | Abbas |
| 2018/0027186 A1 | 1/2018 | Jung |
| 2018/0053280 A1 | 2/2018 | Kim |
| 2018/0174314 A1* | 6/2018 | Bippus ................. G06T 11/006 |
| 2019/0068879 A1 | 2/2019 | Bao |

FOREIGN PATENT DOCUMENTS

| | | |
|---|---|---|
| CN | 106023070 | 10/2016 |
| EP | 2490179 | 8/2012 |
| JP | 2016-031576 | 3/2016 |

* cited by examiner

360 DEGREE VIDEO CAPTURE AND PLAYBACK

CROSS-REFERENCE TO RELATED APPLICATIONS

The present application claims the benefit of priority under 35 U.S.C. § 119 from U.S. Provisional Patent Application Ser. No. 62/339,040 entitled "360 DEGREE VIDEO CAPTURE AND PLAYBACK," filed on May 19, 2016; U.S. Provisional Patent Application Ser. No. 62/408,652 entitled "VIDEO CODING WITH ADAPTIVE PROJECTION FORMAT," filed on Oct. 14, 2016; and U.S. Provisional Patent Application Ser. No. 62/418,066 entitled "SUGGESTED VIEWS WITHIN 360 DEGREE VIDEO," filed on Nov. 4, 2016, the disclosures of which are hereby incorporated by reference in their entirety for all purposes.

TECHNICAL FIELD

The present disclosure relates to video capture and playback, and more particularly to 360 degree video capture, processing, and playback.

BACKGROUND 360 degree video, also known as 360 degree videos, immersive videos, and/or spherical videos, are video recordings of a real-world panorama, where the view in every direction is recorded at the same time, shot using an omni-directional camera or a collection of cameras. During playback, the viewer has control of field of view (FOV) angles and viewing directions (a form of virtual reality).

BRIEF DESCRIPTION OF THE DRAWINGS

Certain features of the subject technology are set forth in the appended claims. However, for purpose of explanation, one or more implementations of the subject technology are set forth in the following figures.

Figure 1:
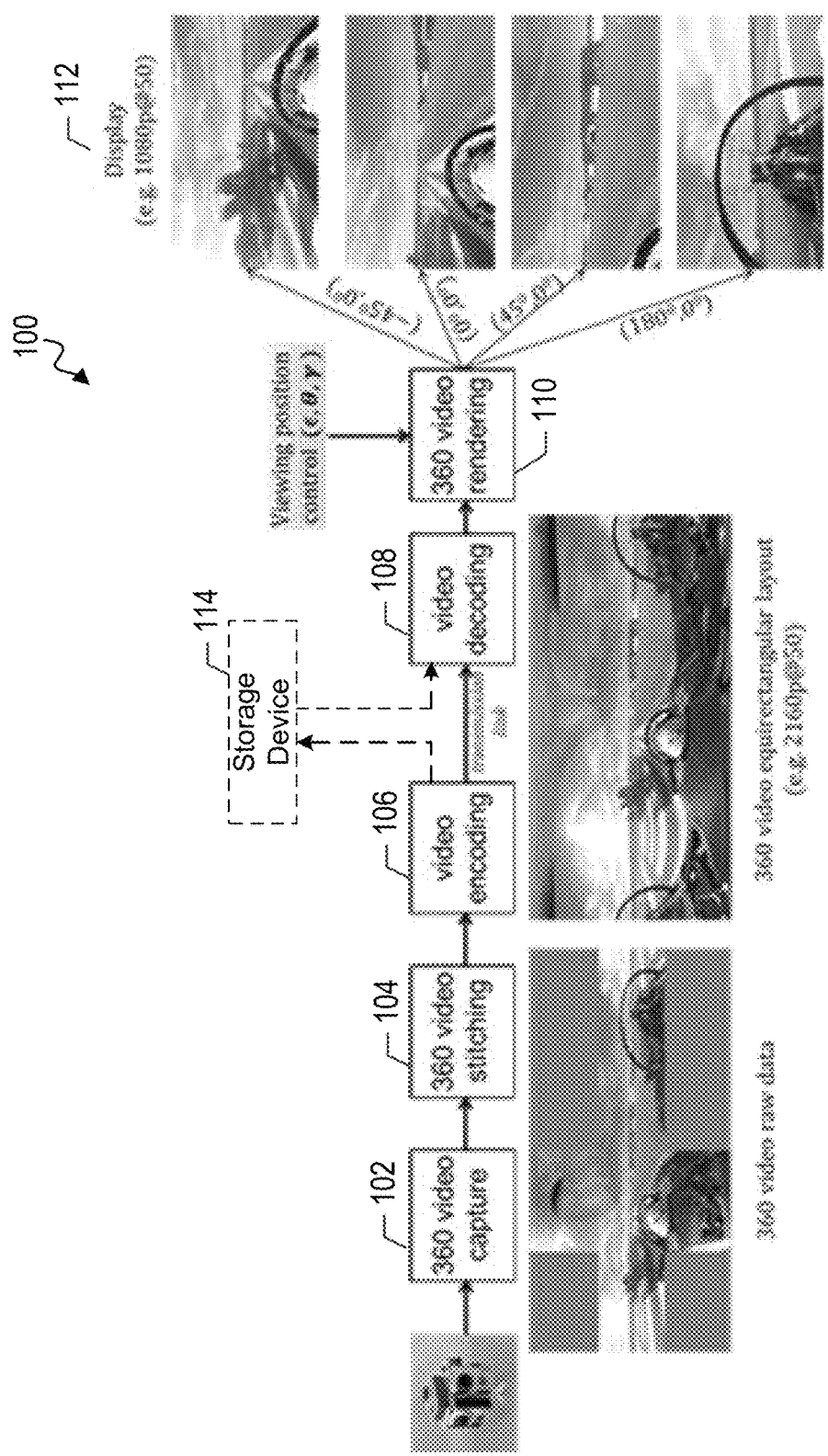
FIG. 1 illustrates an example network environment in which 360 degree video capture and playback may be implemented in accordance with one or more implementations.

The accompanying appendix, which is included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In a system for 360 degree video capture and playback, 360 degree video may be captured, stitched, encoded, stored or transmitted, decoded, rendered, and played-back. In one or more implementations, a stitching device may be configured to stitch the 360 degree video using an intermediate coordinate system between an input picture coordinate system and a capture coordinate system. In one or more implementations, the stitching device may be configured to stitch the 360 degree video into at least two different projection formats using a projection format decision, and an encoding device may be configured to encode the stitched 360 degree video with signaling that indicates the at least two different projection formats. In one or more implementations, the stitching device may be configured to stitch the 360 degree video with multiple viewing angles, and a rendering device may be configured to render the decoded bitstream using one or more suggested viewing angles.

In the subject system, a system message of default (recommended) viewing direction angles, FOV angles, and/or rendering picture size may be signaled along with the 360 degree video content. A 360 degree video playback device (not shown) may keep the rendering picture size as is, but purposely reduce the active rendering area to reduce the rendering complexity and memory bandwidth requirements. The 360 degree video playback device may store the 360 degree video rendering settings (e.g. FOV angles, viewing direction angles, rendering picture size, etc.) right before the playback is terminated or switched to other program channel, so that the stored rendering settings can be used when the playback of the same channel is resumed. The 360 degree video playback device may provide a preview mode in which the viewing angles may change automatically every N frames to help viewers to select the desirable viewing direction. The 360 degree video capture and playback device may compute the projection map on-the-fly (e.g. block by block) for saving memory bandwidth. In this instance, the projection map may not be loaded from the off-chip memory. In the subject system, different view fidelity information may be assigned to different views.

FIG. 1 illustrates an example network environment 100 in which 360 degree video capture and playback can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a 360 degree video capture device 102, a 360 degree video stitching device 104, a video encoding device 106, a transmission link or storage media, a video decoding device 108, and a 360 degree video rendering device 110. In one or more implementations, one or more of the devices 102, 104, 106, 108, 110 may be combined into the same physical device. For example, the 360 degree video capture device 102, the 360 degree video stitching device 104, and the video encoding device 106 may be combined into a single device, and the video decoding device 108 and the 360 degree video rendering device 110 may be combined into a single device. In some aspects, the network environment 100 may include a storage device 114 that stores the encoded 360 degree video (such as on DVDs, Bluray, Digital Video Recording at the cloud or gateway/set-top box, etc.) and then played back on a display device (e.g., 112).

The network environment 100 may further include a 360 degree video projection format conversion device (not shown) that may perform 360 degree video projection format conversion before the video encoding by the video encoding device 106 and/or after the video decoding by the video decoding device 108. The network environment 100 may also include a 360 degree video projection format conversion device (not shown) that is inserted between video decoding device 108 and 360 video rendering device 110. In one or more implementations, the video encoding device 106 may be communicatively coupled to the video decoding device 108 via a transmission link, such as over a network.

In the subject system, the 360 degree video stitching device 104 may utilize an additional coordinate system that provides more freedom on the 360 degree video capture side when projecting captured 360 degree video to a 2D input picture coordinate system for storage or transmission. The 360 degree video stitching device 104 may also support multiple projection formats for 360 degree video storage, compression, transmission, decoding, rendering, etc. For example, the video stitching device 104 may remove overlapped areas captured by a camera rig, and output e.g. six view sequences that each covers a 90°×90° viewport. The 360 degree video projection format conversion device (not shown) may convert an input 360 degree video projection format (e.g. cube projection format) to an output 360 degree video projection format (e.g. the equirectangular format).

The video encoding device 106 may minimize spatial discontinuities (i.e. the number of face boundaries) in the composed picture, for better spatial prediction thus better compression efficiency in the video compression. For cube projection for example, a preferable layout should have the minimized number of face boundaries, e.g. 4, within a composed 360 degree video picture. The video encoding device 106 may implement unrestricted motion compensation (UMC) for better compression efficiency.

In the subject system, the 360 degree video rendering device 110 may derive a chroma projection map from a luma prediction map. The 360 degree video rendering device 110 may also chose the rendering picture size to maximize the display video quality. The 360 degree video rendering device 110 may also jointly select the horizontal FOV angle α and the vertical FOV angle β to minimize the rendering distortion. The 360 degree video rendering device 110 may also control the FOV angles to realize real-time 360 degree video rendering subject to available memory bandwidth budget.

In FIG. 1, the 360 degree video is captured by a camera rig, and stitched together into the equirectangular format. The video is then compressed into any suitable video compression format (e.g. MPEG/ITU-T AVC/H.264, HEVC/H.265, VP9 etc.) and transmitted via transmission link (e.g. cable, satellite, terrestrial, internet streaming, etc.). On the receiver side, the video is decoded (e.g., 108) and stored in the equirectangular format, then is rendered (e.g., 110) according to the viewing direction angles and field of view (FOV) angles, and displayed (e.g., 112). In the subject system, the end-users have control of FOV angles and viewing direction angles in order to view the video at desired viewing angles.

Coordinate Systems

There are multiple coordinate systems that apply to the subject technology, including, but not limited to:

(x, y, z)—3D 360 degree video capture (camera) coordinate system (x', y', z')—3D 360 degree video viewing coordinate system $(x_p, y_p)$—2D normalized projection coordinate system, with $x_p \in [0.0: 1.0]$ and $y_p \in [0.0: 1.0]$.

$(X_p, Y_p)$—2D input picture coordinate system, with $X_p \in [0: \text{inputPicWidth}-1]$ and $Y_p \in [0: \text{inputPicHeight}-1]$, where inputPicWidth×inputPicHeight is input picture size of a color component (e.g. Y, U or V).

$(x_c, y_c)$—2D normalized rendering coordinate system, with $x_c \in [0.0: 1.0]$ and $y_c \in [0.0: 1.0]$.

$(X_c, Y_c)$—2D output rendering picture coordinate system, with $X_c \in [0: \text{renderingPicWidth}-1]$ and $Y_c \in [0: \text{renderingPicHeight}-1]$, where picWidth×picHeight is the output rendering picture size of a color component (e.g. Y, U or V).

$(x_r, y_r, z_r)$—3D 360 degree video projection coordinate system

Figure 2:
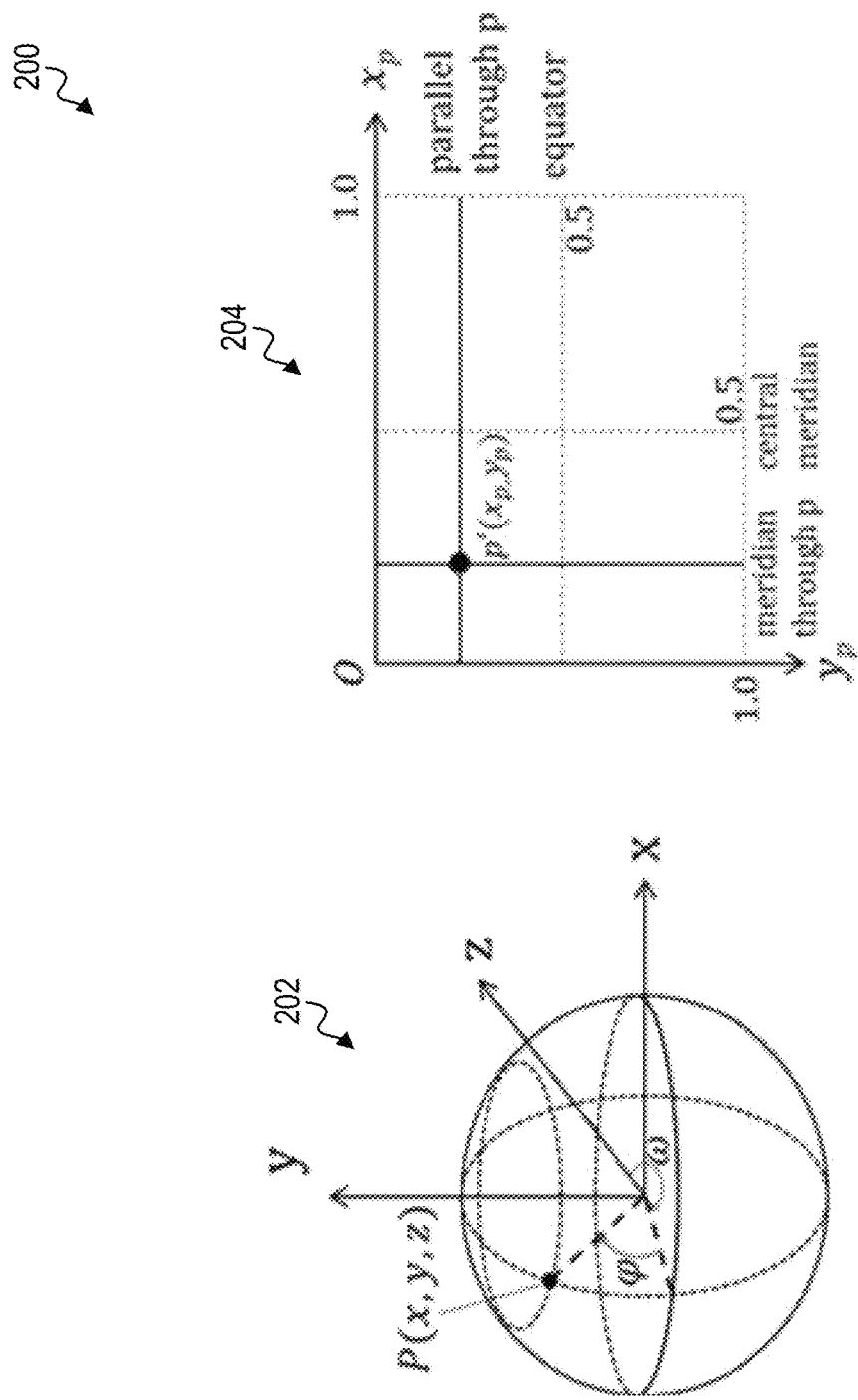
FIG. 2 conceptually illustrates an example of an equirectangular projection format.

FIG. 2 conceptually illustrates an example of an equirectangular projection format 200. The equirectangular projection format 200 represents a standard way of texture mapping a sphere in computer graphics. It is also known as equidistant cylindrical projection, geographic projection, plate cane or carte parallelogrammatique. As shown in FIG. 2, to project a sphere surface point p(x,y, z) (e.g., 202) to a sample p'($x_p$, $y_p$) in the normalized projection coordinate system (e.g., 204), both longitude ω and latitude φ are computed for p(x, y, z) according to $$\begin{cases} \omega = \arctan2(x, z) \\ \varphi = \arcsin\left(\frac{y}{\sqrt{x^2 + y^2 + z^2}}\right) \end{cases} \qquad \text{Equation 1}$$

where $\omega \in [-\pi:\pi]$ and $$\varphi \in [-\frac{\pi}{2}:\frac{\pi}{2}].$$

π is the ratio of a circle's circumference to its diameter, commonly approximated as 3.1415926.

The equirectangular projection format 200 may be defined as in Equation 2:

$$\begin{cases} x_p = \frac{\omega}{2\pi} + 0.5 \\ y_p = -\frac{\varphi}{\pi} + 0.5 \end{cases} \qquad \text{Equation 2}$$

where $x_p \in [0.0: 1.0]$ and $y_p \in [0.0: 1.0]$. ($x_p$, $y_p$) is the coordinate in the normalized projection coordinate system.

Figure 3:
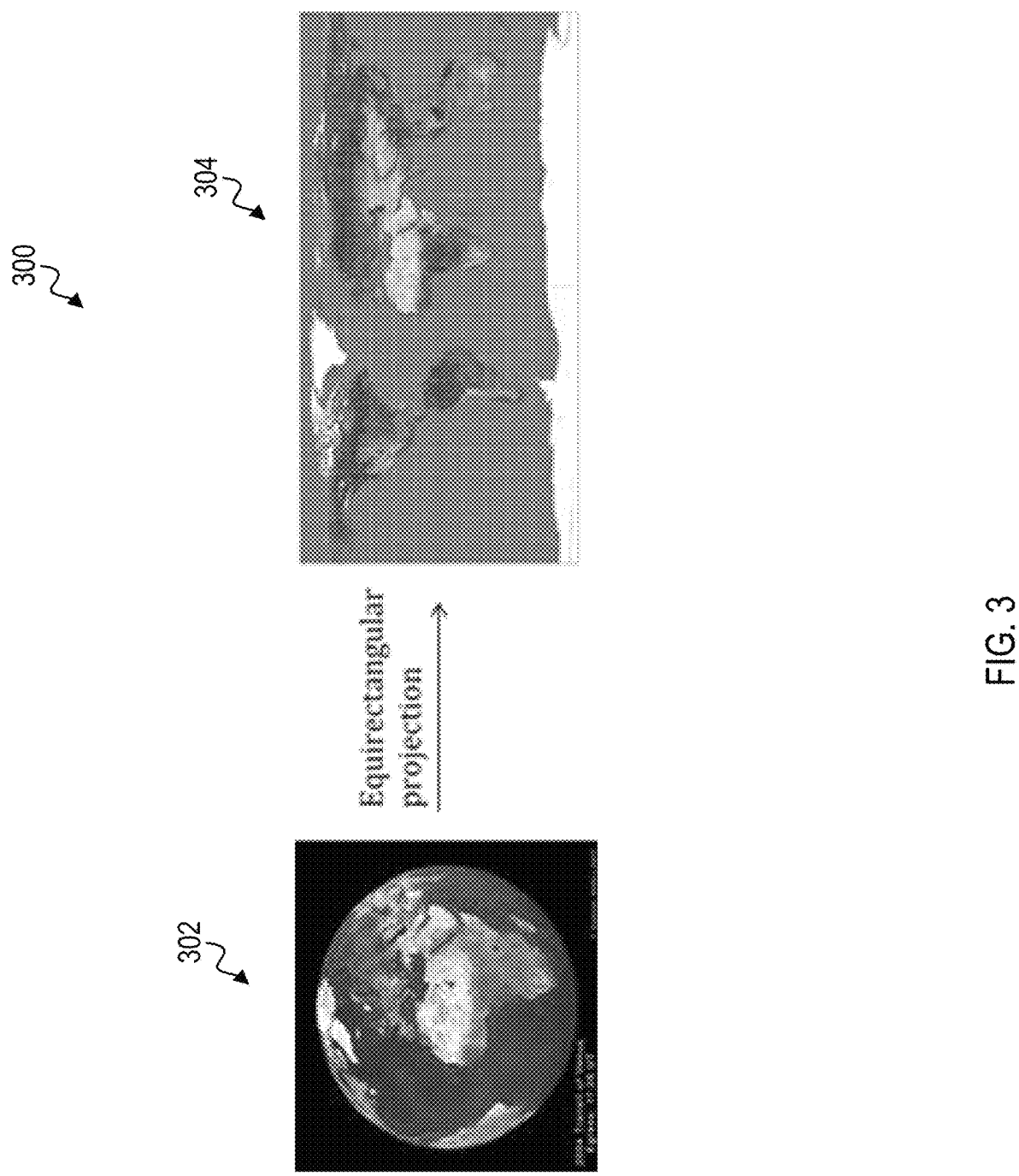
FIG. 3 conceptually illustrates an example of an equirectangular projection with Earth map.

FIG. 3 conceptually illustrates an example of an equirectangular projection layout 300 with Earth map. In the equirectangular projection layout 300, the picture has 1:1 mapping along the equator only, and is stretched elsewhere. The largest mapping distortion occurs at north and South Pole of a sphere (e.g., 302), where a single point is mapped to line of samples on the equirectangular projection picture (e.g., 304), resulting in lots of redundant data in the composed 360 degree video using the equirectangular projection layout 300.

Figure 4:
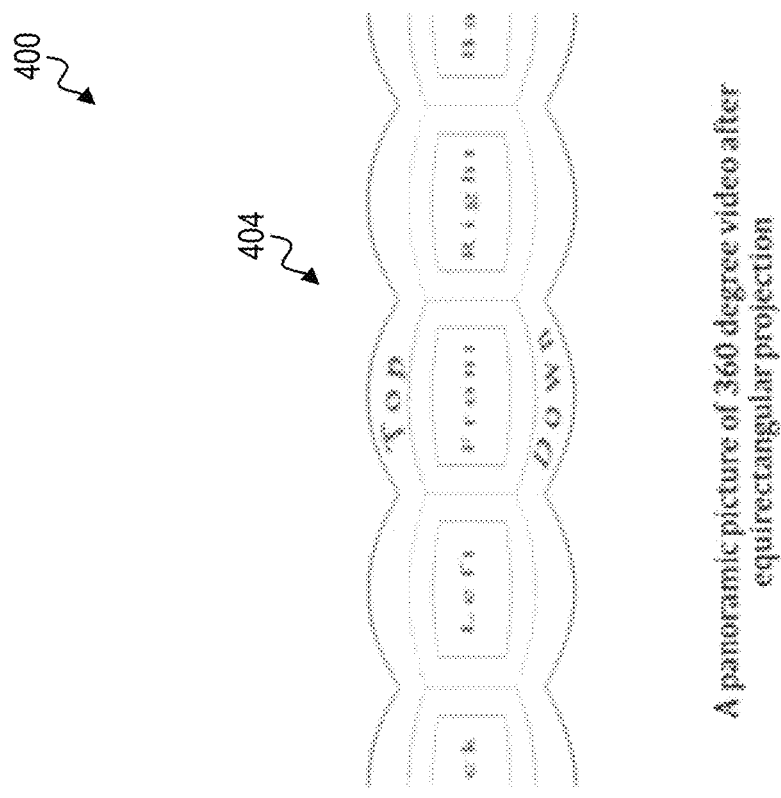
FIG. 4 conceptually illustrates an example of 360 degree video with equirectangular projection.
Figure 4:
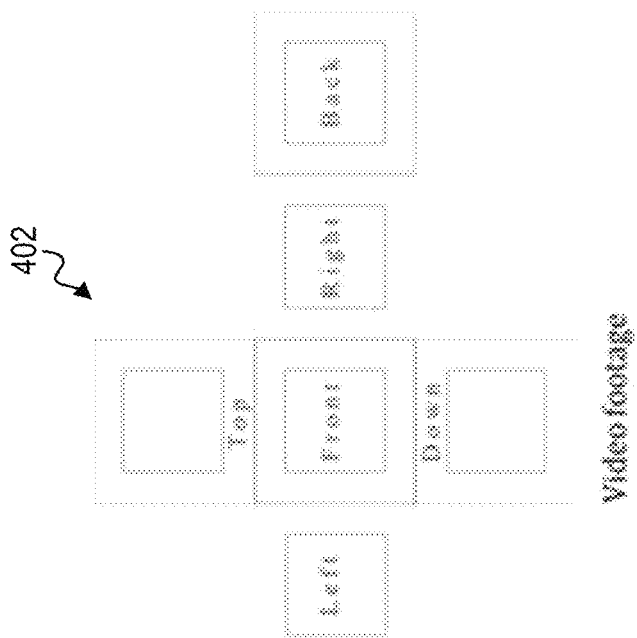
Figure 5:
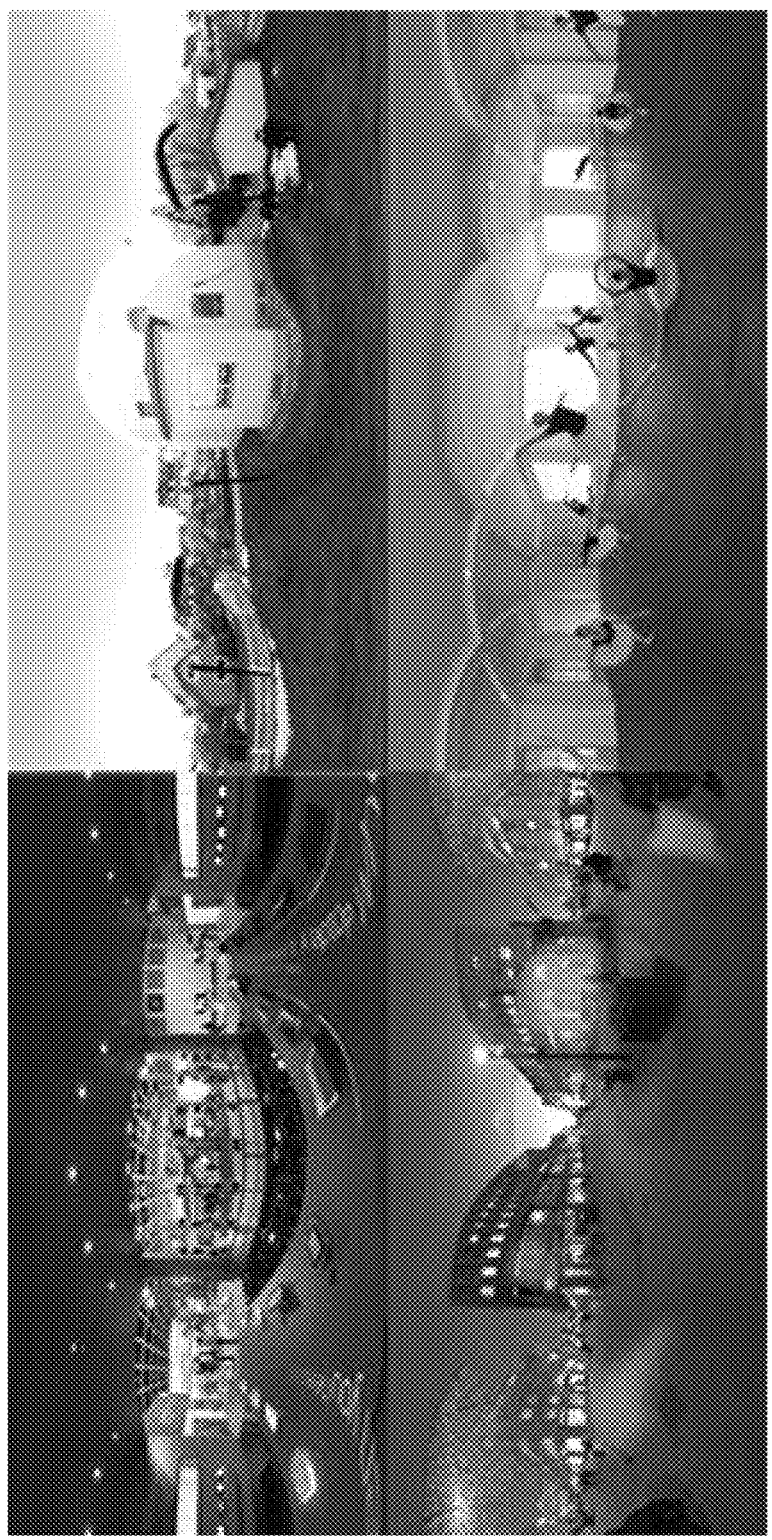
FIG. 5 conceptually illustrates examples of 360 degree images in equirectangular projection layout.

FIG. 4 conceptually illustrates an example of 360 degree video with equirectangular projection layout 400. To leverage the existing infrastructure for video delivery in which single layer video codec is employed, the 360 degree video footages (e.g., 402) captured by multiple cameras at different angles are normally stitched and composed into a single video sequence stored in the equirectangular projection layout. As shown in FIG. 4, in the equirectangular projection layout 400, the left, front and right video footage of the 360 degree video is projected in the middle of the picture, the back video footage is split evenly and placed in the left and right sides of the picture; the top and down video footage is placed on the top and bottom part of the picture, respectively (e.g., 404). All the video footage is stretched, with the top and down video footage being stretched the most. FIG. 5 conceptually illustrates examples of 360 degree video images in equirectangular projection layout.

Cube Projection

Figure 6:
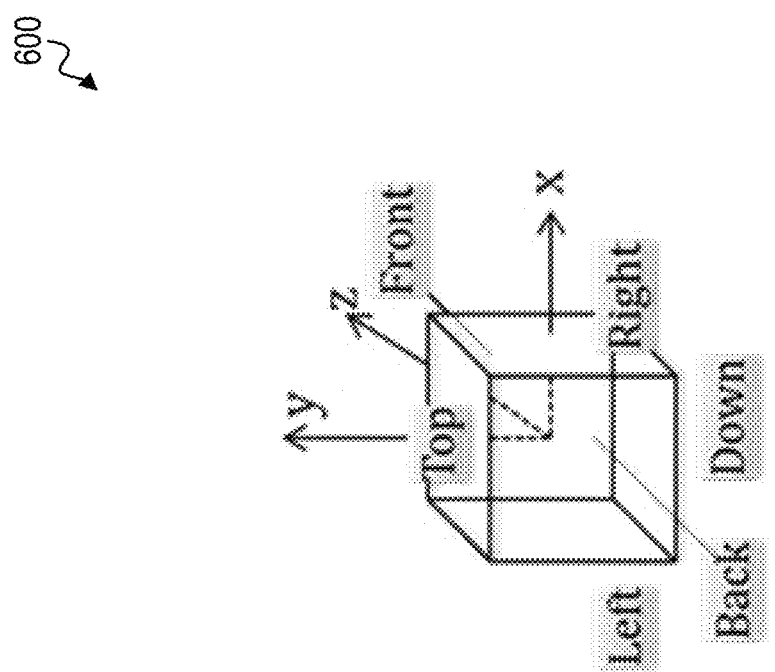
FIG. 6 conceptually illustrates an example definition of a six-faced cube.

FIG. 6 conceptually illustrates an example definition of a six-faced cube 600. Another common projection format to store the 360 degree view is to project video footage to cube faces. As shown in FIG. 6 the six faces of a cube are named as Front, Back, Left, Right, Top and Down.

Figure 7:
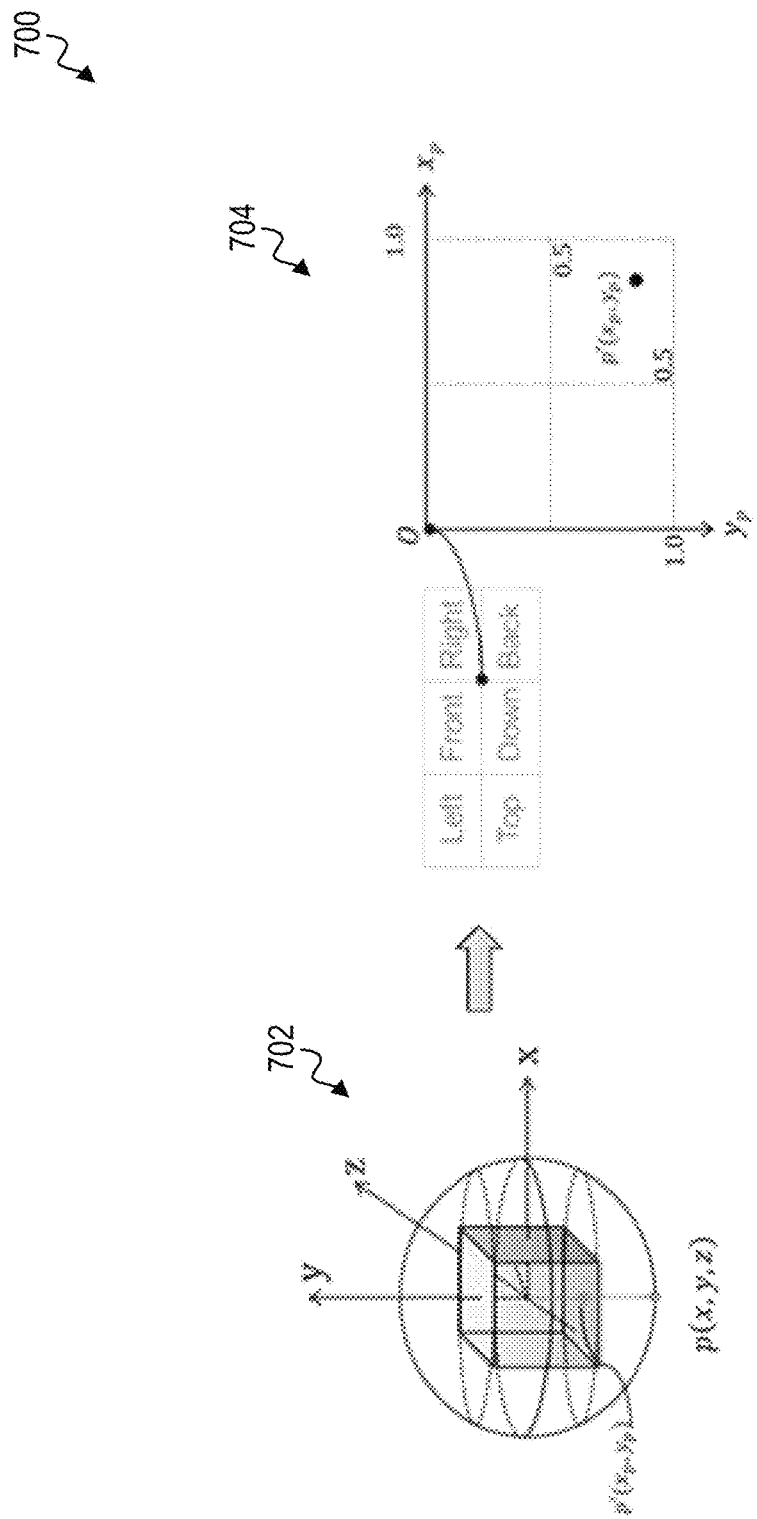
FIG. 7 conceptually illustrates an example of a cube projection format.

FIG. 7 conceptually illustrates an example of a cube projection format 700. In FIG. 7, the cube projection format 700 includes mapping a sphere surface point p(x, y, z) to one of six cube faces (e.g., 702), in which both the cube face id and coordinate ($x_p$, $y_p$) in the normalized cube projection coordinate system are computed (e.g., 704).

Figure 8:
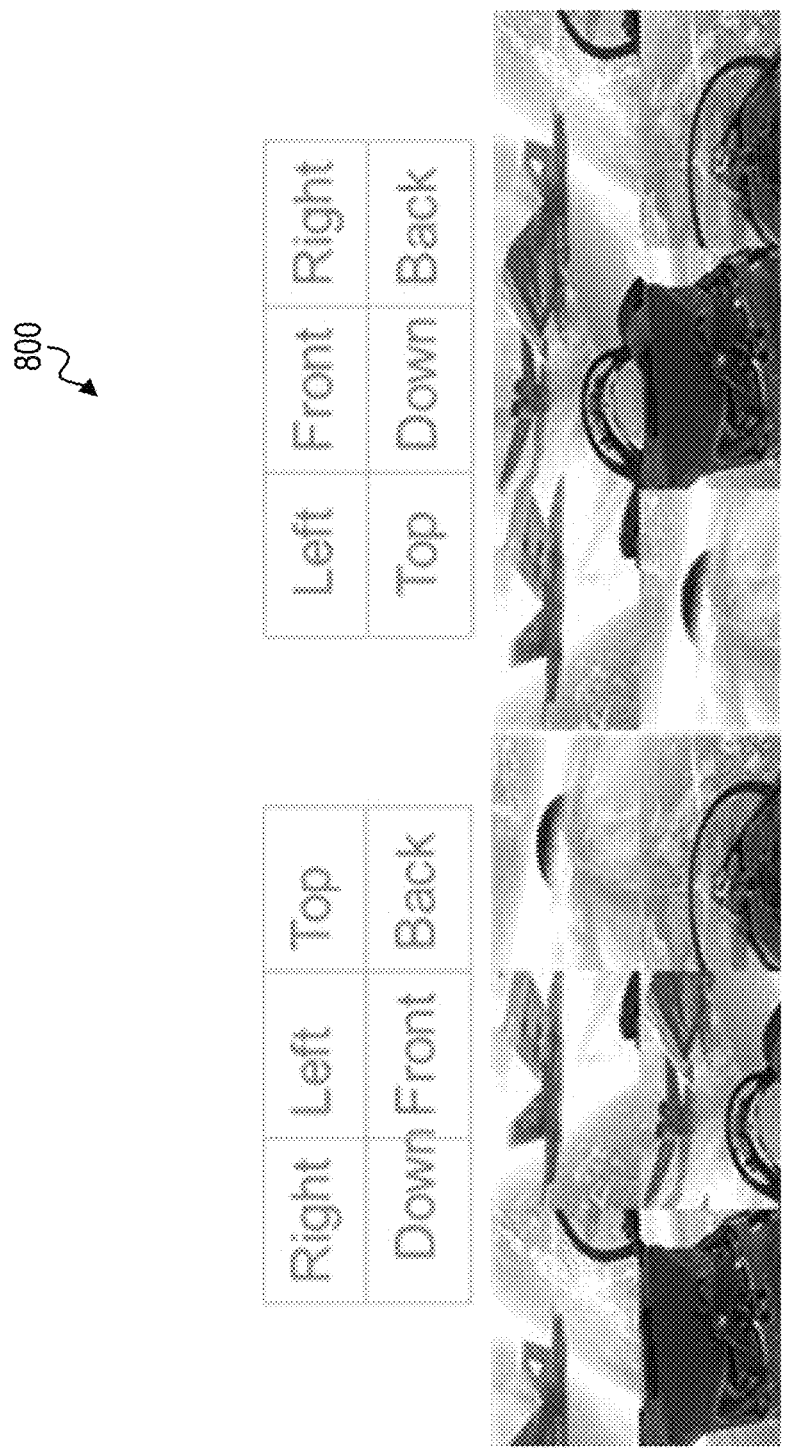
FIG. 8 conceptually illustrates examples of 360 degree images in cube projection layout.

FIG. 8 conceptually illustrates examples of 360 degree video images in the cube projection layout 800. The projection rule of the cube projection is described in Table 1, where pseudo code for mapping a sphere surface point p(x, y, z) to a cube face is provided.

TABLE 1

Pseudo-code for Cube Projection Mapping if(z > 0&&(−z ≤ y ≤ z)&&(−z ≤ x ≤ z))

$$\left\{ \text{faceID} = \text{Front}; x_p = \frac{z+x}{2z}; y_p = \frac{z-y}{2z} \right\}$$

else if(z < 0&&(z ≤ y ≤ −z)&&(z ≤ x ≤ −z))

$$\left\{ \text{faceID} = \text{Back}; x_p = \frac{z+x}{2z}; y_p = \frac{z+y}{2z} \right\}$$

else if(x > 0&&(−x ≤ y ≤ x)&&(−x ≤ z ≤ x))

$$\left\{ \text{faceID} = \text{Right}; x_p = \frac{x-z}{2x}; y_p = \frac{x-y}{2x} \right\}$$

else if(x < 0&&(x ≤ y ≤ −x)&&(x ≤ z ≤ −x))

$$\left\{ \text{faceID} = \text{Left}; x_p = \frac{x-z}{2x}; y_p = \frac{x+y}{2x} \right\}$$

else if(y > 0&&(−y ≤ x ≤ y)&&(−y ≤ z ≤ y))

$$\left\{ \text{faceID} = \text{Top}; x_p = \frac{y+x}{2y}; y_p = \frac{y+z}{2y} \right\}$$

else if(y < 0&&(y ≤ x ≤ −y)&&(y ≤ z ≤ −y))

$$\left\{ \text{faceID} = \text{Down}; x_p = \frac{y-x}{2y}; y_p = \frac{y+z}{2y} \right\}$$

Field of View (FOV) and Viewing Direction Angles

For display of 360 degree video, a portion of each 360 degree video picture needs to be projected and rendered. The field of view (FOV) angles define how big portion of a 360 degree video picture is displayed, while the viewing direction angles defines which portion of the 360 degree video picture is shown.

For displaying a 360 degree video, just imagine that the video is mapped on a unity sphere surface, a viewer sitting at the center point of the sphere is able to view a rectangular screen, and the screen has its four corners located on the sphere surface. Here (x', y', z') is called the 360 view viewing coordinate system and ($x_c$, $y_c$) is referred as the normalized rendering coordinate system.

Figure 9:
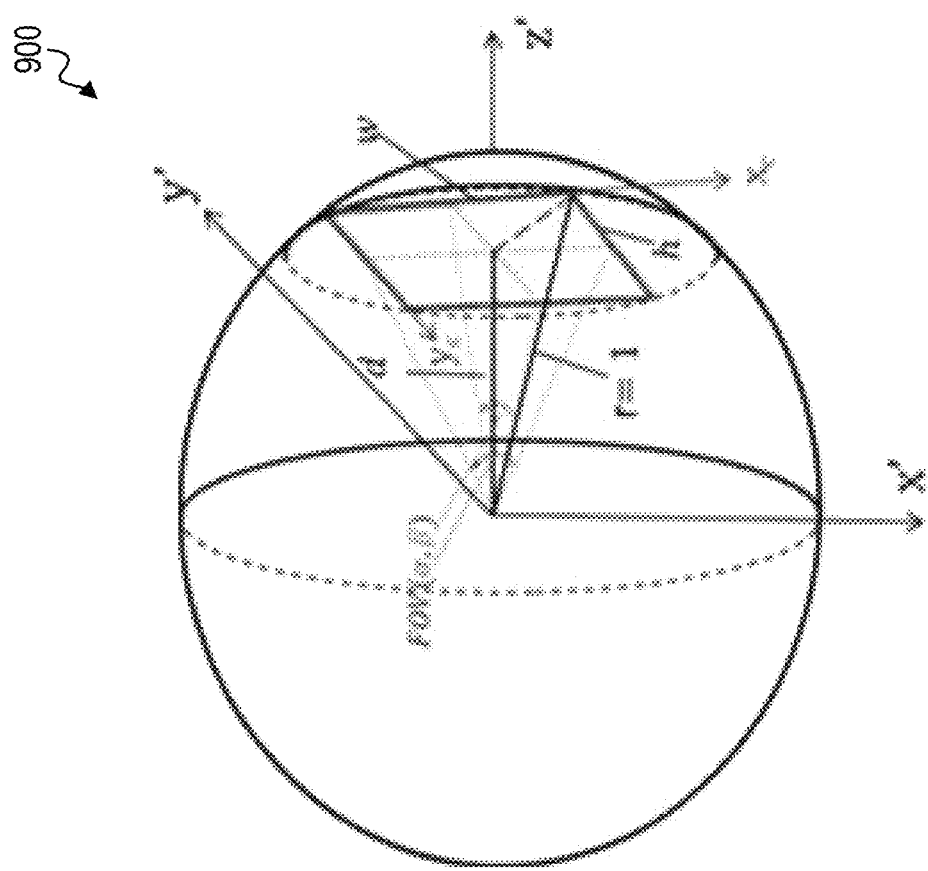
FIG. 9 conceptually illustrates an example of a normalized projection plane size determined by field-of-view angles.

FIG. 9 conceptually illustrates an example of a normalized projection plane size 900 determined by field-of-view angles. As shown in FIG. 9, in the viewing coordinate system (x', y', z'), the center point of the projection plane (i.e. the rectangular screen) is located on z' axis and is parallel to x'y' plane. Therefore, the projection plane size w×h and its distance to the center of the sphere d can be computed by:

$$\begin{cases} w = \dfrac{2ta}{\sqrt{ta^2 + tb^2 + 1}} \\ h = \dfrac{2tb}{\sqrt{ta^2 + tb^2 + 1}} \\ d = \dfrac{1}{\sqrt{ta^2 + tb^2 + 1}} \end{cases} \quad \text{Equation 3}$$

where $$ta = \tan\left(\frac{\alpha}{2}\right) \text{ and } tb = \tan\left(\frac{\beta}{2}\right)$$

and $\alpha \in (0: \pi]$ is the horizontal FOV angle and $\beta \in (0: \pi]$ is the vertical FOV angle.

Figure 10:
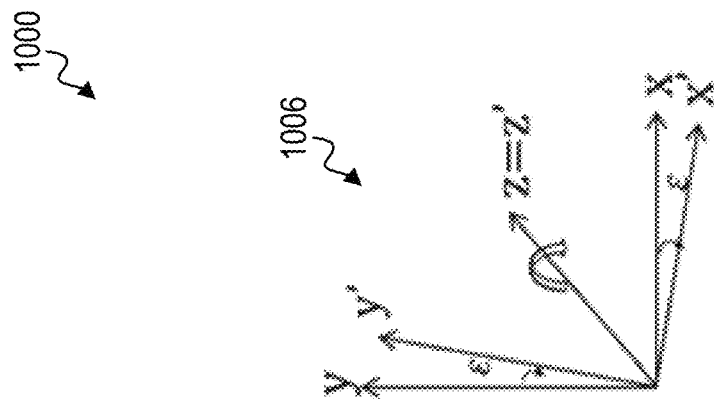
FIG. 10 conceptually illustrates an example of viewing direction angles.
Figure 10:
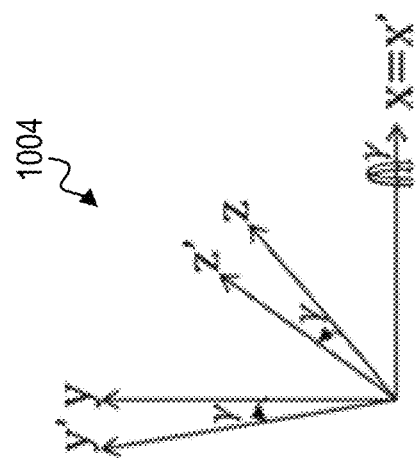
Figure 10:
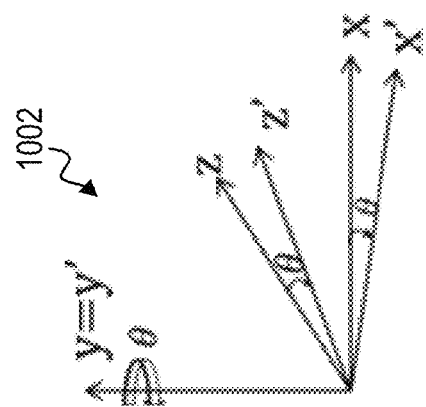

FIG. 10 conceptually illustrates an example of viewing direction angles 1000. The viewing direction is defined by rotation angles of the 3D viewing coordinate system (x', y', z') relative to the 3D capture coordinate system (x,y,z). As shown in FIG. 10, the viewing direction is dictated by the clockwise rotation angle θ along y axis (e.g., 1002, yaw), the counterclockwise rotation angle γ along x axis (e.g., 1004, pitch), and the counterclockwise rotation angle E along z axis (e.g., 1006, roll).

The coordinate mapping between the (x,y,z) and (x', y', z') coordinate system is defined as:

$$\begin{bmatrix} x \\ y \\ z \end{bmatrix} = \begin{bmatrix} \cos\epsilon & \sin\epsilon & 0 \\ -\sin\epsilon & \cos\epsilon & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\gamma & \sin\gamma \\ 0 & -\sin\gamma & \cos\gamma \end{bmatrix} \begin{bmatrix} x' \\ y' \\ z' \end{bmatrix}$$

That is, $$\begin{bmatrix} x \\ y \\ z \end{bmatrix} = \quad \text{Equation 4}$$

$$\begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Figure 11:
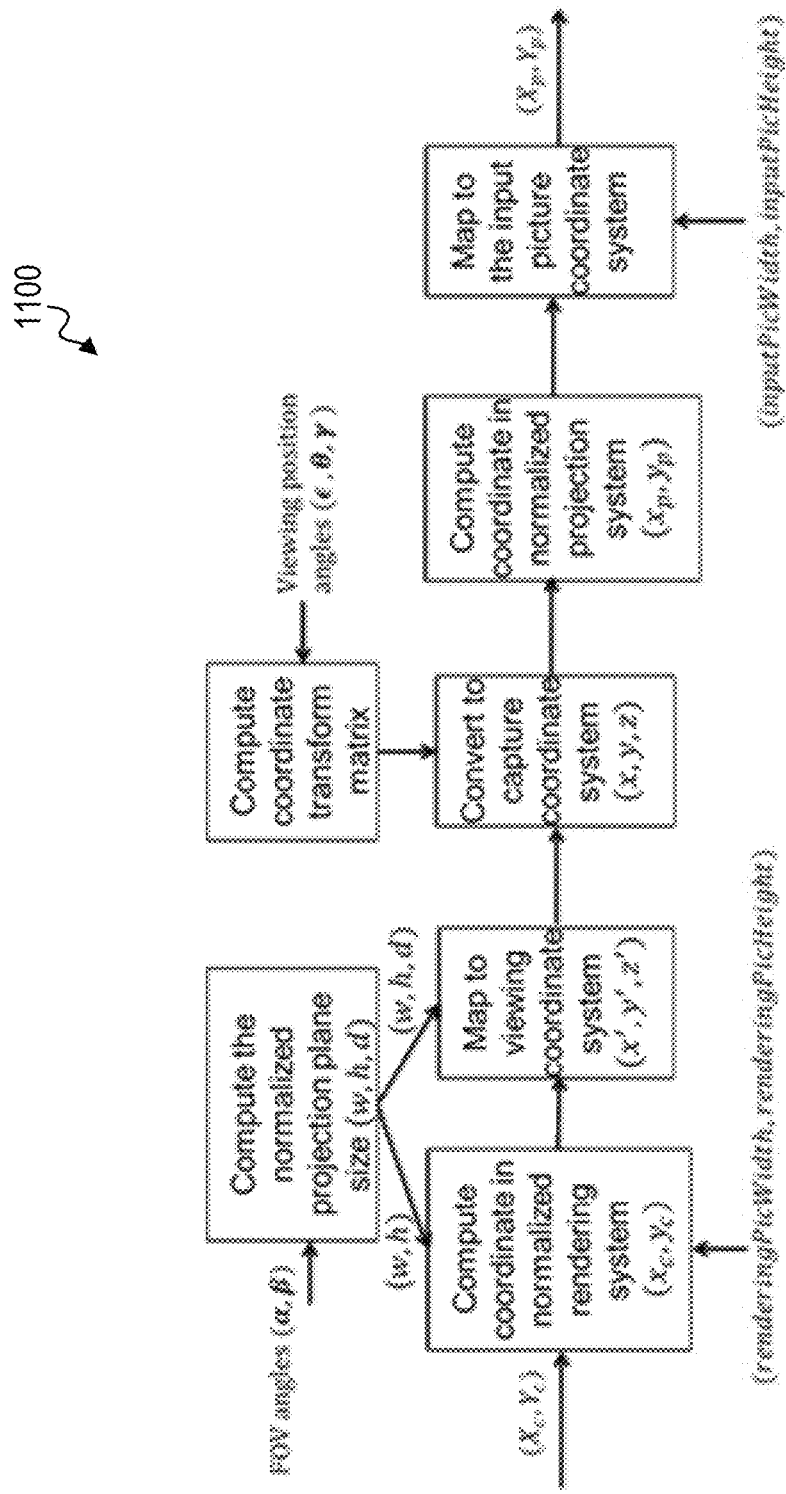
FIG. 11 illustrates a schematic diagram of a coordinate mapping between an output rendering picture and an input 360 degree video picture.

FIG. 11 illustrates a schematic diagram of a coordinate mapping 1100 between an output rendering picture and an input picture. With the FOV and viewing direction angles defined above, the coordinate mapping between the output rendering picture coordinate system ($X_c$, $Y_c$) (i.e. the rendering picture for display) and the input picture coordinate system ($X_p$, $Y_p$) (i.e. the input 360 degree video picture) can be established. As shown in FIG. 11, given a sample point ($X_c$, $Y_c$) in the rendering picture, the coordinate of the corresponding sample point ($X_p$, $Y_p$) in the input picture can be derived by the following steps:

Compute the normalized projection plane size and distance to sphere center based on the FOV angles (α, β) (i.e. Equation 3); compute the coordinate transform matrix between the viewing and capture coordinate system based on the viewing direction angles (ε, θ, γ) (i.e. Equation 4)

Normalize ($X_c$, $Y_c$) based on the rendering picture size and the normalized projection plane size.

Map the coordinate ($x_c$, $y_c$) in the normalized rendereing coordinate system to the 3D viewing coordinate system (x', y', z').

Convert the coordinate to the 3D capture coordinate system (x, y, z)

Derive the coordinate ($x_p$, $y_p$) in the normalized projection coordinate system Convert the derived coordinate to integer position in the input picture based on input picture size and projection layout format.

Figure 12:
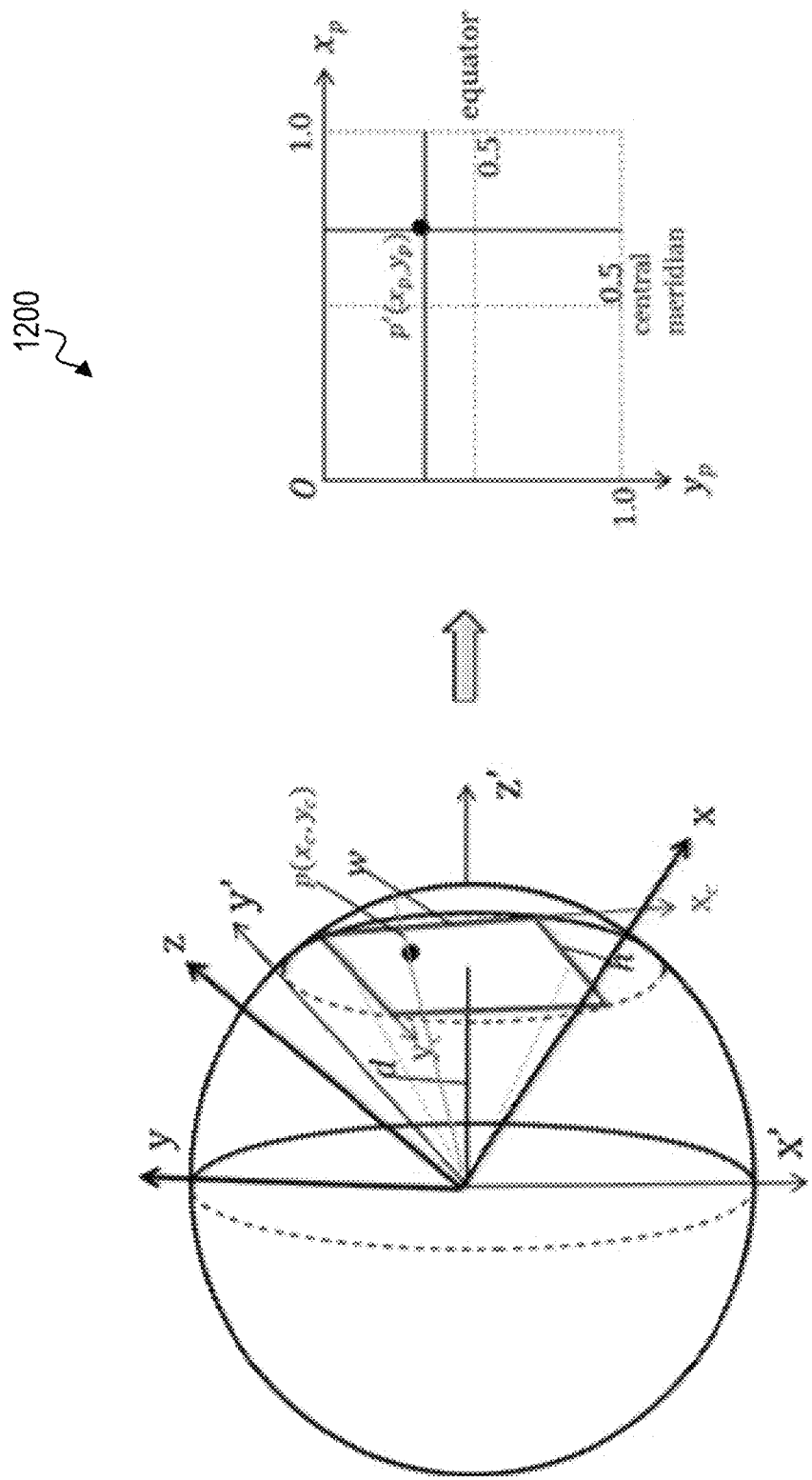
FIG. 12 conceptually illustrates an example of mapping a point in the normalized rendering coordinate system to the normalized projection coordinate system using the equirectangular projection format.

FIG. 12 conceptually illustrates an example of mapping a point in the normalized rendering coordinate system (e.g., $p(x_c, y_c)$) to the normalized projection coordinate system (e.g., $p'(x_p, y_p)$) using the equirectangular projection format 1200.

In one or more implementations, projection from the equirectangular input format is performed. For example, if the input picture is in the equirectangular projection format, the following steps may apply to map a sample point $(X_c, Y_c)$ in the rendering picture to a sample point $(X_p, Y_p)$ in the input picture.

Compute normalized display projection plane size based on the FOV angles:

$$\begin{cases} w = \dfrac{2ta}{\sqrt{ta^2 + tb^2 + 1}} \\ h = \dfrac{2tb}{\sqrt{ta^2 + tb^2 + 1}} \\ d = \dfrac{1}{\sqrt{ta^2 + tb^2 + 1}} \end{cases}, \text{ where } ta = \tan\left(\dfrac{\alpha}{2}\right) \text{ and } tb = \tan\left(\dfrac{\beta}{2}\right)$$

Map $(X_c, Y_c)$ into the normalized rendering coordinate system:

$$\begin{cases} x_c = \dfrac{X_c w}{renderingPicWidth} \\ y_c = \dfrac{Y_c h}{renderingPicHeight} \end{cases}$$

Compute the coordinate of $p(x_c, y_c)$ in $(x', y', z')$ viewing coordinate system:

$$\begin{cases} x' = x_c - \dfrac{w}{2} \\ y' = -y_c + \dfrac{h}{2} \\ z' = d \end{cases}$$

Convert coordinate $(x', y', z')$ into $(x, y, z)$ capture coordinate system based on the viewing direction angles:

$$\begin{bmatrix} x \\ y \\ z \end{bmatrix} = \begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Project $p(x,y,z)$ onto the normalized projection coordinate system $p'(x_p, y_p)$:

$$\begin{cases} x_p = \dfrac{\arctan 2(x, z)}{2\pi} + 0.5 \\ y_p = -\dfrac{\arcsin\left(\dfrac{y}{\sqrt{x^2 + y^2 + z^2}}\right)}{\pi} + 0.5 \end{cases} \quad \text{Equation 5}$$

Map $p'(x_p, y_p)$ onto the input picture (equirectangular) coordinate system $(X_p, Y_p)$ $$\begin{cases} X_p = (int)(x_p * inputPicWidth) \\ Y_p = (int)(y_p * inputPicHeight) \end{cases},$$

where:
  $\alpha$, $\beta$ are FOV angles and $\epsilon$, $\theta$, $\gamma$ are viewing direction angles.
  renderingPicWidth×renderingPicHeight is the rendering picture size
  inputPicWidth×inputPicHeight is the input picture size (in equirectangular projection format)

Figure 13:
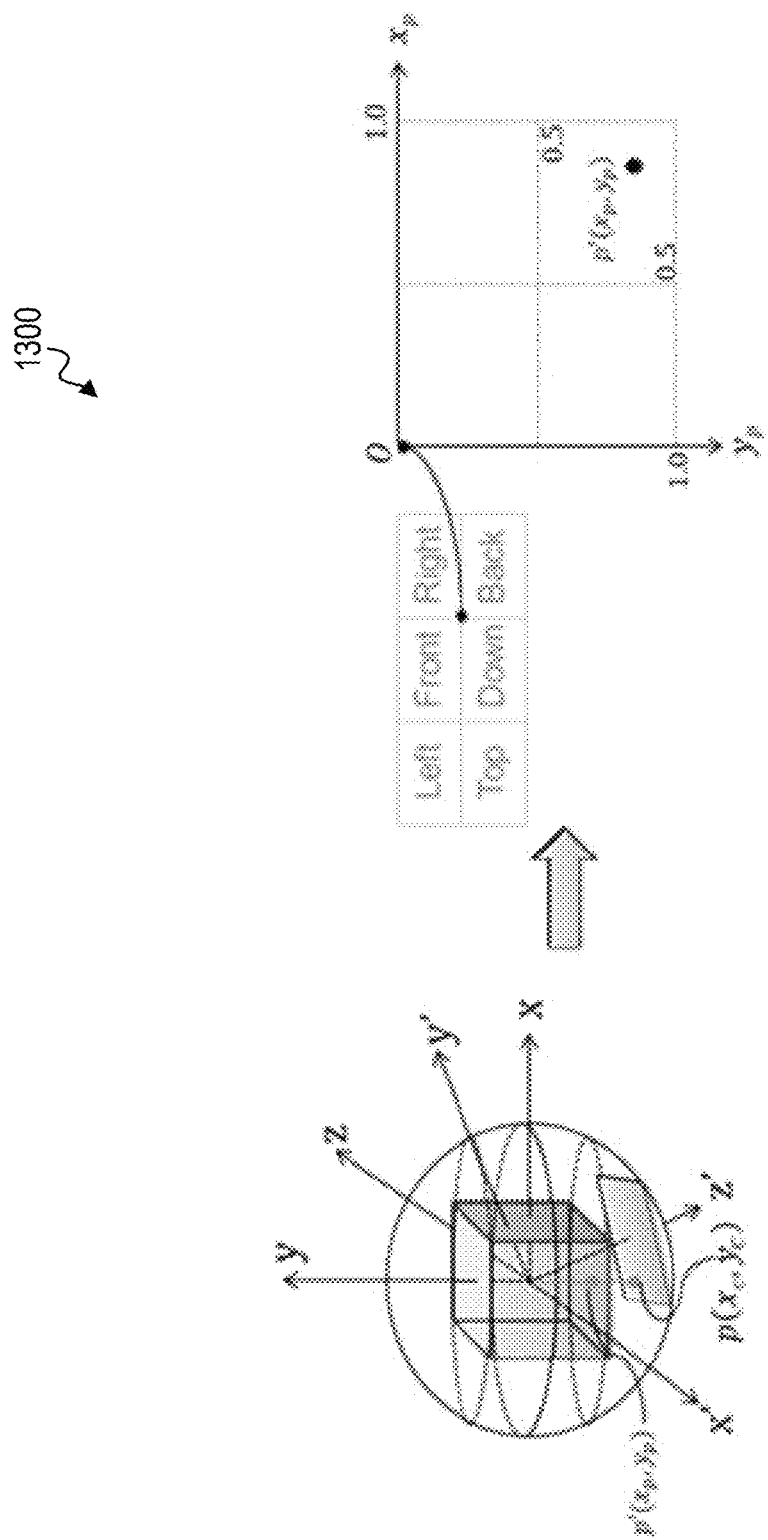
FIG. 13 conceptually illustrates an example of mapping a point in the normalized rendering coordinate system to the normalized projection coordinate system using the cube projection format.

FIG. 13 conceptually illustrates an example of mapping a point in the normalized rendering coordinate system (e.g., $p(x_c, y_c)$) to the normalized projection coordinate system (e.g., $p'(x_p, y_p)$) using the cube projection format 1300.

In one or more implementations, projection from the cube projection input format is performed. For example, if the input picture is in cube projection format, the following similar steps apply to map a sample point $(X_c, Y_c)$ in the rendering picture to a sample point $(X_p, Y_p)$ in the input picture.

Compute normalized display projection plane size based on the FOV angles:

$$\begin{cases} w = \dfrac{2ta}{\sqrt{ta^2 + tb^2 + 1}} \\ h = \dfrac{2tb}{\sqrt{ta^2 + tb^2 + 1}} \\ d = \dfrac{1}{\sqrt{ta^2 + tb^2 + 1}} \end{cases} \text{ where } ta = \tan\left(\dfrac{\alpha}{2}\right) \text{ and } tb = \tan\left(\dfrac{\beta}{2}\right)$$

Map $(X_c, Y_c)$ into the normalized rendering coordinate system:

$$\begin{cases} x_c = \dfrac{X_c w}{renderingPicWidth} \\ y_c = \dfrac{Y_c h}{rendetringPicHeight} \end{cases}$$

Compute the coordinate of $p(x_c, y_c)$ in (x', y', z') viewing coordinate system:

$$\begin{cases} x' = x_c - \dfrac{w}{2} \\ y' = -y_c + \dfrac{h}{2} \\ z' = d \end{cases}$$

Convert coordinate (x', y', z') into (x, y, z) capture coordinate system based on the viewing direction angles:

$$\begin{bmatrix} x \\ y \\ z \end{bmatrix} = \begin{bmatrix} \cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma \\ -\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma \\ -\sin\theta & -\cos\theta\sin\gamma & \cos\theta\cos\gamma \end{bmatrix} \begin{bmatrix} x' \\ y' \\ z' \end{bmatrix}$$

Project p(x,y,z) onto the normalized cube coordinate system $p'(x_p, y_p)$ based on the Pseudo code defined in Table 1.

Map $p'(x_p, y_p)$ onto the input cube coordinate system $(X_p, Y_p)$ (assuming all the cube faces have a same resolution)

$$\begin{cases} X_p = (int)\left(x_p * \dfrac{inputPicWidth}{3}\right) + Xoffset[faceID] \\ Y_p = (int)\left(y_p * \dfrac{inputPicHeight}{2}\right) + Yoffset[faceID] \end{cases},$$

where:
α, β are FOV angles and ϵ, θ, γ are viewing direction angles.
renderingPicWidth×renderingPicHeight is the renedering picture size
inputPicWidth×inputPicHeight is the input picture size (in cube projection format)
{(Xoffset[faceID], Yoffset[faceID])|faceID=Front, back, Left, Right, Top and Down} is the coordinate offsets of a cube face in the input cube projection coordinate system.

$$\begin{cases} Xoffset[6] = \left\{0, \dfrac{inputPicWidth}{3}, \dfrac{2inputPicWidth}{3}, 0, \dfrac{inputPicWidth}{3}, \dfrac{2inputPicWidth}{3}\right\} \\ Yoffset[6] = \left\{0, 0, 0, \dfrac{inputPicHeight}{2}, \dfrac{inputPicHeight}{2}, \dfrac{inputPicHeight}{2}\right\} \end{cases}$$

For the cube projection layout depicted in FIG. 13, the face ID is in the order of Front, back, Left, Right, Top followed by Down to access the coordinate offsets array.

Sample Rendering for Display

In the projection of 360 degree video for display, multiple samples in a input 360 degree video picture (e.g. in equirectangular format or cube projection format) may project to a same integer location $(X_c, Y_c)$ in the rendering picture. To have a smooth rendering, not only the integer-pel positions, but also its sub-pel positions in the rendering picture are projected to find counterpart samples in the input picture.

Figure 14:
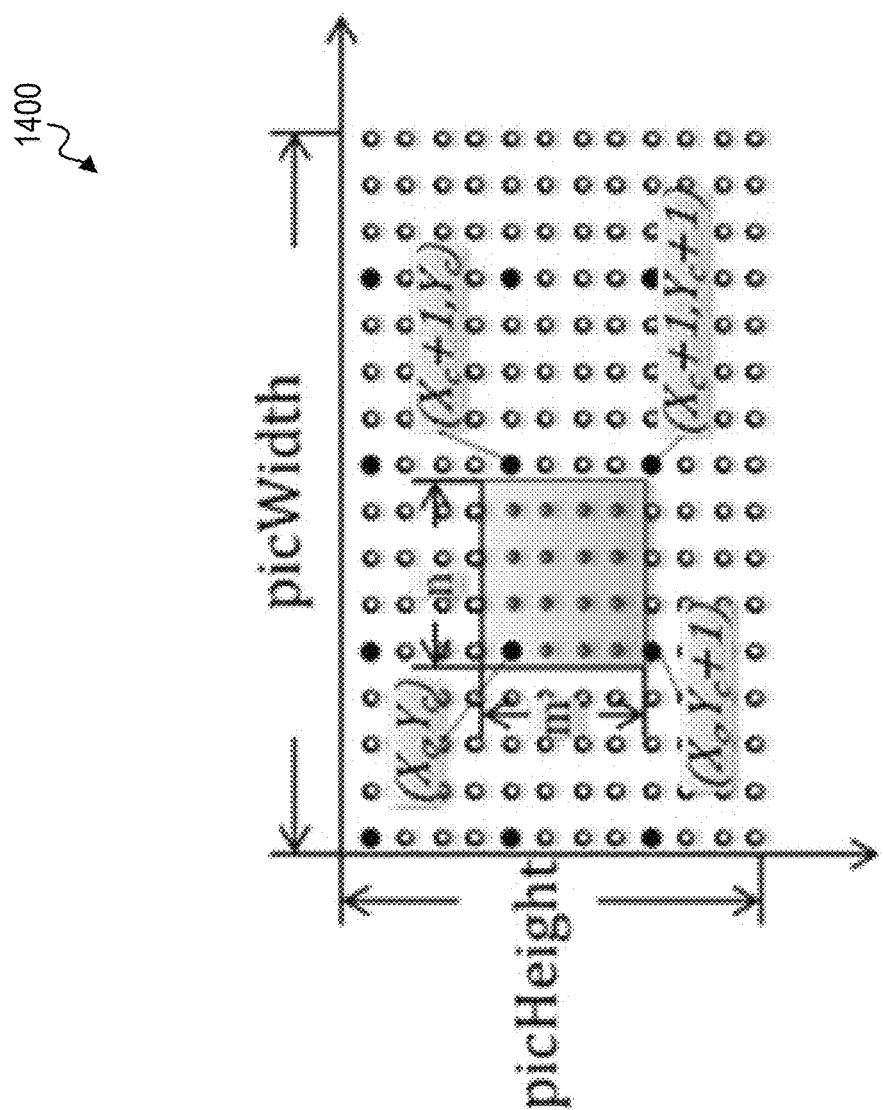
FIG. 14 conceptually illustrates an example of a two-dimensional layout 1400 of samples of an input 360 degree video picture being projected for 360 degree video rendering.

FIG. 14 conceptually illustrates an example of a two-dimensional layout 1400 of samples of an input 360 video picture being projected for 360 degree video rendering. As shown in FIG. 14, if the projection precision is $$\frac{1}{n}$$

sub-pel in horizontal direction and $$\frac{1}{m}$$

sub-pel in vertical direction, then the sample value of the rendering picture at location $(X_c, Y_c)$ can be rendered by:

Equation 6

$$renderingImg[X_c, Y_c] = \frac{\sum_{i=0}^{m-1}\sum_{j=0}^{n-1} inputImg\left[mapping\_func\left(X_c + \dfrac{j+0.5}{n}, Y_c + \dfrac{i+0.5}{m}\right)\right] + \dfrac{mn}{2}}{mn},$$

Where:
$(X_p, Y_p)$=mapping_func$(X_c, Y_c)$ is the coordinate mapping function from the rendering picture to input 360 video picture defined in sections above (e.g. w/equirectangular projection or cube projection format).
inputImg$[X_p, Y_p]$ is the sample value at location $(X_p, Y_p)$ in the input picture.
renderingImg$[X_c, Y_c]$ is the sample value at location $(X_c, Y_c)$ in the output rendering picture.

Instead of computing the coordinate mapping between the output rendering coordinate system $(X_c, Y_c)$ and the input picture coordinate system $(X_p, Y_p)$ on-the-fly, the coordinate mapping can also be pre-computed and stored as the projection map for the entire rendering picture. Since the viewing direction and FOV angles may not change from picture to picture, the pre-computed projection map can be shared by the rendering of multiple pictures.

Let projectMap[n*$X_c$+j, m*$Y_c$+i] be the pre-computed projection map, with $X_c$=0, 1, . . . , renderingPicWidth−1, $Y_c$=0, 1, . . . , renderingPicHeight−1, j=0,1, . . . , n−1 and i=0, 1, . . . , m−1. Each entry of the projection map stores the pre-computed coordinate value $(X_p, Y_p)$ of the input picture coordinate system for a sub-pel location $$\left(X_c + \frac{j+0.5}{n}, Y_c + \frac{i+0.5}{m}\right)$$

in the rendering picture. The rendering can be written as:

Equation 7

$$renderingImg[X_c, Y_c] = \frac{\sum_{i=0}^{m-1}\sum_{j=0}^{n-1} inputImg[projectMap(n*X_c+j, m*Y_c+i]] + \frac{mn}{2}}{mn}$$

A picture may have multiple color components, such as YUV, YCbCr, RGB. The above rendering process can apply to color components, independently.

Figure 15:
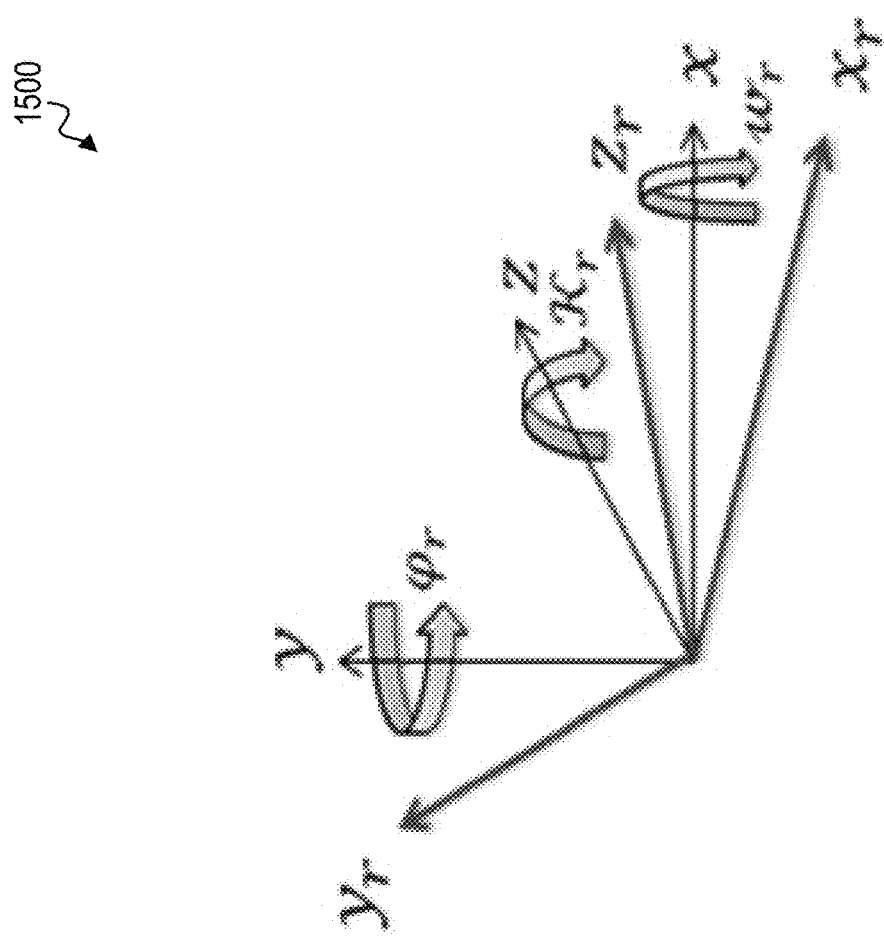
FIG. 15 conceptually illustrates an example of global rotation angles between the capture coordinate system and the 360 degree video projection coordinate system.

FIG. 15 conceptually illustrates an example of global rotation angles 1500 between the capture coordinate system and the 360 degree video projection coordinate system. Instead of directly projecting 360 degree video from the 3D 360 degree video capture coordinate system (x, y, z) to the input picture coordinate system ($X_p$, $Y_p$) in the 360 degree video capture and stitching process, we introduce an additional coordinate system named 3D 360 degree video projection coordinate system ($x_r$, $y_r$, $z_r$). The relationship between ($x_r$, $y_r$, $z_r$) and (x, y, z) is dictated by counter clockwise rotation angles ($\mathcal{K}_r$, $\varphi_r$, $w_r$) along z, y, x axis as shown in FIG. 15. The coordinate transform between the two systems is defined as:

$$\begin{bmatrix}x_r\\y_r\\z_r\end{bmatrix} = \begin{bmatrix}\cos\mathcal{K}_r & \sin\mathcal{K}_r & 0\\-\sin\mathcal{K}_r & \cos\mathcal{K}_r & 0\\0 & 0 & 1\end{bmatrix}\begin{bmatrix}\cos\varphi_r & 0 & -\sin\varphi_r\\0 & 1 & 0\\\sin\varphi_r & 0 & \cos\varphi_r\end{bmatrix} \begin{bmatrix}1 & 0 & 0\\0 & \cos w_r & \sin w_r\\0 & -\sin w_r & \cos w_r\end{bmatrix}\begin{bmatrix}x\\y\\z\end{bmatrix}$$

Equation 8

In one or more implementations, Equation 8 can be rewritten as Equation 9:

Equation 9

$$\begin{bmatrix}x_r\\y_r\\z_r\end{bmatrix} = \begin{bmatrix}\cos\varphi_r\cos\mathcal{K}_r & \cos w_r\sin\mathcal{K}_r + \sin w_r\sin\varphi_r\cos\mathcal{K}_r & \sin w_r\sin\mathcal{K}_r - \cos w_r\sin\varphi_r\cos\mathcal{K}_r\\-\cos\varphi_r\sin\mathcal{K}_r & \cos w_r\cos\mathcal{K}_r - \sin w_r\sin\varphi_r\sin\mathcal{K}_r & \sin w_r\cos\mathcal{K}_r + \cos w_r\sin\varphi_r\sin\mathcal{K}_r\\\sin\varphi_r & -\sin w_r\cos\varphi_r & \cos w_r\cos\varphi_r\end{bmatrix}\begin{bmatrix}x\\y\\z\end{bmatrix}$$

Figure 16:
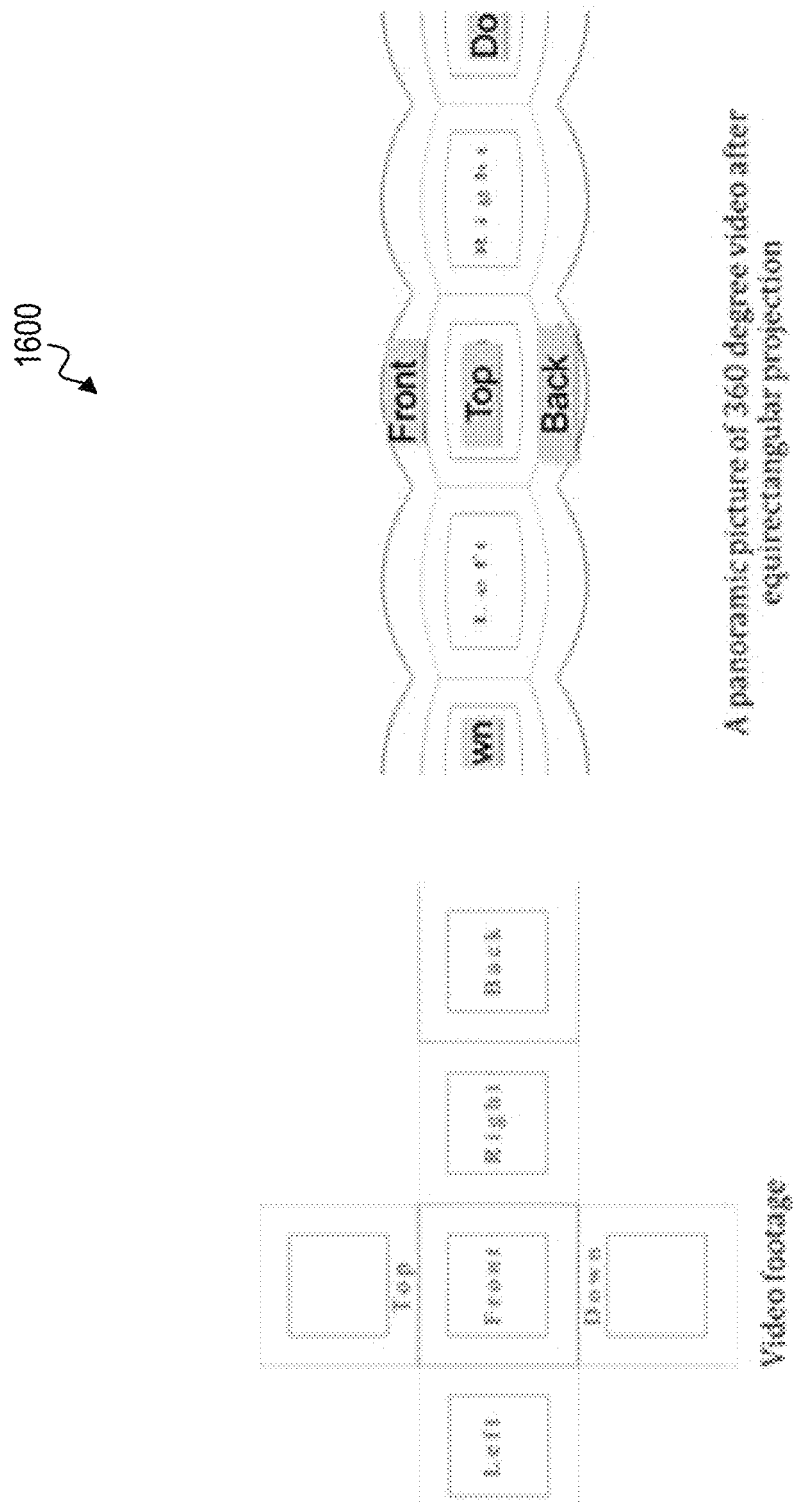
FIG. 16 conceptually illustrates an example of an alternative 360 degree view projection in the equirectangular format.

FIG. 16 conceptually illustrates an example of an alternative 360 degree view projection 1600 in the equirectangular projection format. The additional coordinate system ($x_r$, $y_r$, $z_r$) provides more freedom on the 360 degree video capture side when projecting the captured 360 degree video to the 2D input picture coordinate system for storage or transmission. Taking the equirectangular projection format as example, sometime it may be desirable to project the Front and Back views to the South and North Pole as shown in FIG. 16 instead of the Top and Down views shown in FIG. 4. Since in equirectangular projection data around the South and North Pole of a sphere is better preserved, allowing alternative layouts such as the one in FIG. 16 may potentially provide benefits (such as better compression efficiency) under certain circumstance.

Since the 360 degree video data may be projected from 3D coordinate system ($x_r$, $y_r$, $z_r$) instead of (x, y, z) to the input picture coordinate system, an additional step of converting coordinate (x, y, z) to ($x_r$, $y_r$, $z_r$) based on Equation 9 is needed in FIG. 2 as well as in FIG. 7 before projecting the 360 degree video data to the input picture coordinate system. Accordingly, (x, y, z) in Equation 1, Equation 5 and in Table 1 should be replaced with ($x_r$, $y_r$, $z_r$).

Figure 17:
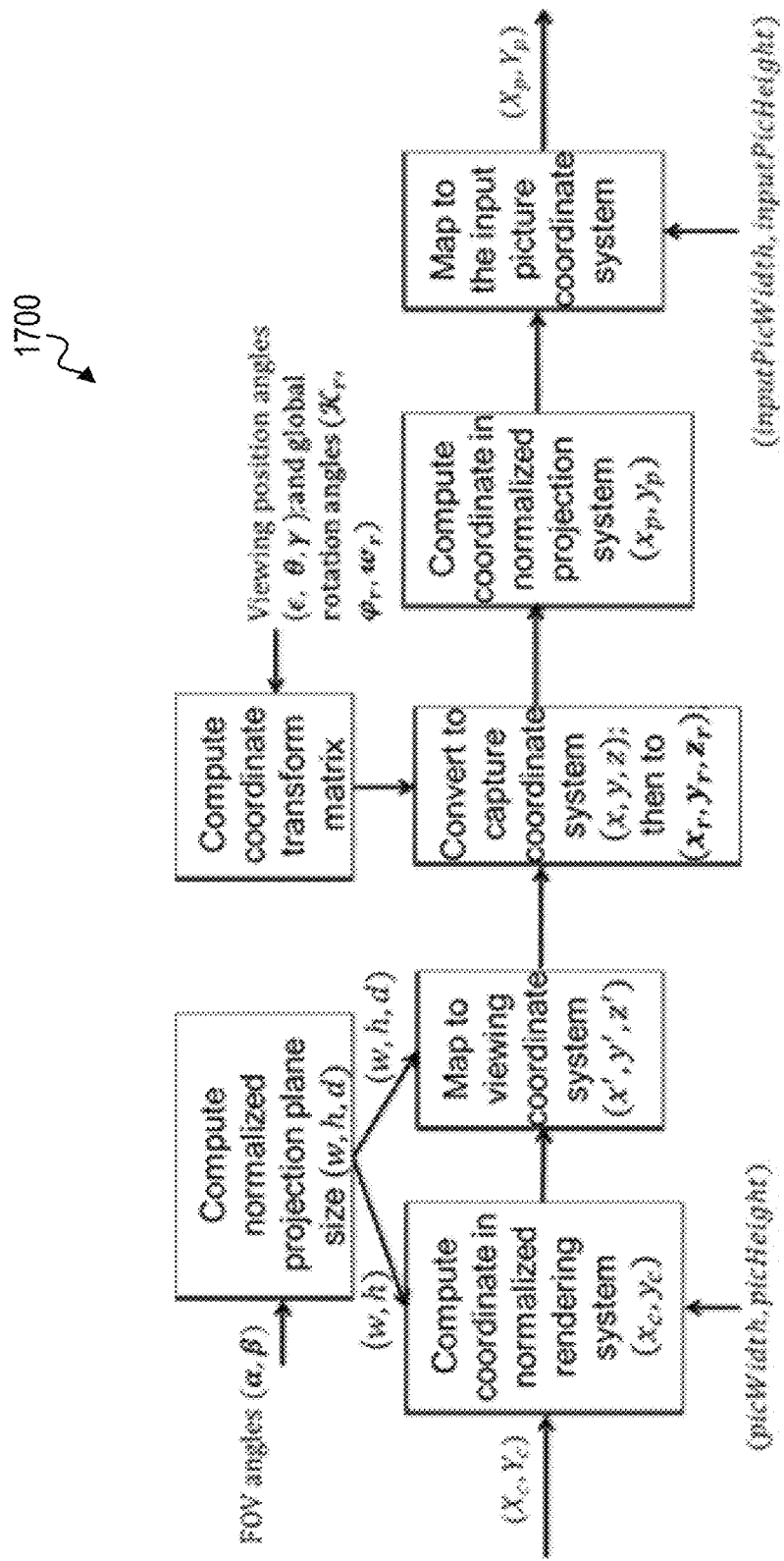
FIG. 17 illustrates a schematic diagram of an example of a coordinate mapping process modified with the 360 degree video projection coordinate system.

FIG. 17 illustrates a schematic diagram of an example of a coordinate mapping process modified with the 360 degree video projection coordinate system. The coordinate mapping from the output rendering picture coordinate system ($X_c$, $Y_c$) to the input picture coordinate system ($X_p$, $Y_p$) may be modified accordingly as illustrated in FIG. 17. The computation of the coordinate transform matrix is modified by taking into both the Viewing direction angles ($\epsilon$, $\theta$, $\gamma$) and global rotation angles ($\mathcal{K}_r$, $\varphi_r$, $w_r$) into account. By cascading Equation 9 and Equation 4, the coordinate can directly be converted from the viewing coordinate system (x', y', z') to 3D 360 degree video projection coordinate system ($x_r$, $y_r$, $z_r$) by the following equation:

$$\begin{bmatrix}x_r\\y_r\\z_r\end{bmatrix} = \begin{bmatrix}\cos\varphi_r\cos\mathcal{K}_r & \cos w_r\sin\mathcal{K}_r + \sin w_r\sin\varphi_r\cos\mathcal{K}_r & \sin w_r\sin\mathcal{K}_r - \cos w_r\sin\varphi_r\cos\mathcal{K}_r\\-\cos\varphi_r\sin\mathcal{K}_r & \cos w_r\cos\mathcal{K}_r - \sin w_r\sin\varphi_r\sin\mathcal{K}_r & \sin w_r\cos\mathcal{K}_r + \cos w_r\sin\varphi_r\sin\mathcal{K}_r\\\sin\varphi_r & -\sin w_r\cos\varphi_r & \cos w_r\cos\varphi_r\end{bmatrix}$$

$$\begin{bmatrix}\cos\epsilon\cos\theta & -\cos\epsilon\sin\theta\sin\gamma + \sin\epsilon\cos\gamma & \cos\epsilon\sin\theta\cos\gamma + \sin\epsilon\sin\gamma\\-\sin\epsilon\cos\theta & \sin\epsilon\sin\theta\sin\gamma + \cos\epsilon\cos\gamma & -\sin\epsilon\sin\theta\cos\gamma + \cos\epsilon\sin\gamma\\-\sin\theta & -\cos\theta\sin\gamma & \cos\theta\cos\gamma\end{bmatrix}\begin{bmatrix}x'\\y'\\z'\end{bmatrix}$$

In one or more implementations, the 3×3 coordinate transform matrix can be pre-computed using the equation above.

FIG. 17 illustrates a schematic diagram of an example of a coordinate mapping process modified with the 360 degree video projection coordinate system (e.g., ($x_r$, $y_r$, $z_r$)). In FIG. 17, the global rotation angles ($\mathcal{K}_r$, $\varphi_r$, $w_r$) may be signaled in the system by any suitable means. For example, defining a SEI (Supplemental Enhancement Information) message carried in the video elemental bitstream, e.g. AVC SEI or HEVC SEI messages. Also, a default view may also be specified and carried.

Figure 18:
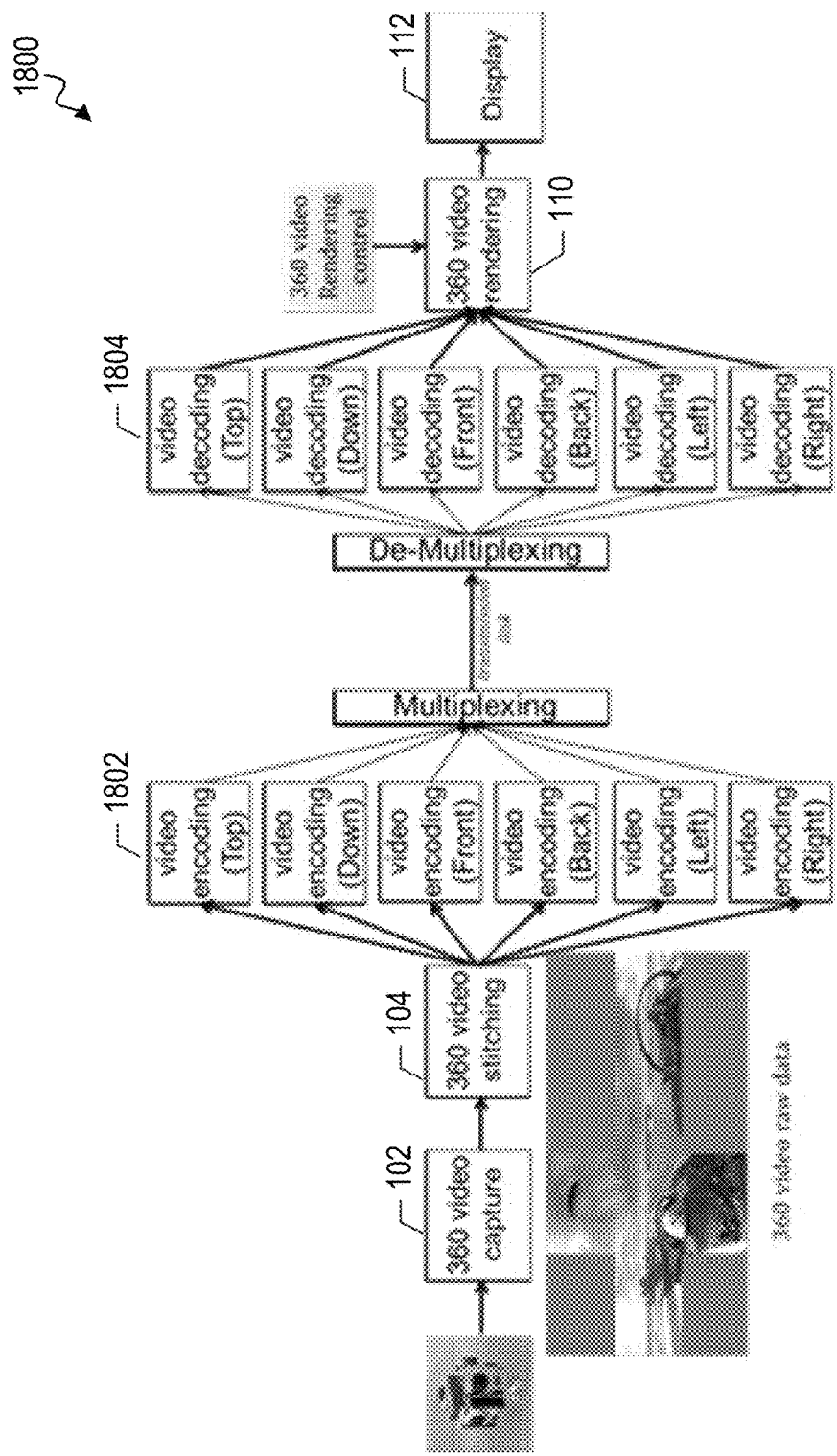
FIG. 18 illustrates a schematic diagram of an example of a 360 degree video capture and playback system using six-view layout format.

FIG. 18 illustrates a schematic diagram of an example of a 360 degree video capture and playback system 1800 using six-view layout format. Instead of composing 360 degree video into a single view sequence such as equirectanglar format used in FIG. 1, a 360 degree video capture and playback system may support multiple view layout format for 360 degree video storage, compression, transmission, decoding, rendering, etc. As shown in FIG. 18, the 360 degree video stitching block (e.g., 104) may just remove overlapped area captured by a camera rig, and output e.g. six view sequences (i.e. Top, Down, Front, Back, Left, Right), each covers 90°×90° viewport. The sequences may or may not have same resolution, but are compressed (e.g., 1802)

and de-compressed (e.g., 1804) separately. The 360 degree video rendering engine (e.g., 110) can take multiple sequences as input and render sequences for display with the help of the rendering control.

Figure 19:
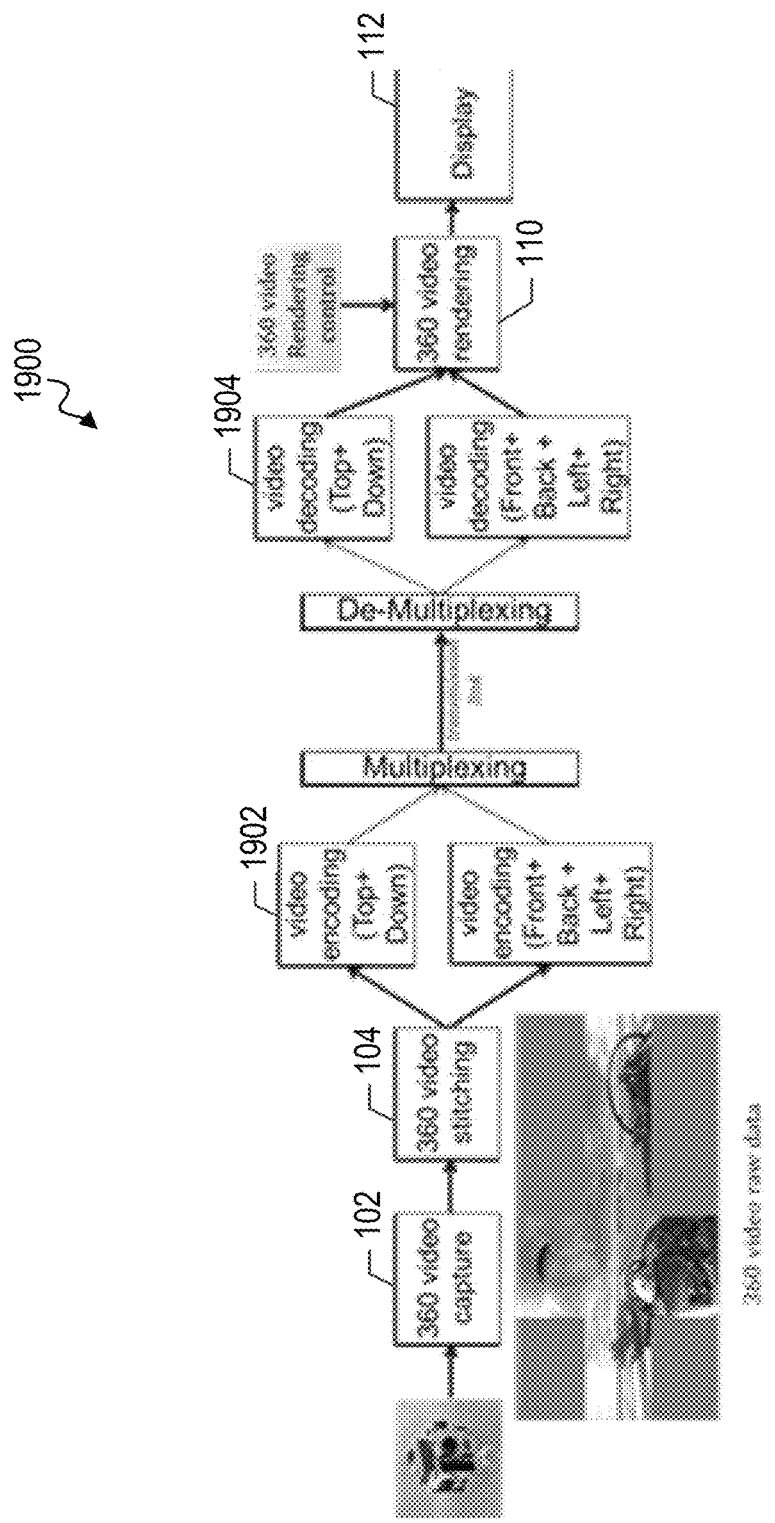
FIG. 19 illustrates a schematic diagram of an example of a 360 degree video capture and playback system using two-view layout format.

FIG. 19 illustrates a schematic diagram of an example of a 360 degree video capture and playback system using two-view layout format. In FIG. 19, the 360 degree video stitching block (e.g., 104) may generate e.g. two view sequences, one covers e.g. the top and down 360°×30° of data and the other covers Front, Back, Left and Right 360°×120° of data. The two sequences can have different resolutions as well as the different projection layout formats. For example, the Front+Back+Left+Right view can use the equirectangular projection format, while the Top+Down view can use another projection format. In this particular example, two encoders (e.g., 1902) and decoders (e.g., 1904) are used. The 360 degree video rendering (e.g., 110) can render sequences for display by taking two sequences as input.

Figure 20:
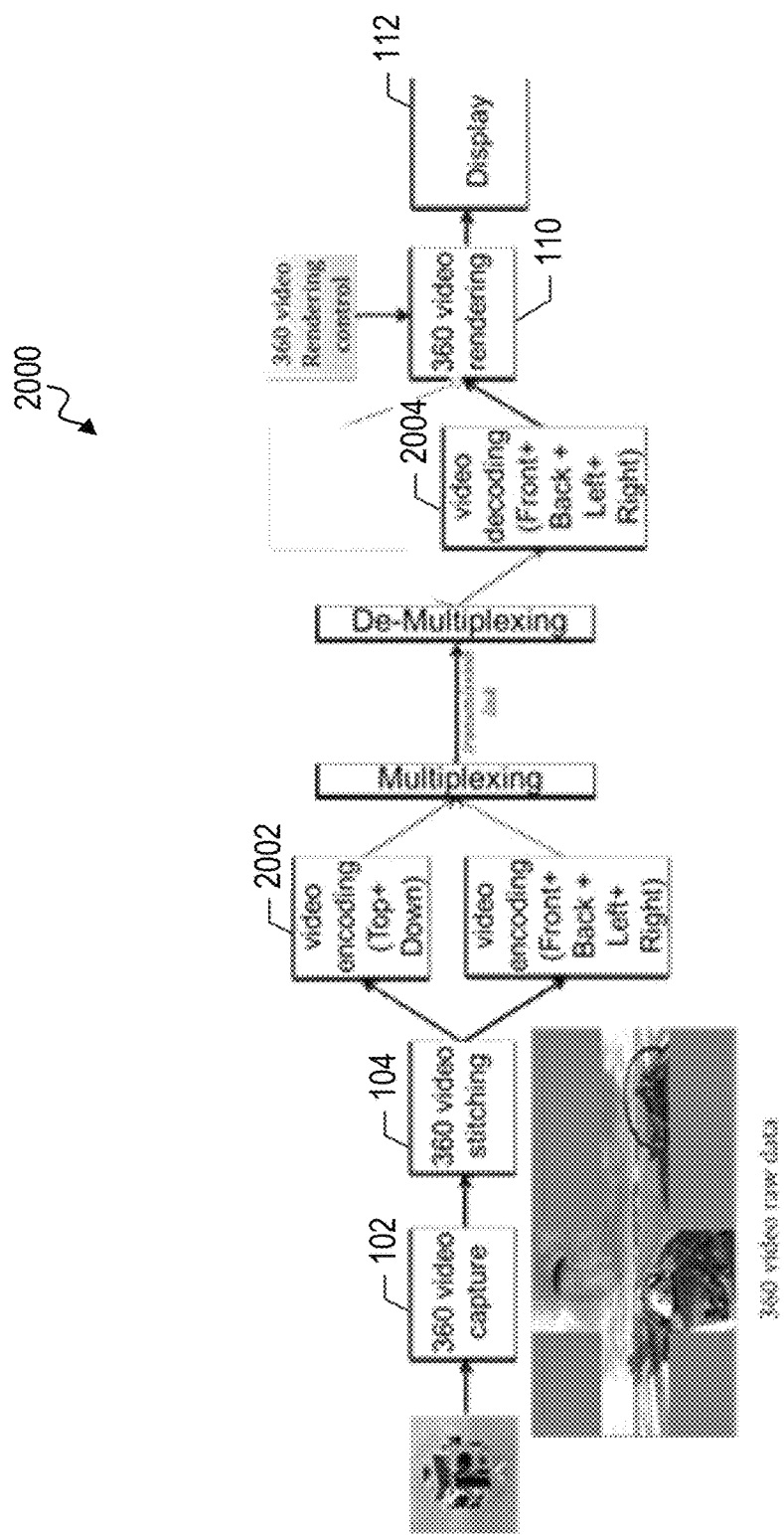
FIG. 20 illustrates a schematic diagram of an example of a 360 degree video capture and playback system using two-view layout format with one view sequence for rendering.

FIG. 20 illustrates a schematic diagram of an example of a 360 degree video capture and playback system 2000 using two-view layout format with one view sequence for rendering. Multi-view layout format may also provide scalable rendering functionality in the 360 degree video rendering. As shown in FIG. 20, the 360 degree video may choose not to render top or down 30° part of the video (e.g., 2002, 2004) due to limited capability of the rendering engine (e.g., 110), or if the bitstream packets of the Top+Down view are lost during the transmission.

Even if the 360 degree video stitching block (e.g., 104) generates multiple view sequences, a single video encoder and decoder may still be used in the 360 degree video capture and playback system 2000. For example, if the output of the 360 degree video stitching block (e.g., 104) is six 720p@30 (i.e. 720p sequence at 30 frame/sec) view sequences, the output can be composed into a single 720p@180 sequence (i.e. 720p sequence at 180 frame/sec), and compressed/decompressed using a single codec. Alternatively, the e.g. six independent sequences can be compressed/decompressed by a single video encoder and decoder instance without composing them into a single combined sequence, by time-sharing the available processing resources of the single encoder and decoder instance.

Figure 21:
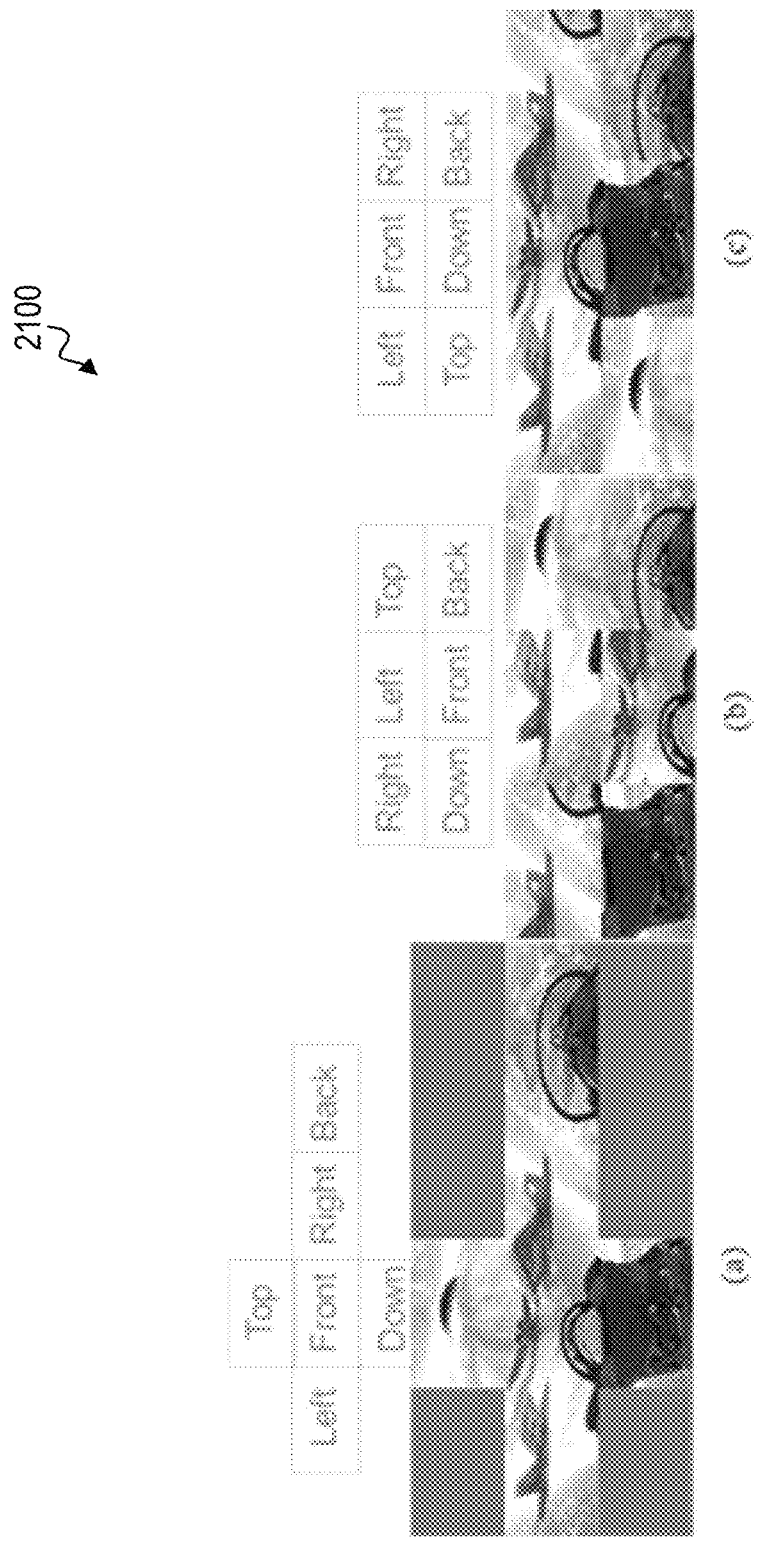
FIG. 21 conceptually illustrates examples of multiple cube projection format layouts.
Figure 22:
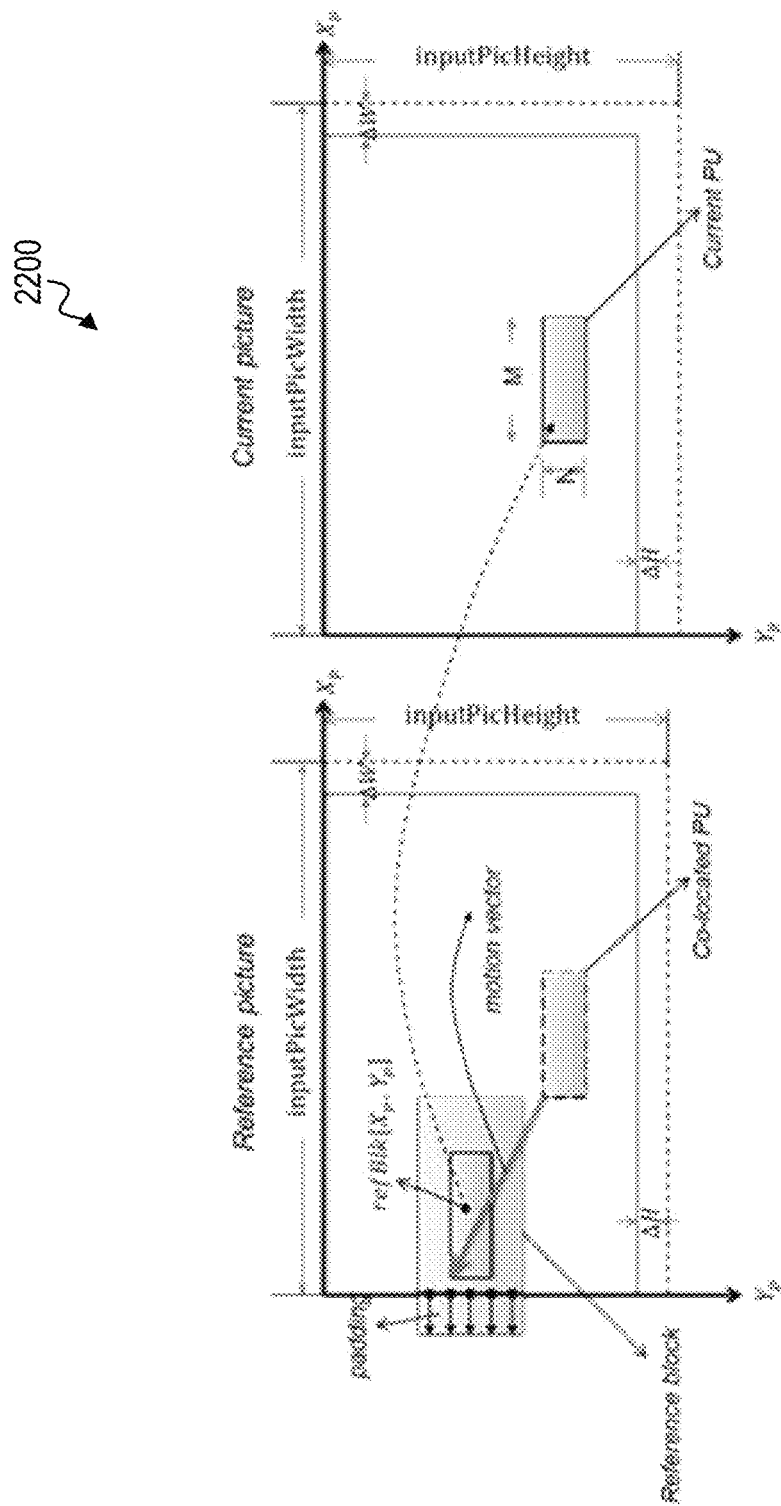
FIG. 22 conceptually illustrates an example of unrestricted motion compensation.

FIG. 21 conceptually illustrates examples of multiple cube projection format layouts: (a) cube projection raw layout; (b) an undesirable cube projection layout and (c) an example of preferred cube projection layout. The traditional video compression technology leverages spatial correlation within a picture. For cube projection for example, if the projection sequences of Top, Down, Front, Back, Left and Right cube faces are composed into a single view sequence, different cube face layouts may cause different compression efficiency even for a same 360 degree video data. In one or more implementations, the cube raw layout (a) does not create discontinuous face boundaries within the composed picture, but has larger picture size compared to other two, and carries dummy data in the grey area. In one or more implementations, the layout (b) is one of undesirable layouts since it has a maximum number of discontinuous face boundaries (i.e., 7) within the composed picture. In one or more implementations, the layout (c) is one of preferred cube projection layouts as it has minimum smaller number of discontinuous face boundaries 4. The face boundaries in layout (c) of FIG. 22 are the horizontal face boundary between Left and Top, and between Right and Back, and the vertical face boundary between Top and Down, and between Back and Down. In some aspects, experimental results revealed that layout (c) outperforms layout (a) and (b) both by roughly 3% on average.

Therefore, for cube projection or other multiple face projection formats, in general the layout should minimize spatial discontinuities (i.e. the number of discontinuous face boundaries) in the composed picture, for better spatial prediction thus better compression efficiency in the video compression. For the cube projection, for example, a preferable layout has number of discontinuous face boundaries 4 within a composed 360 degree video picture. For cube projection format, the further minimization of spatial discontinuities can be achieved by introducing face rotation (i.e. 90, 180, 270 degree) in the layout. In one or more aspects, the layout information of incoming 360 degree video is signaled in a high-level video system message for compression and rendering.

FIG. 22 conceptually illustrates an example of unrestricted motion compensation 2200. Unrestricted motion compensation (UMC) is a technique commonly used in the video compression standards for better compression efficiency. As shown in FIG. 22, in the UMC the reference block of a prediction unit is allowed to go beyond picture boundaries. For a reference pixel ref $[X_p, Y_p]$ outside the reference picture, the closest picture boundary pixel is used. Here coordinates $(X_p, Y_p)$ for reference pixels are determined by location of the current prediction unit (PU) and the motion vector, they can go beyond the picture boundaries.

Let {ref Pic $[X_{cp}, Y_{cp}]$, $X_{cp}$=0, 1, . . . , inpuPicWidth−1; $Y_{cp}$=0, 1, . . . , inpuPicHeight−1} be the reference picture sample matrix, the UMC (in terms of reference block loading) is defined as:

$$\text{ref Blk}[X_p, Y_p] = \text{ref Pic}[\text{clip3}(0, \text{inputPicWidth}-1, X_p), \text{clip3}(0, \text{inputPicHeight}-1, Y_p)] \quad \text{Equation 10}$$

, where clipping function clip3 (0, a, x) is defined as:

$$\text{int clip3}(0,a,x)\{\text{if } (x<0)\text{return } 0;\text{else if } (x>a)\text{return } a;\text{else return } x\} \quad \text{Equation 11}$$

Figure 23:
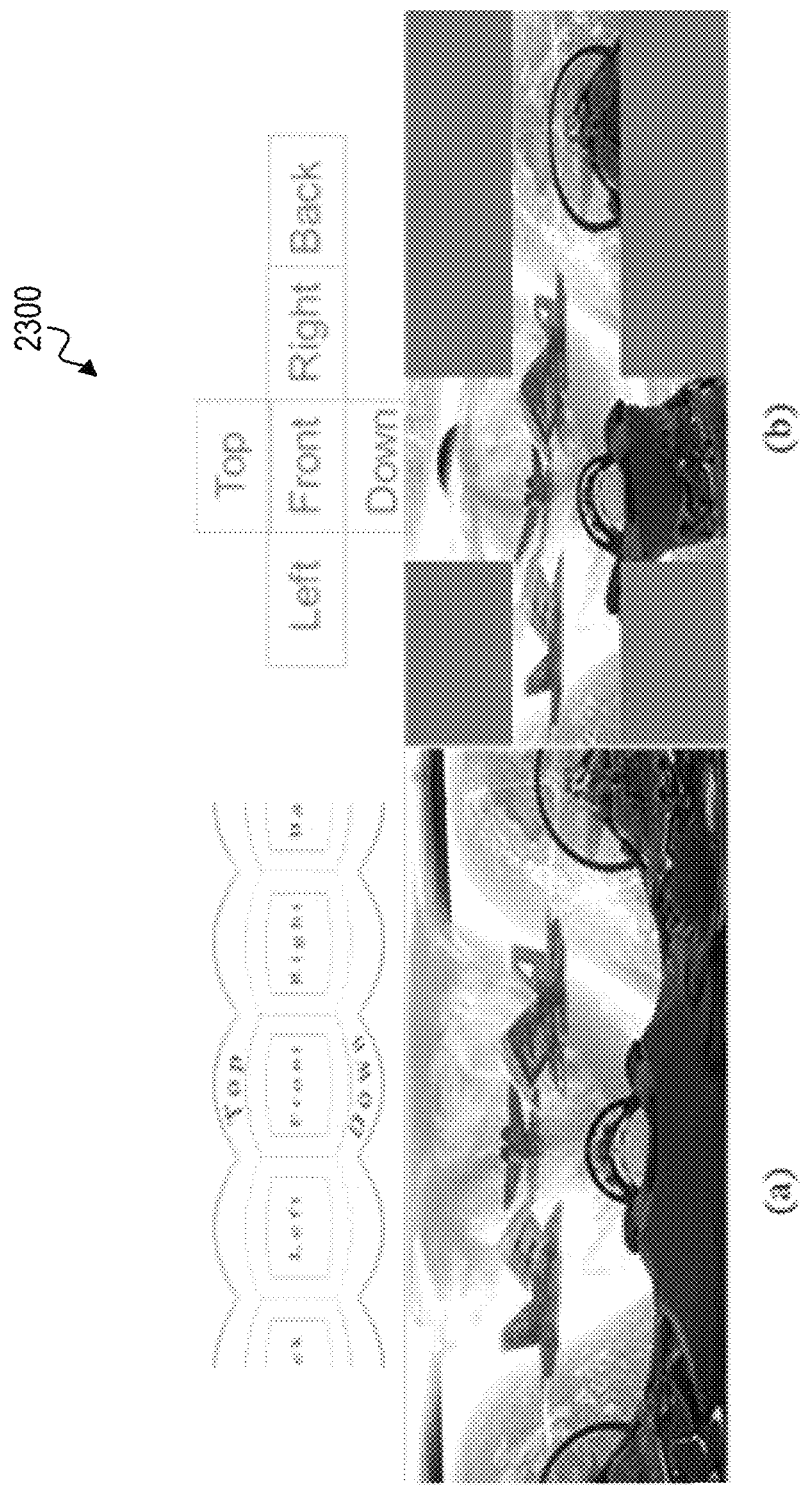
FIG. 23 conceptually illustrates examples of multiple 360 degree video projection format layouts.

FIG. 23 conceptually illustrates examples of multiple 360 degree video projection format layouts 2300. In some aspects, the 360 degree video projection format layouts 2300 include, but are not limited to: (a) equirectangular projection layout; and (b) cube projection raw layout. In 360 degree video, however, the left and right picture boundaries may belong to a same camera view. Likewise, the top and bottom picture boundary lines may be next to each other in the physical space, though they are far apart in the 360 degree video picture layouts. FIG. 23 depicts two examples. In layout example (a), both the left and right picture boundaries belong to the Back view. In layout example (b), although the left and right picture boundaries belong to different views (i.e. Left vs. Back), those two picture boundary columns actually are physically next to each other during the video capture. Therefore, for better compression efficiency of 360 degree video, it makes sense to allow loading the reference block in a "wraparound" fashion when reference pixels are outside picture boundaries as opposed to padding with the closest picture boundary pixels defined in the current UMC.

In one or more implementations, the following high-level syntax can enable the extended UMC.

TABLE 2

Extended UMC syntax

| Syntax | Bits | Semantics |
|---|---|---|
| horizontal_UMC_warparound_enabled_flag | 1 | "1" the reference block wraparound enabled in horizontal direction. "0" the reference block padding used when reference pixels outside picture boundaries |
| if (horizontal_UMC_warparound_enabled_flag) ΔW | | horizontal picture size difference between the captured picture and coded picture |
| vertical_UMC_warparound_enabled_flag | 1 | "1" the reference block wraparound enabled in vertical direction. "0" the reference block padding used when reference pixels outside picture boundaries |
| if (horizontal_UMC_warparound_enabled_flag) ΔH | | Vertical picture size difference between the captured picture and coded picture |

Note that the picture size difference (ΔW, ΔH) needs to be signaled because the coded picture size inputPicWidth×inputPicHeight usually needs to be multiple of 8 or 16 in both directions, while the captured picture may not be, which may make the picture size between the captured picture and coded picture different. The reference block wraparound is along the picture boundaries of the captured picture but NOT the coded picture.

In one or more implementations, the high-level syntax of Table 2 can be signaled either in a sequence header or in a picture header, or in both depending on implementation.

With the syntax defined above, the extended UMC can be defined as follows:

$$\text{ref Blk}[X_p, Y_p] = \text{ref Pic}[X_{cp}, Y_{cp}] \quad \text{Equation 12}$$

, where $(X_{cp}, Y_{cp})$ is computed as:

$$X_{cp} = \begin{cases} \text{clip3}(0, \text{inputPicWidth}-1, X_p) & \text{if horizontal\_UMC\_warparound\_enabled\_flag} = 0 \\ \text{warparound3}(0, \text{inputPicWidth}-1-\Delta W, X_p) & \text{Otherwise} \end{cases}$$

$$Y_{cp} = \begin{cases} \text{clip3}(0, \text{inputPicHeight}-1, Y_p) & \text{if vertical\_UMC\_warparound\_enabled\_flag} = 0 \\ \text{warparound3}(0, \text{inputPicHeight}-1-\Delta H, Y_p) & \text{Otherwise} \end{cases},$$

where clip3 ( ) is defined in Equation 11 and warparound3(0, a, x) is defined as:

$$\text{int warparound3}(0,a,x)\{\text{while}(x<0)x+=a;\text{while}(x>a) x-=a;\text{return } x;\} \quad \text{Equation 13}$$

In the current video compression standards, motion vectors can go beyond picture boundaries with a large margin. Therefore, the "while" loop in Equation 13 is included. To avoid the "while" loop, in the next-gen video compression standards, restrictions may apply on how much a reference pixel (for motion compensation) can go outside picture boundaries (e.g. by 64 or 128 or 256 pixels, etc., depending on the maximum coding block size defined in the next-gen standards). After imposing such a constraint, warparound3 (0, a, x) can be simplified as:

$$\text{int warparound3}(0,a,x)\{\text{if }(x<0)x+=a;\text{if }(x>a)x-=a; \text{return } x;\} \quad \text{Equation 14}$$

Figure 24:
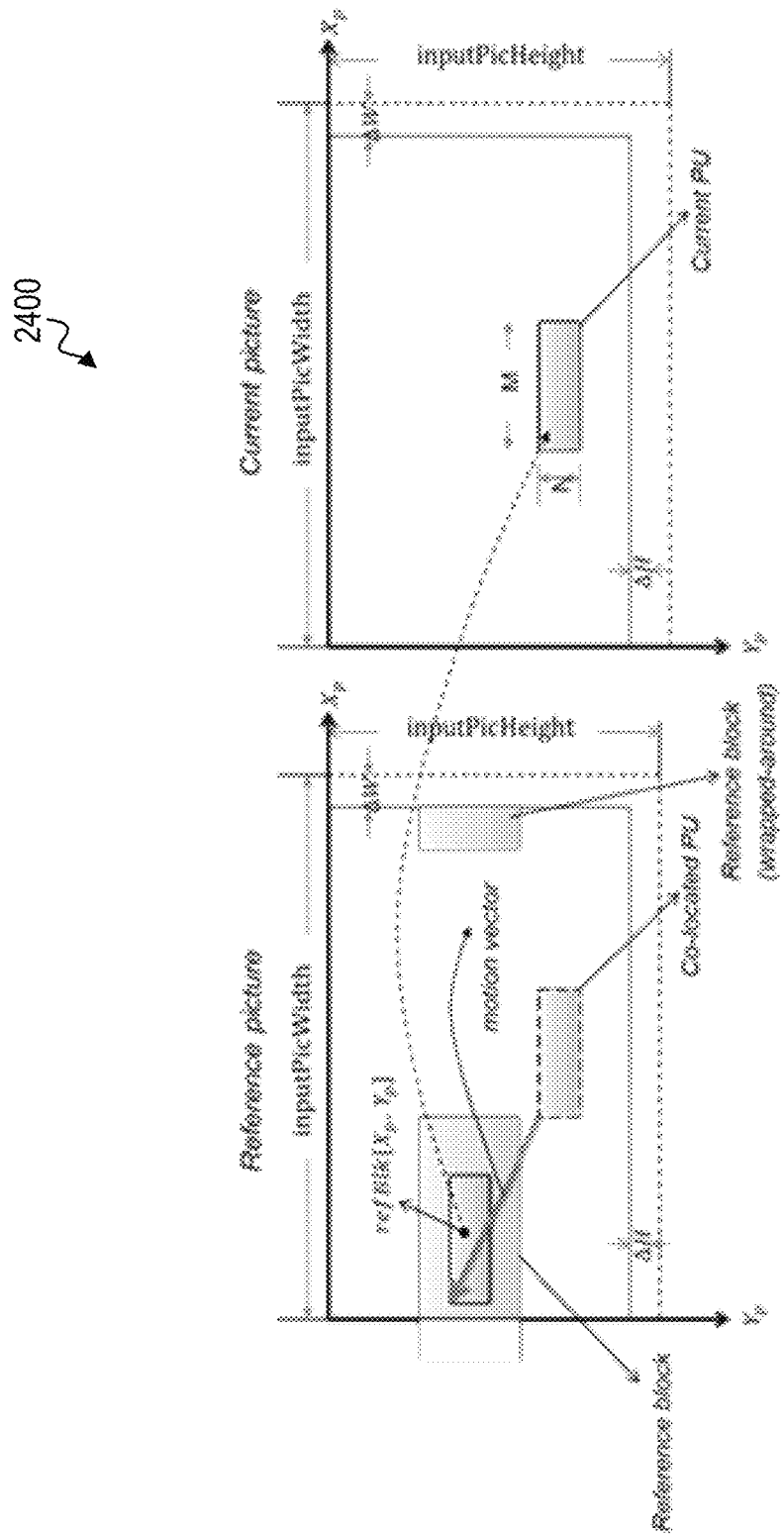
FIG. 24 conceptually illustrates an example of extended unrestricted motion compensation.

FIG. 24 conceptually illustrates an example of extended unrestricted motion compensation 2400. In FIG. 24, the reference block wraparound is enabled in a horizontal direction. Instead of padding the reference block port that is outside the left picture boundary with the picture boundary pixels, the "wrapped-around" portion along the right (captured) picture boundary is loaded.

Adaptive Projection Format

Figure 25:
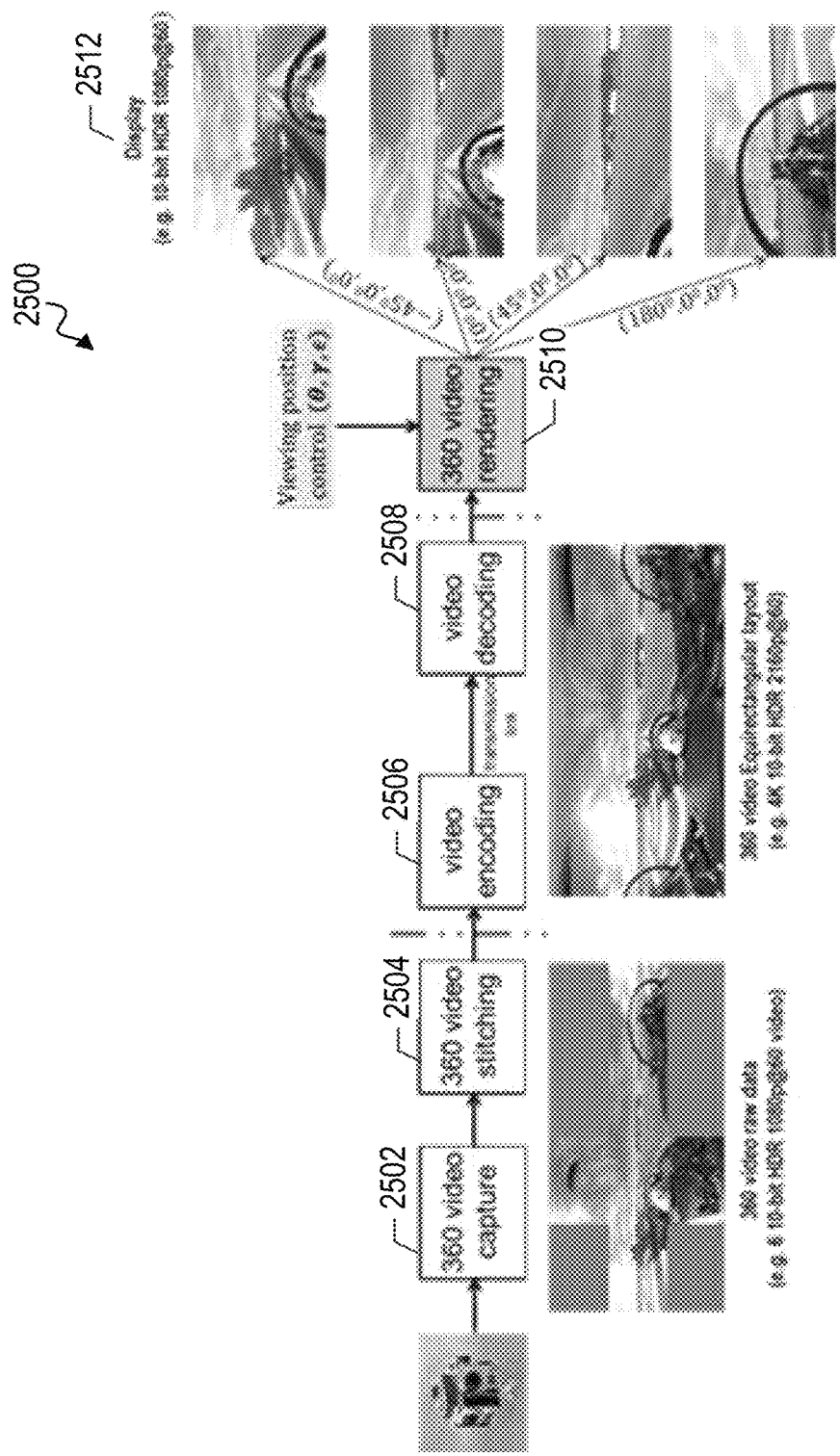
FIG. 25 illustrates a schematic diagram of another example of a 360 degree video capture and playback system.

FIG. 25 illustrates an example network environment 2500 in which 360 degree video capture and playback can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 2500 includes a 360 degree video capture device 2502, a 360 degree video stitching device 2504, a video encoding device 2506, a video decoding device 2508, and a 360 degree video rendering device 2510. In one or more implementations, one or more of the devices 2502, 2504, 2506, 2508, 2510 may be combined into the same physical device. For example, the 360 degree video capture device 2502, the 360 degree video stitching device 2504, and the video encoding device 2506 may be combined into a single device, and the video decoding device 2508 and the 360 degree video rendering device 2510 may be combined into a single device.

The network environment 2500 may further include a 360 degree video projection format decision device (not shown) that may perform projection format selection before the video stitching by the video stitching device 2504 and/or after the video encoding by the video encoding device 2506. The network environment 2500 may also include a 360 degree video playback device (not shown) that plays back the rendered 360 degree video content. In one or more implementations, the video encoding device 2506 may be communicatively coupled to the video decoding device 2508 via a transmission link, such as over a network.

In the subject system, the 360 degree video stitching device 2504 may utilize the 360 degree video projection format decision device (not shown) on the 360 degree video capture/compression side to decide which projection format (e.g. ERP (Equirectangular Projection), CMP (Cube Projection), ISP (Icosahedral Projection), etc.) is best suited for a current video segment (i.e. a group of pictures) or the current picture to achieve the best possible compression efficiency. The decision may be made based on coding statistics (such as distribution of bit-rate, intra/inter modes across the segment or picture, video quality measurement, etc.) provided by the video encoding device 2506, and/or raw data statistics (such as distribution of raw data spatial activities, etc.) obtained on raw 360 degree video camera data from the 360 degree video capture device 2502. Once the projection format is selected for the current segment or picture, the 360 degree video stitching device 2504 stiches the video into the selected projection format and delivers the stitched 360 degree video to the video encoding device 2506 for compression.

In the subject system, the selected projection format and associated projection format parameters (e.g., projection format ID, number of faces in the projection layout, face size, face coordinate offsets, face rotation angles, etc.) may be signaled in a compressed 360 degree video bitstream from the video encoding device 2506 over an appropriate means, such as in a Supplemental Enhancement Information Message (SEI), in a sequence header, in a picture header, etc. The 360 degree video stitching device 2504 may stitch the 360 degree video into different projection formats selected by the 360 degree video projection format decision device, as opposed to stitching the 360 degree video into a single and fixed projection format (e.g. ERP).

In the subject system, the 360 degree video stitching device 2504 may utilize an additional coordinate system that provides more freedom on the 360 degree video capture side when projecting captured 360 degree video to a 2D input picture coordinate system for storage or transmission. The 360 degree video stitching device 2504 may also support multiple projection formats for 360 degree video storage, compression, transmission, decoding, rendering, etc. For example, the video stitching device 2504 may remove overlapped areas captured by a camera rig, and output e.g. six view sequences that each covers a 90°×90° viewport.

The video encoding device 2506 may minimize spatial discontinuities (i.e. the number of discontinuous face boundaries) in the composed picture, for better spatial prediction thus better compression efficiency in the video compression. For the cube projection for example, a preferable layout should have the minimized number of discontinuous face boundaries, e.g. 4, within a composed 360 degree video picture. The video encoding device 2506 may implement UMC for better compression efficiency.

On the 360 degree video playback side, a 360 degree video playback device (not shown) may receive the compressed 360 degree video bitstream, and de-compress the 360 degree video bitstream. The 360 degree video playback device may render the 360 degree video of different projection formats signaled in the 360 degree video bitstream, as opposed to rendering the video in a single and fixed projection format (e.g. ERP). In this respect, the 360 degree video rendering is not only controlled by the viewing direction and FOV angles, but also controlled by the projection format information decoded from the compressed 360 degree video bitstream.

In the subject system, a system message of default (recommended) viewing direction (i.e. viewing direction angles), FOV angles, and/or rendering picture size may be signaled along with the 360 degree video content. The 360 degree video playback device may keep the rendering picture size as is, but purposely reduce the active rendering area to reduce the rendering complexity and memory bandwidth requirements. The 360 degree video playback device may store the 360 degree video rendering settings (e.g. FOV angles, viewing direction angles, rendering picture size, etc.) right before the playback is terminated or switched to other program channel, so that the stored rendering settings can be used when the playback of the same channel is resumed. The 360 degree video playback device may provide a preview mode in which the viewing angles may change automatically every N frames to help viewers to select the desirable viewing direction. The 360 degree video capture and playback device may compute the projection map on-the-fly (e.g. block by block) for saving memory bandwidth. In this instance, the projection map may not be loaded from the off-chip memory. In the subject system, different view fidelity information may be assigned to different views.

In FIG. 25, the video is captured by a camera rig, and stitched together into the equirectangular format. The video is then compressed into any suitable video compression format (e.g. MPEG/ITU-T AVC/H.264, HEVC/H.265, VP9 etc.) and transmitted via transmission link (e.g. cable, satellite, terrestrial, internet streaming, etc.). On the receiver side, the video is decoded and stored in the equirectangular format, then is rendered according to the viewing direction angles and field of view (FOV) angles, and displayed. In the system, the end-users have control of FOV and viewing direction angles in order to view the desired portion of 360 degree video at desired viewing angles.

Referring back to FIG. 2, to leverage the existing infrastructure for video delivery in which single layer video codec is employed, the 360 degree video footages captured by multiple cameras at different angles are normally stitched and composed into a single video sequence stored in a certain projection format such as the equirectangular projection format that is widely used.

In addition to the equirectangular projection format (ERP), there are many other projection formats that can represent a 360 degree video frame on a 2-D rectangular image, such as cube projection (CMP), Icosahedral projection (ISP) and fisheye projection (FISHEYE).

Figure 26:
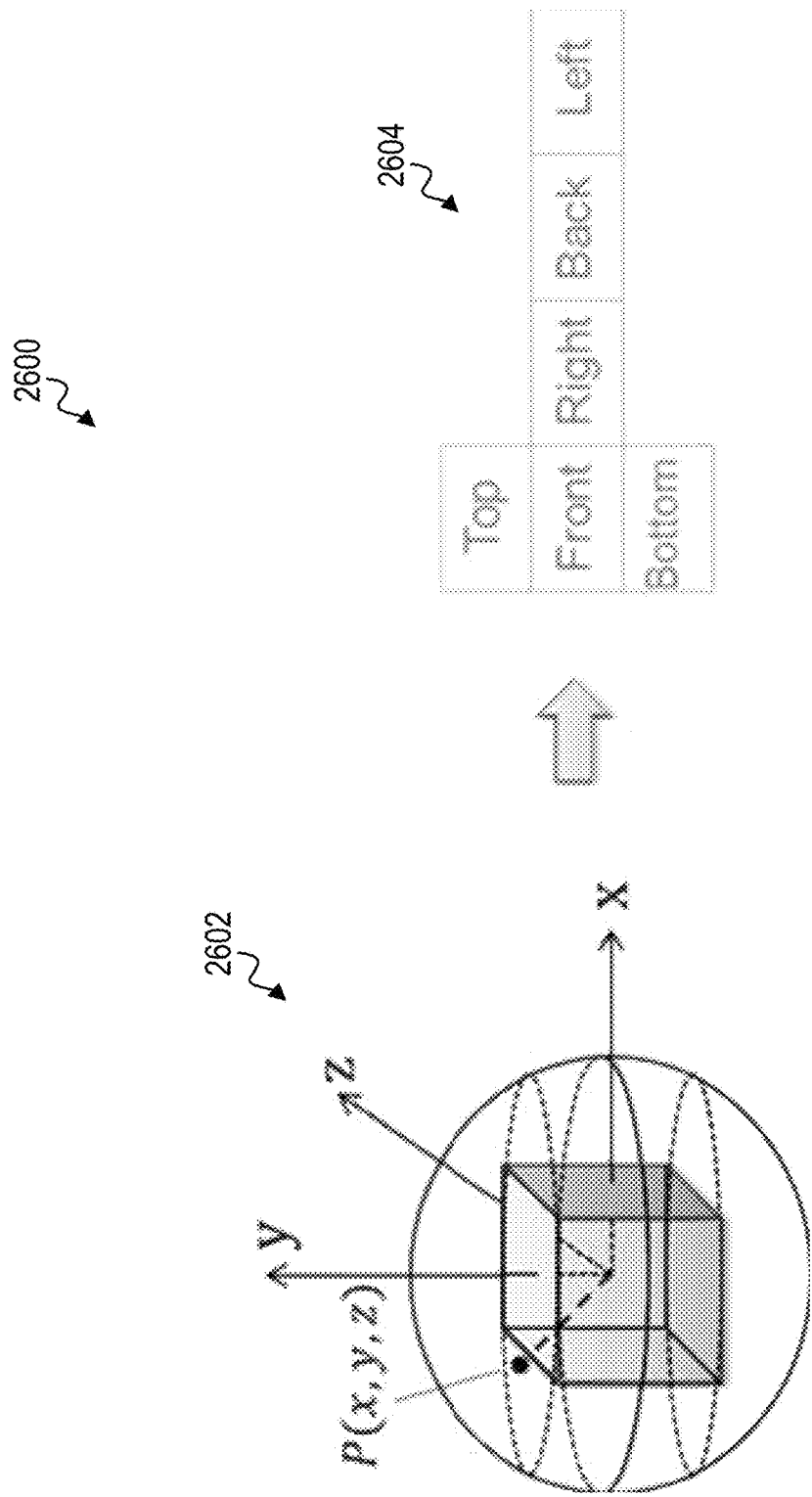
FIG. 26 conceptually illustrates an example of a cube projection format.
Figure 27:
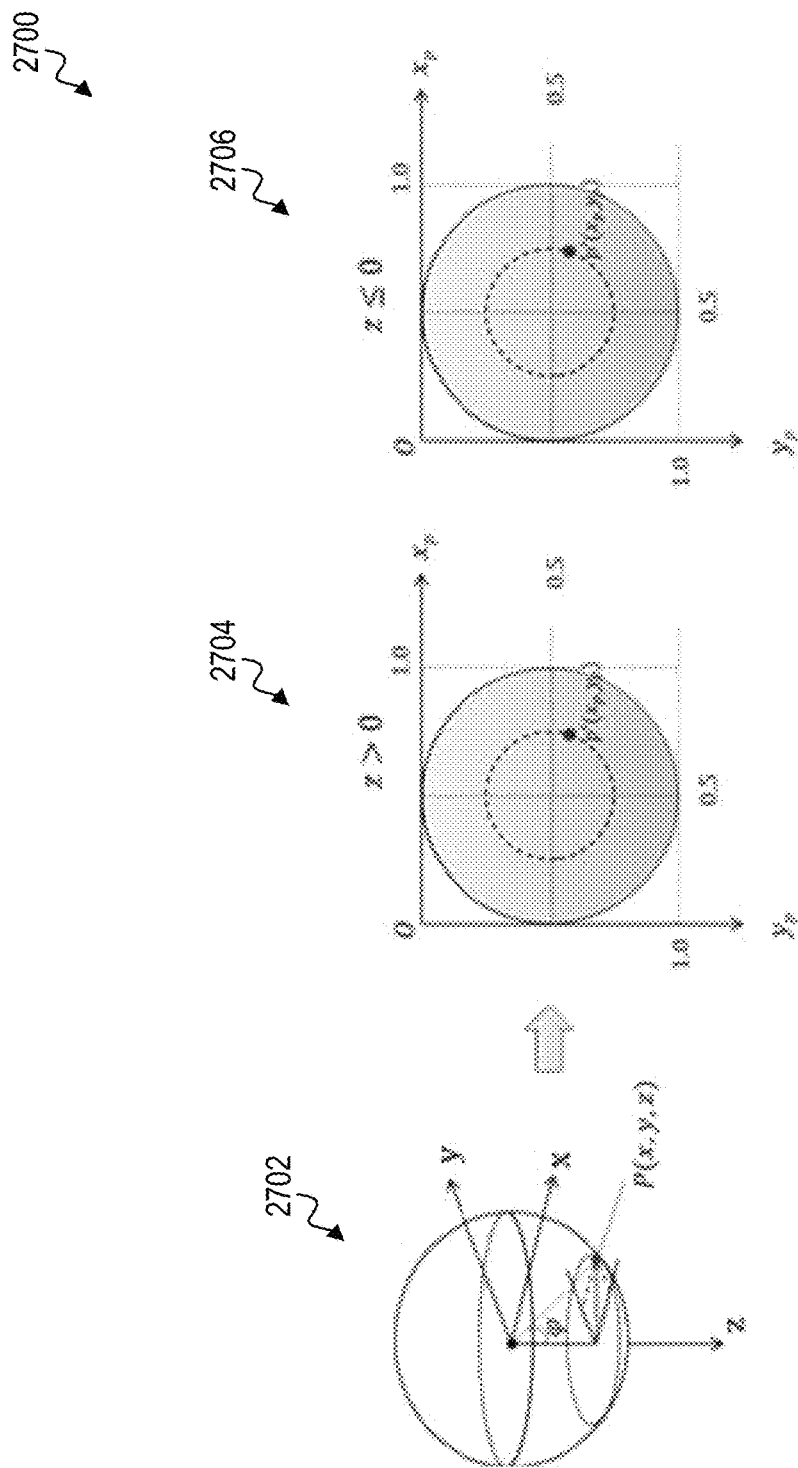
FIG. 27 conceptually illustrates an example of a fisheye projection format.
Figure 28:
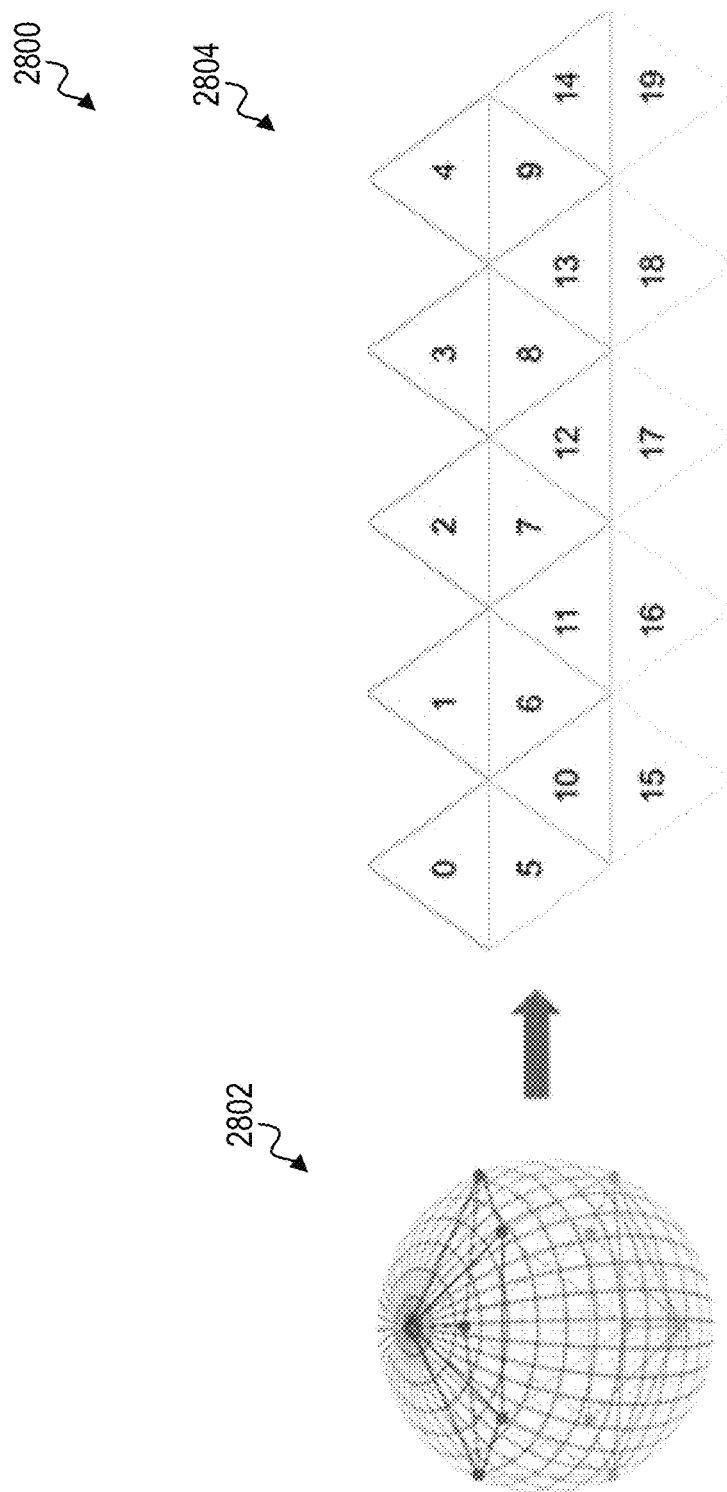
FIG. 28 conceptually illustrates an example of an icosahedral projection format.
Figure 29:
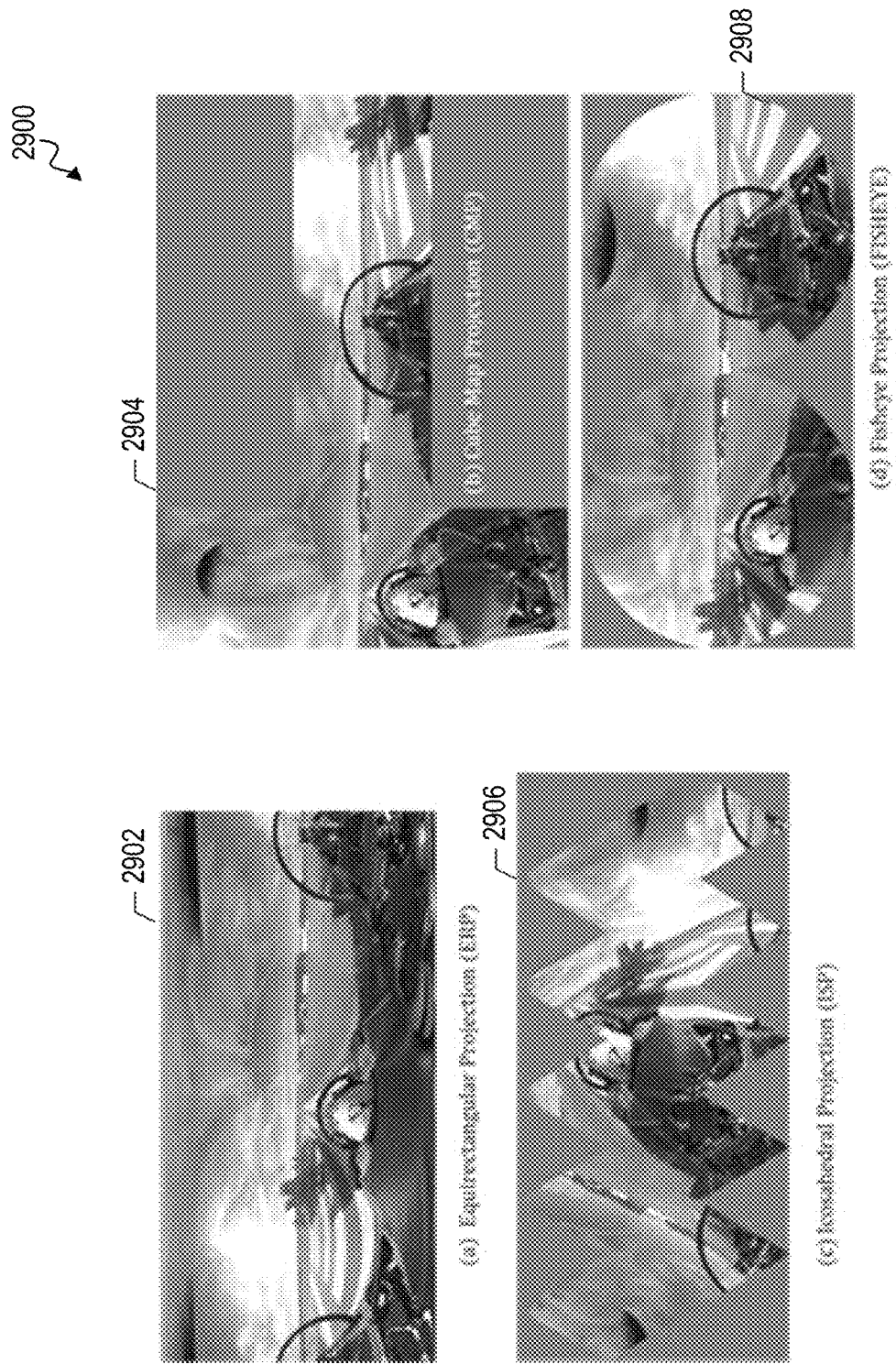
FIG. 29 illustrates a schematic diagram of an example of a 360 degree video in multiple projection formats.

FIG. 26 conceptually illustrates an example of a cube projection format. As shown in FIG. 26, in CMP a sphere surface (e.g., 2602) is projected to six cube faces (i.e. top, front, right, back, left and bottom) (e.g., 2604), each face convers 90×90 degree field of view, and six cube faces are composed into a single image. FIG. 27 conceptually illustrates an example of a fisheye projection format. In fisheye projection, a sphere surface (e.g., 2702) is projected to two cycles (e.g., 2704, 2706); each cycle covers 180×180 degree field of view. FIG. 28 conceptually illustrates an example of an icosahedral projection format. In ISP, a sphere is mapped to a total of 20 triangles that are composed into a single image. FIG. 29 illustrates a schematic diagram of an example of a 360 degree video 2900 in multiple projection formats. For example, layout (a) of FIG. 29 depicts the ERP projection format (e.g., 2902), layout (b) of FIG. 29 depicts the CMP projection format (e.g., 2904), layout (c) of FIG. 29 depicts the ISP projection format (e.g., 2906), and layout (d) of FIG. 29 depicts the FISHEYE projection format (e.g., 2908).

For a same 360 degree video content, different projection formats may lead to different compression efficiency after the video is compressed with e.g. MPEG/ITU AVC/H.264 or MPEG/ITU MPEG HEVC/H.265 video compression standard. Table 1 provides the BD-rate difference between the ERP and CMP for twelve 4K 360 degree video test sequences. The PSNR and BD-rate difference are computed in the CMP domain, in which negative numbers mean better compression efficiency of using ERP, and positive numbers mean better compression efficiency of using CMP. Table 3 illustrates experimental results on compression efficiency of ERP relative to CMP with the MPEG/ITU MPEG HEVC/H.265 reference software HM16.9, for example.

TABLE 3

Compression Efficiency of ERP relative to CMP

| | All lintra (AI) | | | Random Access (RA) | | | Low-delay (LD-B) | | | Low-Delay P (LD-P) | | |
|---|---|---|---|---|---|---|---|---|---|---|---|---|
| Sequence | Y | U | V | Y | U | V | Y | U | V | Y | U | V |
| BearAttack-left | 1.7% | 14.2% | 12.6% | 0.3% | 14.4% | 12.0% | 3.4% | 25.2% | 21.0% | 3.5% | 25.6% | 21.5% |
| GT_Sheriff-left | 13.9% | 41.5% | 40.0% | 0.7% | 21.2% | 20.3% | −18.1% | −4.6% | −4.5% | −18.6% | −4.9% | −5.0% |
| LRRH-left | −6.7% | 10.4% | 12.5% | −8.8% | 6.8% | 10.1% | −15.3% | 10.8% | 16.6% | −16.4% | 9.5% | 15.9% |
| abyss_great_shark_vr | −15.8% | −8.9% | −15.4% | −11.5% | −10.8% | −15.7% | −12.9% | −10.2% | −15.0% | −13.4% | −10.1% | −14.9% |
| bicyclist | −7.0% | 20.3% | 19.3% | 10.3% | 28.9% | 28.0% | −0.6% | 10.4% | 10.7% | −4.0% | 8.1% | 8.2% |
| glacier | −2.6% | 6.5% | 4.8% | 12.1% | 22.0% | 20.4% | 7.3% | 17.8% | 21.4% | 3.8% | 17.6% | 19.0% |
| paramotor_training | −0.2% | 7.4% | 8.6% | −5.6% | 1.3% | 5.0% | −11.5% | −3.5% | −1.9% | −12.1% | −3.8% | −0.7% |
| skateboarding | −4.8% | 6.3% | 2.1% | −7.2% | 4.9% | 2.2% | −9.5% | 3.1% | −0.6% | −9.5% | 5.0% | 1.5% |
| timelapse_basejump | 6.1% | 8.9% | 6.6% | 1.6% | 5.1% | 4.5% | −1.3% | 2.1% | 0.3% | −2.1% | 1.6% | 1.2% |
| timelapse_building | −0.8% | 15.2% | 17.0% | 3.4% | 20.7% | 23.8% | 2.0% | 21.9% | 26.2% | 1.8% | 24.5% | 30.8% |
| Stitched_left_Dancing | −1.9% | 9.3% | 9.0% | −5.9% | 5.8% | 3.6% | −6.1% | 4.5% | 4.4% | −6.5% | 4.4% | 3.2% |
| Stitched_left_Driving | −4.4% | 9.7% | 10.7% | −25.5% | −5.6% | −5.8% | −24.6% | −12.5% | −9.9% | −25.6% | −12.0% | −9.6% |
| Average | −1.9% | 11.7% | 10.6% | −3.0% | 9.5% | 9.0% | −7.3% | 5.4% | 5.7% | −8.3% | 5.4% | 5.9% |

As shown in Table 3, although using ERP results in better compression efficiency overall, there are other cases (e.g. GT_Sheriff-left, timelapse_basejump) in which using CMP leads to more positive results. Therefore, it is desirable to be able to change the projection format from time to time to best fit with the characteristics of the 360 degree video content so as to achieve best possible compression efficiency.

Figure 30:
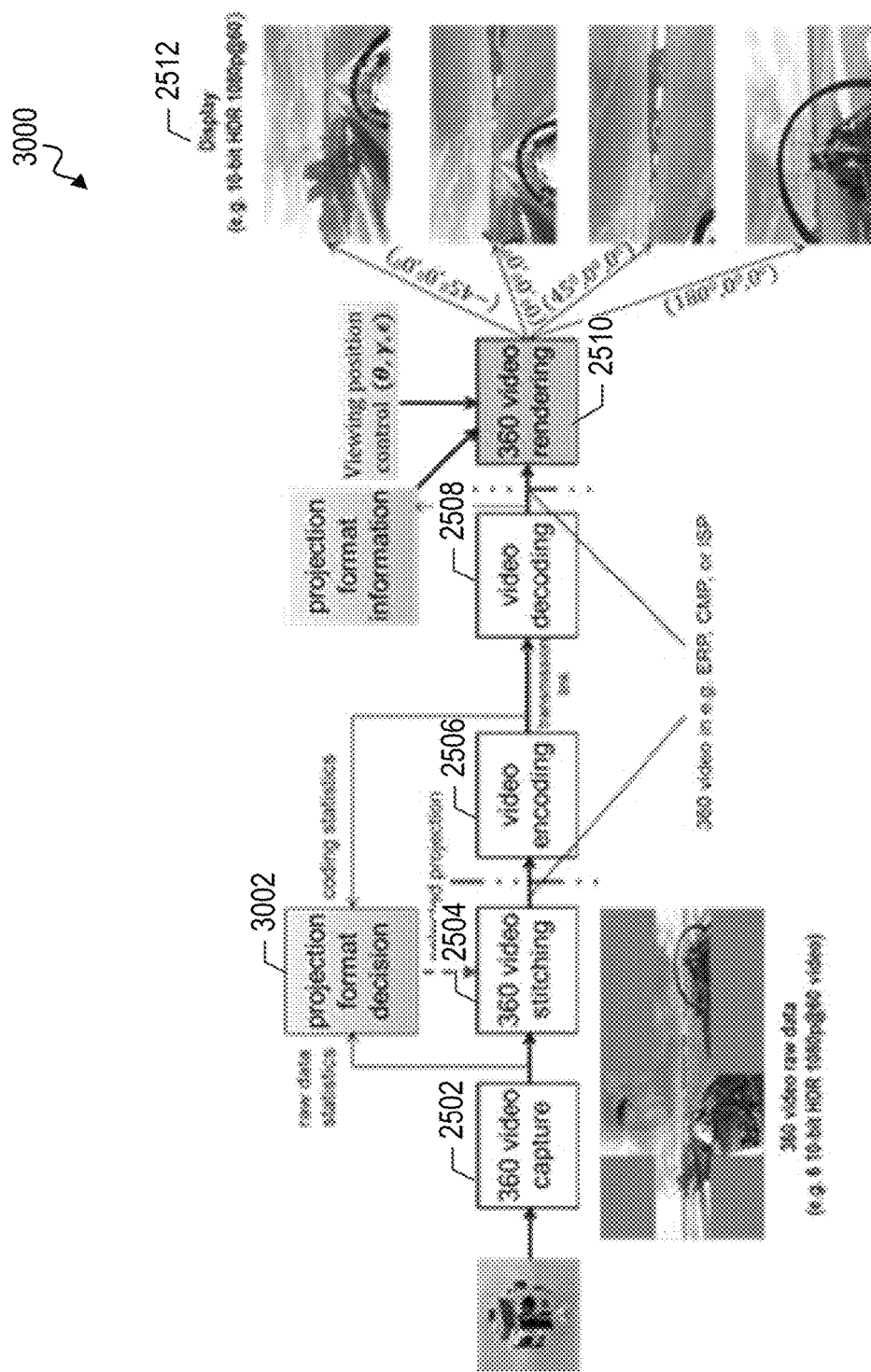
FIG. 30 illustrates a schematic diagram of an example of a 360 degree video capture and playback system with adaptive projection format.

FIG. 30 illustrates a schematic diagram of an example of a 360 degree video capture and playback system 3000 with adaptive projection format. In order to maximize the compression efficiency for 360 degree video, an adaptive method that can compress 360 degree video into mixed projection formats may be implemented. As shown in FIG. 30, a projection format decision block (e.g., 3002) is employed on the 360 degree video capture/compression side to decide which projection format (e.g. ERP, CMP, ISP, etc.) is best suited for the current video segment (i.e. a group of pictures) or the current picture to achieve the best possible compression efficiency. The decision can be made based on coding statistics (such as distribution of bit-rate, intra/inter modes across the segment or picture, video quality measurement, etc.) provided by the video encoder (e.g., 2506), and/or raw data statistics (such as distribution of raw data spatial activities, etc.) obtained on the raw 360 degree video camera data. Once the projection format is selected for the current segment or picture, the 360 degree video stitching block (e.g., 2504) stiches the video into the selected projection format and delivers the stitched 360 degree video to the video encoder (e.g., 2506) for compression.

The selected projection format and associated projection format parameters (such as projection format ID, number of faces in the projection layout, face size, face coordinate offsets, face rotation angles, etc.) are signaled in the compressed bitstream with any appropriate means such as in a SEI (Supplemental Enhancement Information) message, in a sequence header, in a picture header, etc. Different from the system illustrated in FIG. 25, the 360 degree video stitching block (e.g., 2504) is capable of stitching the 360 degree video into different projection formats selected by the projection format decision block (e.g., 3002), as opposed to stitching the video into a single and fixed projection format (e.g. ERP).

On the 360 degree video playback side, the receiver (e.g., 2508) receives the compressed 360 degree video bitstream, and de-compresses the video stream. Different from the system illustrated in FIG. 25, the 360 degree video rendering block (e.g., 2510) is capable of rendering 360 degree video of different projection formats signaled in the bitstream, as opposed to rendering the video in a single and fixed projection format (e.g. ERP). That is, the 360 degree video rendering is not only controlled by the viewing direction and FOV angles, but also controlled by the projection format information decoded from the bitstream.

Figure 31:
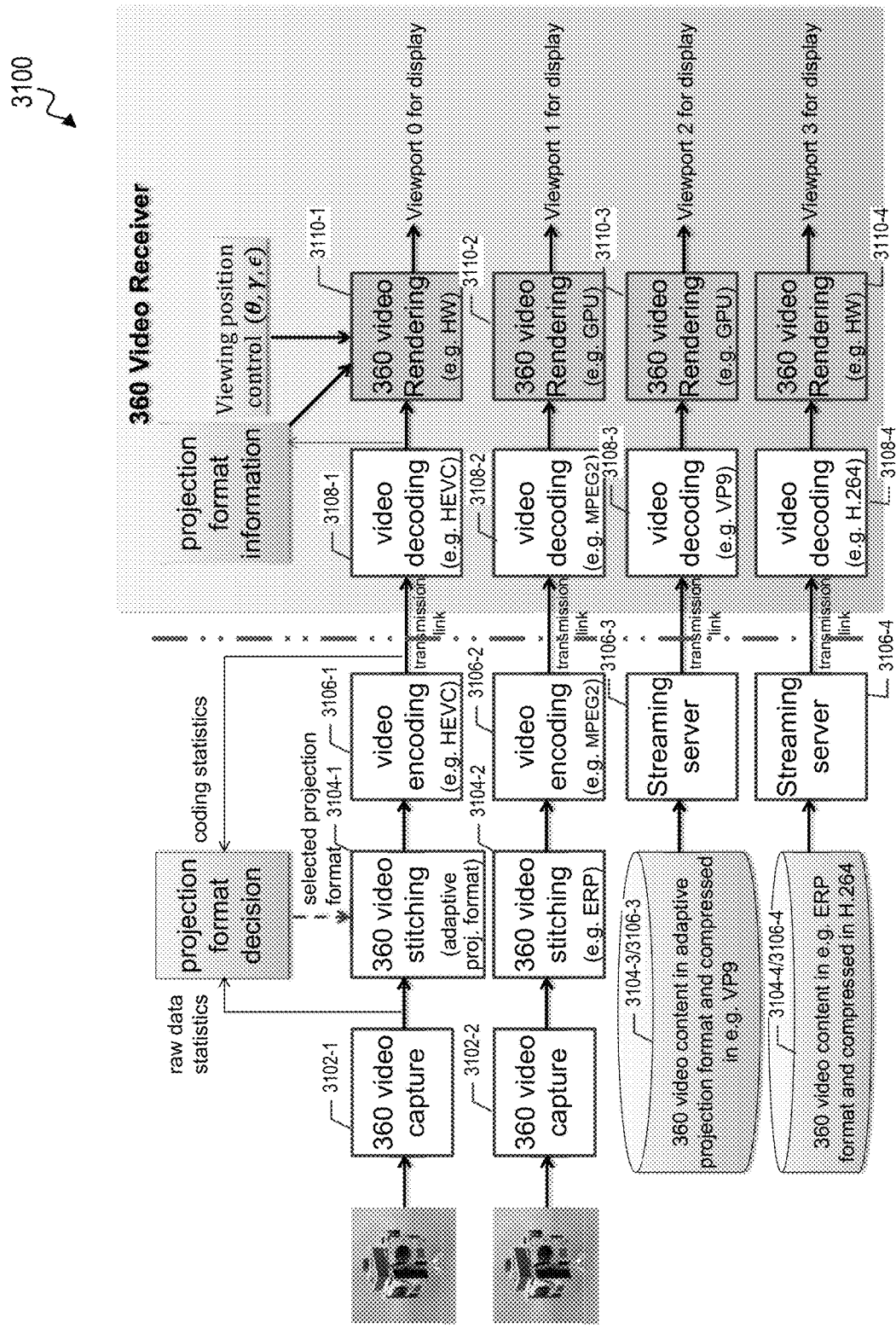
FIG. 31 illustrates a schematic diagram of another example of a 360 degree video capture and playback system with adaptive projection format.

FIG. 31 illustrates a schematic diagram of another example of a 360 degree video capture and playback system with projection format adaptation from multiple sources over multiple channels. In FIG. 31, the 360 degree video capture and playback system 3100 is capable of e.g. doing four channels of 360 degree video decoding and rendering in parallel, the 360 degree video inputs may come from different sources (e.g., 3102-1, 3102-2, 3102-3, 3102-4), in different projection formats (e.g., 3104-1, 3104-2, 3104-3, 3104-4) and compression formats (e.g., 3106-1, 3106-2, 3106-3, 3106-4), and in different fidelity (e.g. picture resolution, frame-rate, bit-rate, etc.).

In one or more implementations, channel 0 may be live video in adaptive projection formats and compressed with HEVC. In one or more implementations, channel 1 may be live video in fixed ERP format and compressed with MPEG-2. In one or more implementations, channel 2 may be 360 degree video content is in adaptive projection format and compressed with VP9, but pre-stored on server for streaming. In one or more implementations, channel 3 may be 360 degree video content is in fixed ERP format and compressed with H.264, but pre-stored on server for streaming.

For video decoding, the decoders (e.g., 3108-1, 3108-2, 3108-3, 3108-4) are capable of decoding video in different compression formats, and decoders may be implemented in hardware (HW), or with programmable processors (SW), or in a mix of HW/SW.

For 360 video rendering, the rendering engines (e.g., 3110-1, 3110-2, 3110-3, 3110-4) are capable of performing viewport rendering from input 360 degree video of different projection formats (e.g. ERP, CMP, etc.) based on the viewing direction angles, FOV angles, input 360 degree video picture size, output view port picture size, global rotation angles, etc.

The rendering engines may be implemented in hardware (HW), or with programmable processors (e.g. GPUs), or in a mix of HW/SW. In some aspects, a same video decoder output may be fed into multiple rendering engines so that multiple viewports are rendered from a same 360 video input for display.

Figure 32:
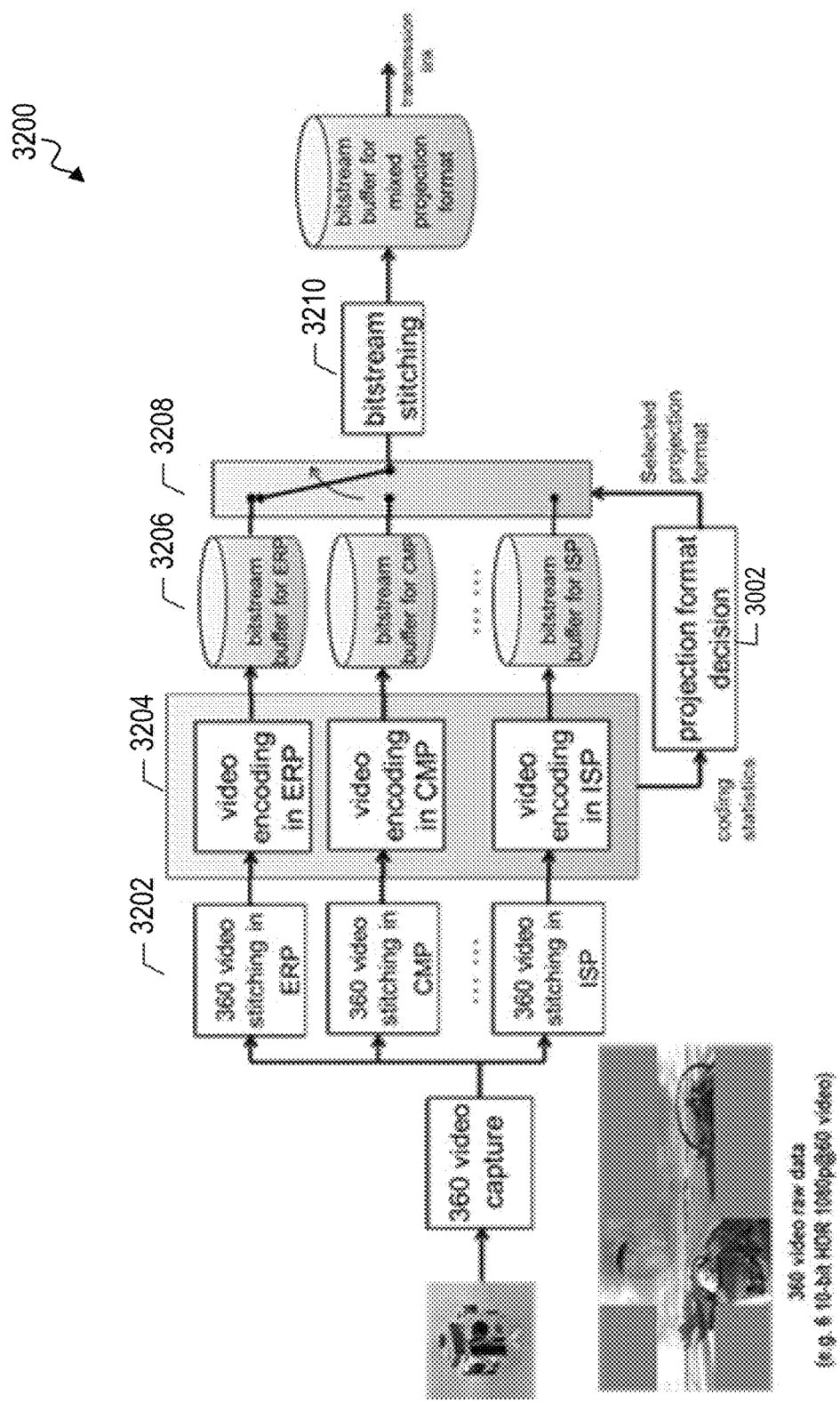
FIG. 32 illustrates a schematic diagram of an example of projection format decision.

FIG. 32 illustrates a schematic diagram of an example of projection format decision 3200. While 360 degree video playback (de-compression plus rendering) is relatively fixed, there are multiple ways of producing 360 degree video compressed video stream, which has the maximum compression efficiency by adaptively changing projection format from time to time. FIG. 32 provides an example of how the projection format decision (e.g., 3002) may be produced. In this example, a 360 degree video content is provided in multiple projection formats such as ERP, CMP and SP (e.g., 3202), the video in different formats are compressed (e.g., 3204) with a same type of video encoder (such as MPEG/ITU-T HEVC/H.265) and compressed bitstreams are stored (e.g., 3206). After encoding a segment or a picture of different projection formats, the rate-distortion costs (such as PSNR numbers of a same bit-rate, or bit-rate for a same quality, or a combined metric) can be measured for the segment or picture of those projection formats. After the projection format decision (e.g., 3002) is made based on the rate-distortion costs for the current segment or picture, the corresponding bitstream of the selected format is chosen (e.g., 3208) and stitched into the bitstream of mixed projection format (e.g., 3210) for the segment or picture. Note that in this system the projection format can be changed from video segment to segment (a group of pictures) or from picture to picture.

Figure 33:
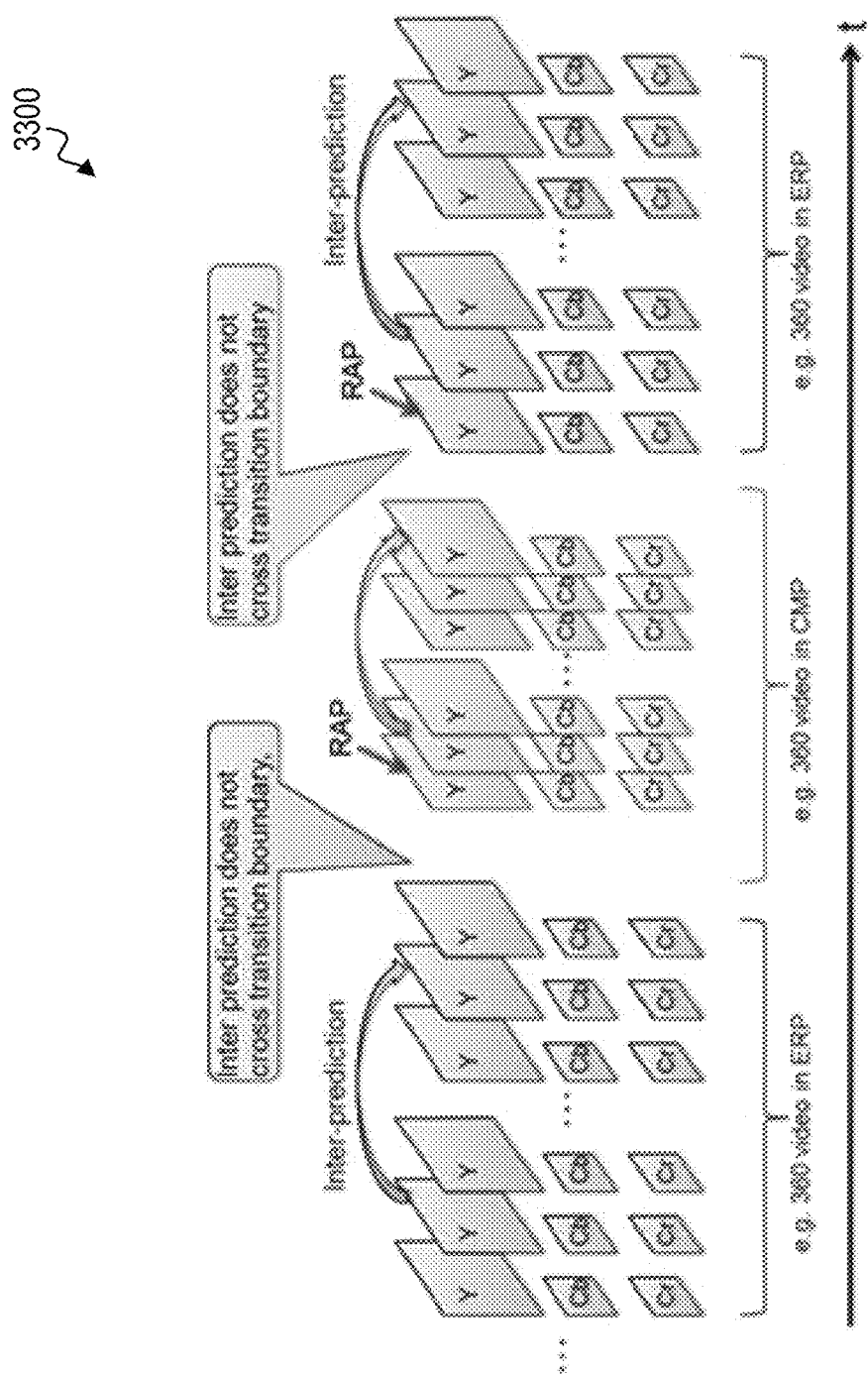
FIG. 33 conceptually illustrates an example of a project format transition excluding inter-prediction across projection format transition boundaries.

FIG. 33 conceptually illustrates an example of a project format transition 3300 excluding inter-prediction across projection format transition boundaries. To support 360 degree video of mixed projection format with the existing video compression standards such as MPEG/ITU AVC/H.264, MPEG/ITU HEVC/H.265 and Google VP9, a restriction has to be imposed on how frequently the projection format can be changed. As shown in FIG. 33, the projection format transition 3300, such as from ERP to CMP, or from CMP to ERP in this example, can only happen at the Random Access Points (RAPs), so that inter-prediction may not need to cross a projection format transition boundary. A RAP may be led by an Instantaneous Decoding Refresh (IDR) picture, or other type of pictures that provide the random access functionality. In FIG. 33, the projection format can only change from video segment to video segment, not from picture to picture unless a segment itself is just a picture.

Figure 34:
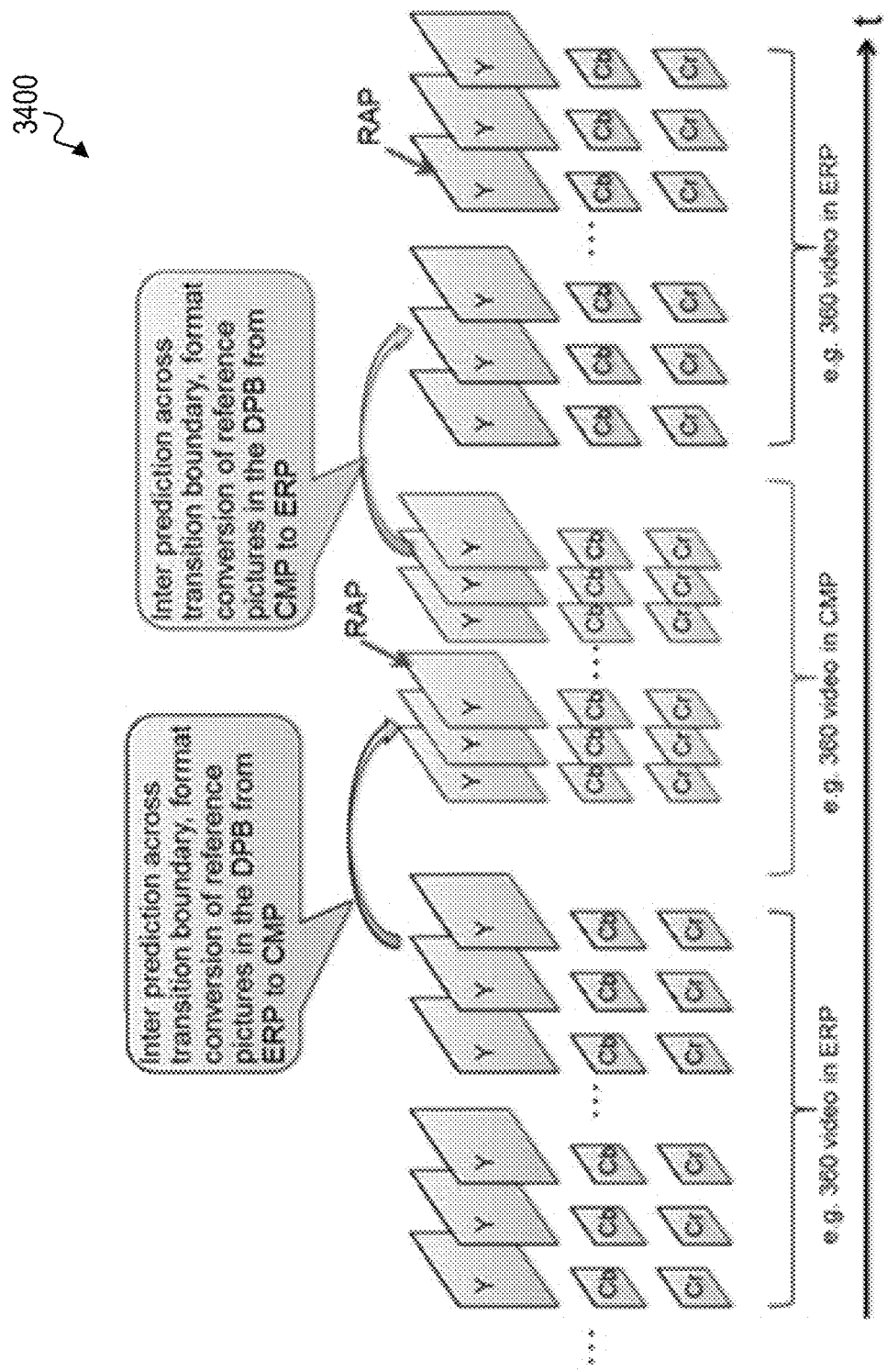
FIG. 34 conceptually illustrates an example of a project format transition with inter-prediction across projection format transition boundaries.

FIG. 34 conceptually illustrates an example of a project format transition 3400 with inter-prediction across projection format transition boundaries. The projection format can also change from picture to picture if the inter-prediction can cross projection format transition boundaries. For a same 360 degree video content, different projection formats may lead to not only different content in picture but also different picture resolution after 360 degree video stitching. As shown in FIG. 34, the projection format conversion (e.g., 3400) of reference pictures in DPB (decoded picture buffer) may be used to support the inter-prediction across a projection format boundary. The projection format conversion may convert a 360 degree video reference picture in the DBP from one format (e.g. ERP) to the projection format (e.g. CMP) and picture resolution of the current picture. The conversion may be implemented in a picture-based manner in which reference pictures in the projection format of the current picture are converted and pre-stored, or be implemented on-the-fly block by block based in the block size, location and motion data of the current prediction block in the current picture. In FIG. 34, the projection format may only change from picture to picture, but requires the reference picture projection format conversion, a tool that may be supported in the future video compression standards.

Suggested Views

A number of services such as YouTube, Facebook, etc. . . . have begun to provide 360° video sequences recently. These services allow the user to look around the scene in all directions while the video is playing. The user can rotate the scene to view anything they find interesting at a given time.

There are a number of formats used for 360° video, but each involves some projection of a 3D surface (sphere, cube, octahedron, icosahedron, etc. . . . ) onto a 2D plane. The 2D projection is then encoded/decode like any normal video sequence. At the decoder, a portion of that 360° view is rendered and displayed, depending on the user's angle of view at that time.

The end result is that the user is given the freedom to look everywhere around them which greatly increases the immersive feeling, making it feel as if they were in the scene. Combined with spatial audio effects (rotating the audio surround sound to match the video), the effect can be quite engaging.

Figure 35:
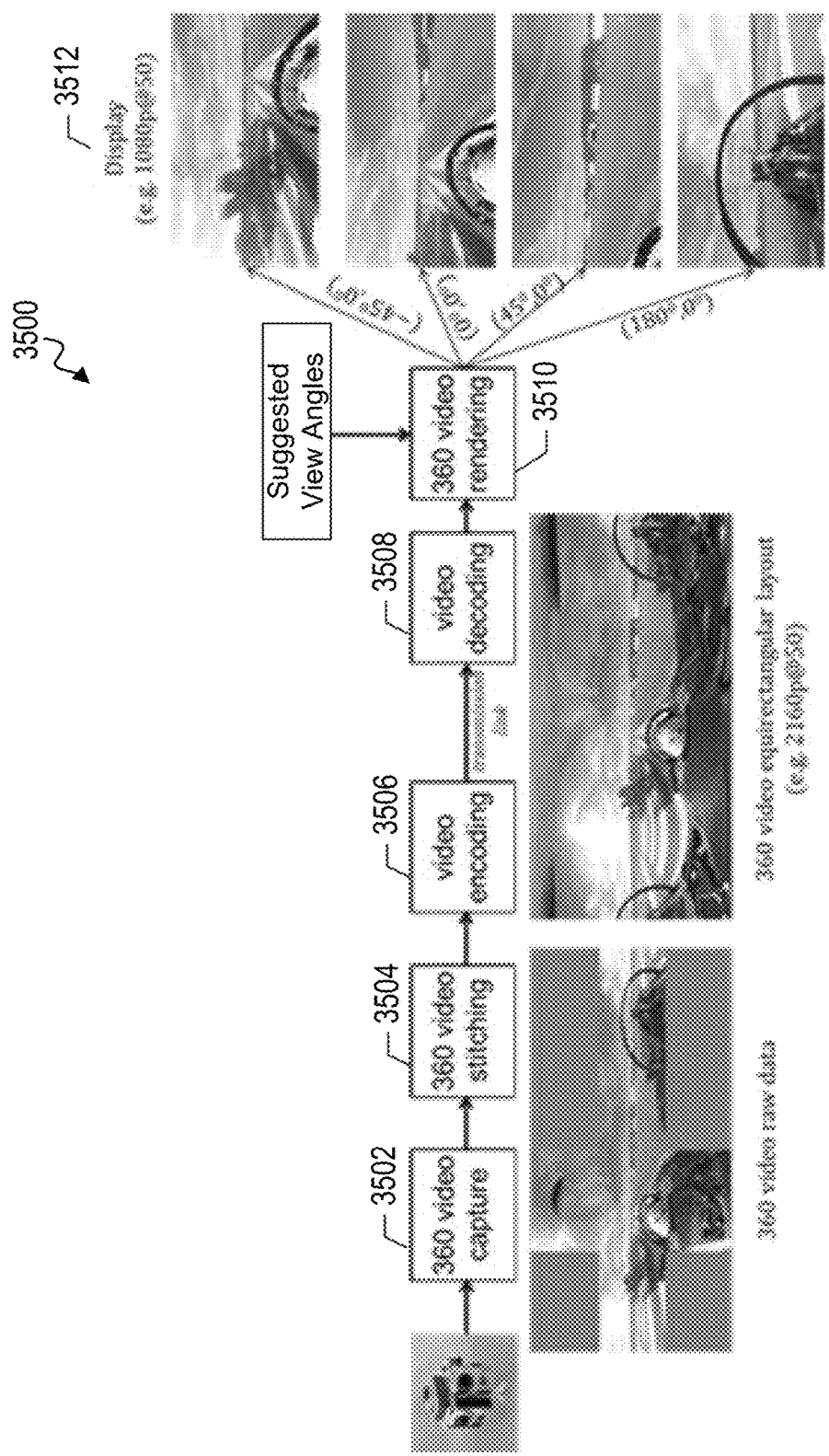
FIG. 35 illustrates an example network environment 3500 in which suggested views within 360 degree video can be implemented in accordance with one or more implementations.

FIG. 35 illustrates an example network environment 3500 in which suggested views within 360 degree video can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 3500 includes a 360 video capture device 3502, a 360 video stitching device 3504, a video encoding device 3506, a video decoding device 3508, and a 360 video rendering device 3510. In one or more implementations, one or more of the devices 3502, 3504, 3506, 3508, 3510 may be combined into the same physical device. For example, the 360 video capture device 3502, the 360 video stitching device 3504, and the video encoding device 3506 may be combined into a single device, and the video decoding device 3508 and the 360 video rendering device 3510 may be combined into a single device. The video decoding device 3508 may include an audio decoding device (not shown) in some embodiments, or the video decoding device 3508 may be communicably coupled to a separate audio decoding device in other embodiments, for processing an incoming or stored 360 video compressed bitstream.

On the 360 video playback side, the network environment 3500 may further include a demultiplexer device (not shown) that may demultiplex the incoming compressed 360 video bitstream, and provide the demultiplexed bitstream respectively to the video decoding device 3508, the audio decoding device and a view angle extraction device (not shown). In some aspects, the demultiplexer device may be configured to de-compress the 360 video bitstream. The network environment 3500 may further include a 360 video projection format conversion device (not shown) that may perform 360 video projection format conversion before the video encoding by the video encoding device 3506 and/or after the video decoding by the video decoding device 3508. The network environment 3500 may also include a 360 video playback device (not shown) that plays back the rendered 360 video content. In one or more implementations, the video encoding device 3506 may be communicatively coupled to the video decoding device 3508 via a transmission link, such as over a network.

The 360 video playback device may store the 360 video rendering settings (e.g. FOV angles, viewing direction angles, rendering picture size, etc.) right before the playback is terminated or switched to other program channel, so that the stored rendering settings can be used when the playback of the same channel is resumed. The 360 video playback device may provide a preview mode in which the viewing angles may change automatically every N frames to help viewers to select the desirable viewing direction. The 360 video capture and playback device may compute the projection map on-the-fly (e.g. block by block) for saving memory bandwidth. In this instance, the projection map may not be loaded from the off-chip memory. In the subject system, different view fidelity information may be assigned to different views.

In the subject system, content providers may provide a "suggested view" for a given 360 degree video. This suggested view can be a specific set of viewing angles for each frame of the 360 degree video to provide the user with a recommended experience. In the event that the user isn't particularly interested in controlling the view themselves at any given point in time, the user can watch (or play back) the suggested view and experience the view recommended by the content provider.

In the subject system, in order to efficiently store data needed to record/playback the decompressed 360 video bitstream in a specific view as it was originally watched by a user during a specific viewing or viewings, the "yaw", "pitch", and "roll" angles (view angle data) can be saved in the storage device for each frame. Combined with the original full 360 degree view data already recorded, a previously saved view can be recreated.

Depending on how the view angles are stored, a corresponding view angle extraction process may be initiated. In one or more implementations where the view angles are stored within the compressed 360 video bitstream, the view angle extraction process may be used. For example, the video decoding device 3508 and/or the audio decoding device may extract view angles from the compressed 360 video bitstream (e.g., from the SEI messages within an HEVC bitstream). In this respect, the view angles extracted by the video decoding device 3508 may then be provided to the video rendering device 3510. If the view angles are stored in a separate stream of data (e.g., MPEG-2 TS PID), the demultiplexer device may extract this information and send it to the video rendering device 3510 as suggested view angles. In some examples, the demultiplexer feeds to a separate view angle extraction device (not shown) for extraction of the suggested view angles. In this respect, the subject system would have the ability to switch between the suggested view and the manually selected user view at any time.

Switching between the suggested view and the manual view may include prompting the user to provide a user selection (e.g., pushing a button) to enter/exit this mode. In one or more implementations, the subject system may perform the switching automatically. For example, if the user manually moves the view (with the mouse, remote control, hand gestures, headset, etc. . . . ), then the view is updated to follow the user's request. If the user stopped making manual adjustments for a set amount of time, the view may drift back to the suggested view.

In one or more implementations, multiple suggested views can be provided if appropriate and/or more than one suggested view may be rendered at a time. For example, for a football game, one view may track the quarterback, and other views may track the wide-receivers. Using the football example above, the user may have a split screen with 4 views at a time. Alternatively, different views may be used to track specific cars during a NASCAR racing event. The user may select from among these suggested views to customize their experience without needing to fully control the view the whole time.

If a suggested view is not available or appropriate for the entire scene, suggestions (or recommendations) may be given to try to ensure the viewer doesn't miss important action. A hint view (or preview) may be provided at the start of a new scene. The view may then be shifted to look at the hint angle in order to center the view on the main action. In one or more implementations, if the user desires to be less direct (or independent), on-screen graphic arrows may be used to indicate that the user may be facing the wrong way and missing out on something interesting.

Figure 36:
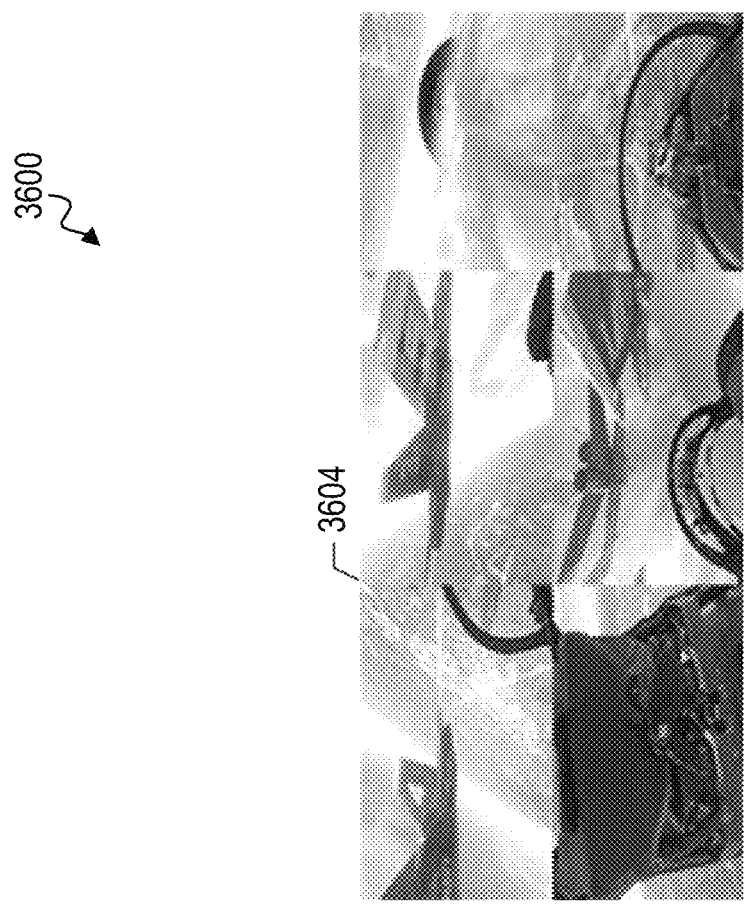
FIG. 36 conceptually illustrates examples of equirectangular and cubic projection.
Figure 36:

Two of the most common types of projection are equirectangular projection, and cube projection. These map video from a sphere (equirectangular) and a cube (cubic) onto a flat 2D plane. Examples are shown in FIG. 36, which illustrates examples of equirectangular projection (e.g., 3602) and cubic projection (e.g., 3604).

Figure 37:
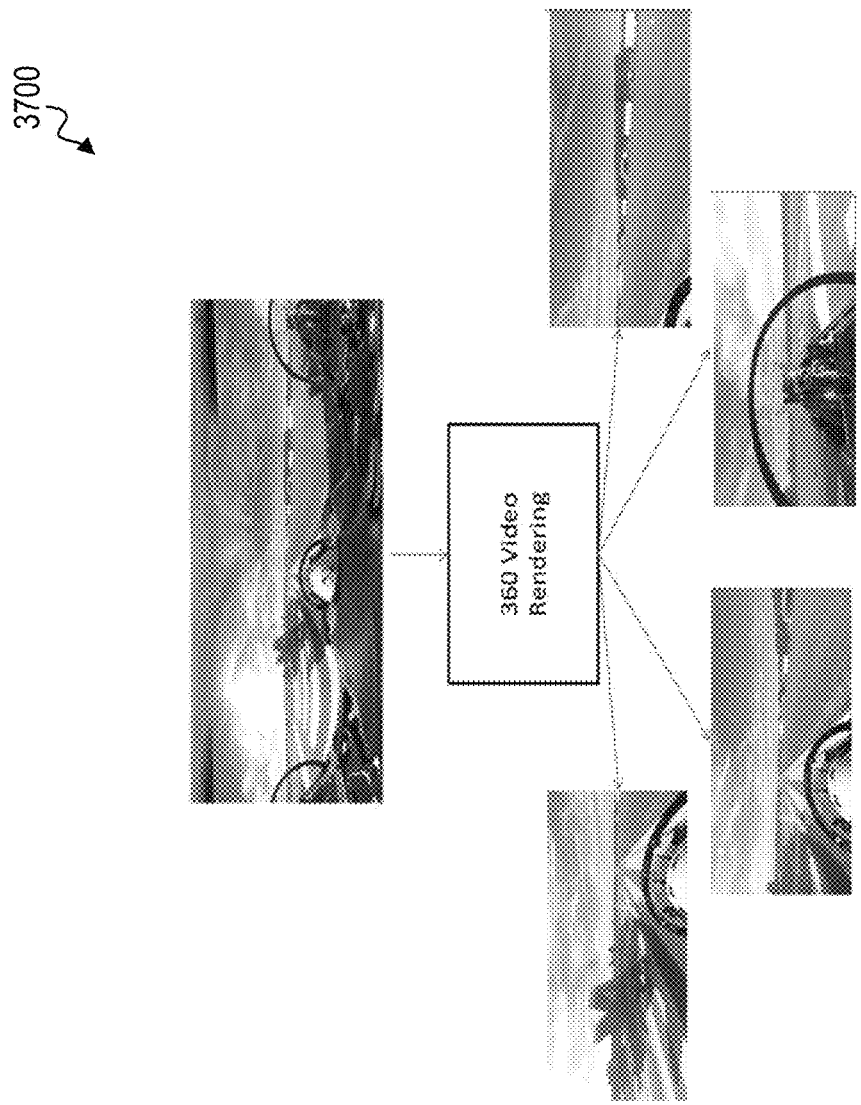
FIG. 37 conceptually illustrates an example of 360 degree video rendering.

FIG. 37 conceptually illustrates an example of 360 degree video rendering 3700. At the moment, most 360 degree video content is viewed on computers or smartphones from streaming media services (YouTube, Facebook, etc. . . . ). However, it is expected that 360° video will be broadcast on standard cable/satellite networks in the near future. Sporting events, travel shows, extreme sports, and many other types of programs may be shown in 360° video to raise interest and engagement.

While a 360 degree video application can be a fun way to be immersed in a scene, for longer programs, the need to manually control the view at all times to track the main objects of interest can often grow tiresome. For example, it can be fun to look around once and awhile during a sporting event, but for the majority of the game, the user just wants to watch the center of action.

For this purpose, content providers may provide a "suggested view". This suggested view would be a specific set of viewing angles for each frame to provide the user with a recommended experience. In the event that the user isn't particularly interested in controlling the view themselves at any given point in time, they can simply watch the suggested view and experience the view recommended by the content provider.

The concept of recording a user's view at any given time can be expressed as three different angles in 3D space. These are the so-called Euler angles. In flight dynamics, these three angles are referred to as "yaw", "pitch", and "roll". Referring back to FIG. 10, as a means to suggest a view for the viewer, the "yaw", "pitch", and "roll" angles can be encoded with each frame. The decoder (e.g., 3508) can extract and use these suggested view angles any time the user is not interested in controlling the view themselves.

This view angle data may be stored in any number of ways. For example, angles may be inserted into the video stream as picture user data (AVC/HEVC supplemental enhancement info message—SEI messages), or carried as a separate stream of data within the video sequence (different MPEG-2 TS PID, or MP4 data stream).

Depending on how the view angles are stored, a corresponding view angle extraction mechanism would be required. For example, if the angles are stored in the video bitstream as SEI messages, the video decoder may extract view angles. If they are stored in a separated MPEG-2 TS PID, the demux may extract this information and send it to the render process. The 360 degree video rendering system (e.g., 3500) would have the ability to switch between the suggested view and the manually selected user view at any time.

Figure 38:
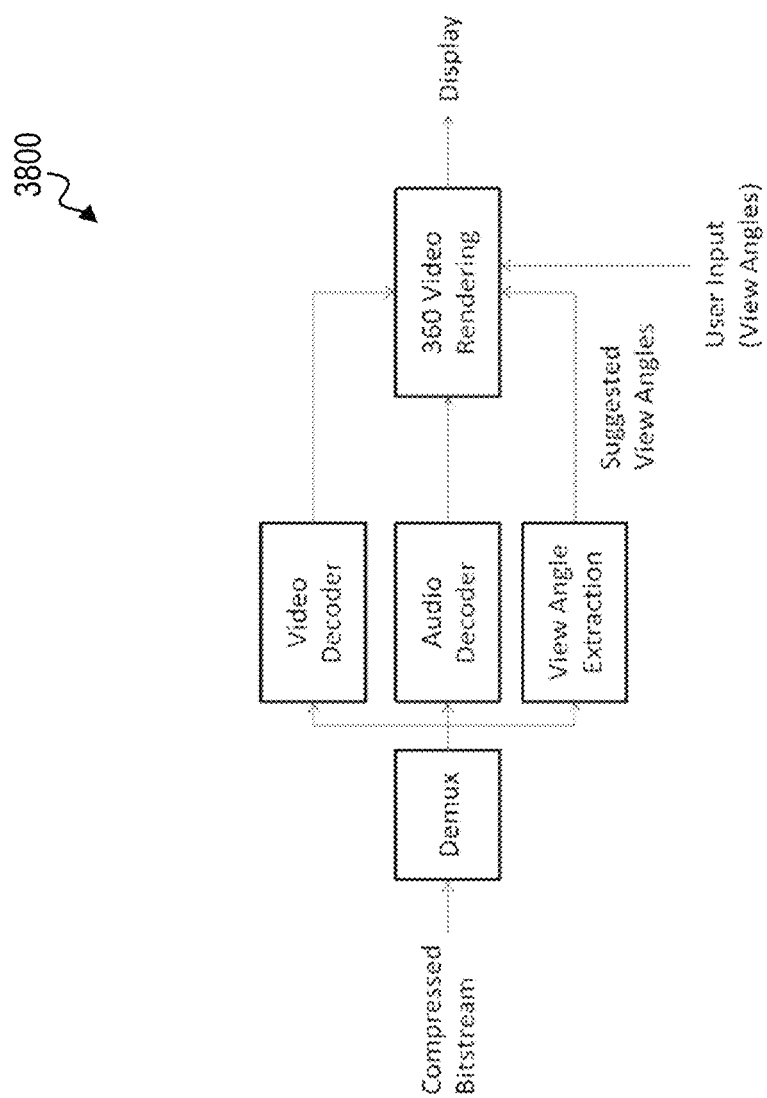
FIG. 38 illustrates a schematic diagram of extraction and rendering with suggested view angles.

FIG. 38 illustrates a schematic diagram of extraction and rendering with suggested view angles. Switching between the suggested view and the manual view may be as simple as pushing a button to enter/exit this mode. In other aspects, the switching may be performed automatically. For example, if the user manually moves the view (with the mouse, remote control, hand gestures, headset, etc. . . . ) the view is updated to follow the user's request. If the user stopped making manual adjustments for a set amount of time, the view may drift back to the suggested view.

Multiple suggested views may be provided if appropriate. For example, for a football game, one view may track the quarterback, and other views track the wide-receivers. In other aspects, different views may be used to track specific cars during a NASCAR racing event. The user may select from among these suggested views to customize their experience without needing to fully control the view the whole time.

More than one suggested view may be rendered at a time. Using the football example above, the user may have a split screen with 4 views at a time, one for the quarterback, one for wide receivers, while another they control manually, etc.

If a suggested view is not available or appropriate for the entire scene, hints may be given to try to ensure the viewer does not miss important action. A hint view may be provided at the start of a new scene. The view may then be shifted to look at the hint angle in order to center the view on the main action. In other aspects, if we wanted to be less direct, something like on-screen graphic arrows may be used to indicate that the user may be facing the wrong way and missing out on something interesting.

Most 360 degree view applications don't allow the user to adjust the "roll" angle. The camera is typically fixed in a vertical orientation. The view can be rotated up/down, and left/right, but not turned sideways, etc. In this respect, a system that suggested only two view angles would also be sufficient for most uses.

Note that not all "360 video" streams actually cover the full 360°×180° field of vision. Some sequences may only allow viewing in the front direction (180°×180°). In some examples, some may have limitations about how high up or down you can look. All of these would be covered under the same concepts discussed here.

In one or more implementations, system message of default (recommended) viewing direction (i.e. viewing direction angles), the FOV angles, the rendering picture size may be signaled along with the 360 degree video content.

In one or more implementations, a 360 degree video playback system supports a scanning mode in which the viewing angles may change automatically every N frames to help viewers to select the desirable viewing direction. For example, in the automatic scanning mode the vertical viewing angle $\gamma$ and the viewing angle $\epsilon$ along z-axis are fixed to 0 degree first, the horizontal angle changes one degree every N frames; after the viewer selects the horizontal viewing angle $\theta$, the horizontal viewing angle is fixed to the selected one, and the viewing angle $\epsilon$ along z-axis is still fixed to 0 degree, the vertical viewing angle starts to change one degree every N frames until the viewer chooses the vertical viewing angle $\gamma$; after both the horizontal and vertical viewing angles $\theta$ and $\gamma$ are chosen, both angles are fixed to the chosen ones, the viewing angle $\epsilon$ along z-axis starts to change one degree every N frames until the viewer chooses the viewing angle $\epsilon$. The scanning mode may scan different viewing angles in parallel in some implementations, or may scan the different viewing angles sequentially in other implementations. In some aspects, the viewing angles may be limited (or restricted) by a user profile or a type of user (e.g., child, adult). In this example, 360 degree video content managed by parent control settings may be limited to a subset of viewing angles as indicated by the settings. In some aspects, the 360 degree video bitstream includes metadata that indicates the frame trails for the scanning mode.

In one or more implementations, multi-view layout format may also preserve the viewpoints of interests by indicating the importance of the view in the sequences. Views can be assigned with different view fidelity (resolution, frame-rate, bit-rate, size of FOV angles, etc.). The view fidelity information should be signaled with a system message.

Figure 39:
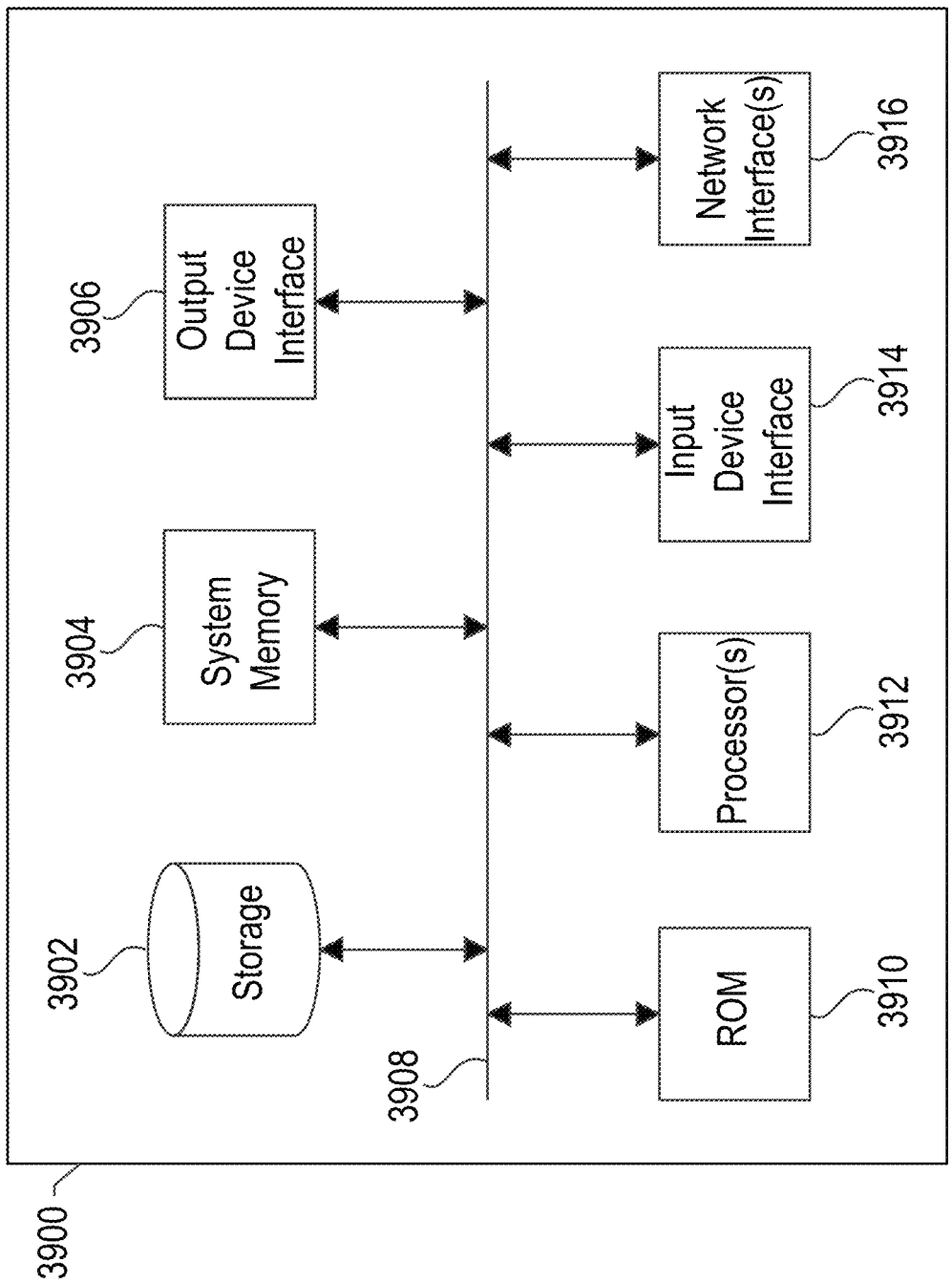
FIG. 39 conceptually illustrates an electronic system with which one or more implementations of the subject technology may be implemented.

FIG. 39 conceptually illustrates an electronic system 3900 with which one or more implementations of the subject technology may be implemented. The electronic system 3900, for example, can be a network device, a media converter, a desktop computer, a laptop computer, a tablet computer, a server, a switch, a router, a base station, a receiver, a phone, or generally any electronic device that transmits signals over a network. Such an electronic system 3900 includes various types of computer readable media and interfaces for various other types of computer readable media. In one or more implementations, the electronic system 3900 may be, or may include, one or more of the devices 102, 104, 106, 108, 110, the 360 degree video projection format conversion device, and/or the 360 degree video playback device. The electronic system 3900 includes a bus 3908, one or more processing unit(s) 3912, a system memory 3904, a read-only memory (ROM) 3910, a permanent storage device 3902, an input device interface 3914, an output device interface 3906, and a network interface 3916, or subsets and variations thereof.

The bus 3908 collectively represents all system, peripheral, and chipset buses that communicatively connect the numerous internal devices of the electronic system 3900. In one or more implementations, the bus 3908 communicatively connects the one or more processing unit(s) 3912 with the ROM 3910, the system memory 3904, and the permanent storage device 3902. From these various memory units, the one or more processing unit(s) 3912 retrieves instructions to execute and data to process in order to execute the processes of the subject disclosure. The one or more processing unit(s) 3912 can be a single processor or a multi-core processor in different implementations.

The ROM 3910 stores static data and instructions that are needed by the one or more processing unit(s) 3912 and other modules of the electronic system. The permanent storage device 3902, on the other hand, is a read-and-write memory device. The permanent storage device 3902 is a non-volatile memory unit that stores instructions and data even when the electronic system 3900 is off. One or more implementations of the subject disclosure use a mass-storage device (such as a magnetic or optical disk and its corresponding disk drive) as the permanent storage device 3902.

Other implementations use a removable storage device (such as a floppy disk, flash drive, and its corresponding disk drive) as the permanent storage device 3902. Like the permanent storage device 3902, the system memory 3904 is a read-and-write memory device. However, unlike the permanent storage device 3902, the system memory 3904 is a volatile read-and-write memory, such as random access memory. System memory 3904 stores any of the instructions and data that the one or more processing unit(s) 3912 needs at runtime. In one or more implementations, the processes of the subject disclosure are stored in the system memory 3904, the permanent storage device 3902, and/or the ROM 3910. From these various memory units, the one or more processing unit(s) 3912 retrieves instructions to execute and data to process in order to execute the processes of one or more implementations.

The bus 3908 also connects to the input device interface 3914 and the output device interface 3906. The input device interface 3914 enables a user to communicate information and select commands to the electronic system. Input devices used with the input device interface 3914 include, for example, alphanumeric keyboards and pointing devices (also called "cursor control devices"). The output device interface 3906 enables, for example, the display of images generated by the electronic system 3900. Output devices used with the output device interface 3906 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 39, the bus 3908 also couples the electronic system 3900 to one or more networks (not shown) through one or more network interfaces 3916. In this manner, the computer can be a part of one or more network of computers (such as a local area network ("LAN"), a wide area network ("WAN"), or an Intranet, or a network of networks, such as the Internet. Any or all components of the electronic system 3900 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system comprising:
a video capture device configured to capture 360 degree video;
a stitching device configured to:
stitch the captured 360 degree video using an intermediate coordinate system between an input picture coordinate system and a 360 degree video capture coordinate system, wherein the intermediate coordinate system is transformed from the video capture coordinate system based on rotation angles along axes of the video capture coordinate system; and
an encoding device configured to:
encode the stitched 360 degree video into a 360 degree video bitstream; and
prepare, for transmission and storage, the 360 degree video bitstream for playback.

2. The system of claim 1, wherein the stitching device is configured to:
compute a normalized projection plane size using field of view angles;
compute a coordinate in a normalized rendering coordinate system from an output rendering picture coordinate system using the normalized projection plane size;
map the coordinate to a viewing coordinate system using the normalized projection plane size;
convert the coordinate from the viewing coordinate system to a capture coordinate system using a coordinate transform matrix;
convert the coordinate from the capture coordinate system to the intermediate coordinate system using the coordinate transform matrix;
convert the coordinate to a normalized projection system from the intermediate coordinate system; and
map the coordinate from the normalized projection system to the input picture coordinate system.

3. The system of claim 2, wherein the coordinate transform matrix is precomputed using viewing direction angles and the rotation angles.

4. The system of claim 3, wherein the rotation angles are signaled in a message included in the 360 degree video bitstream.

5. The system of claim 1, wherein the encoding device is further configured to:
encode the stitched 360 degree video into a plurality of view sequences, each of the plurality of view sequences corresponding to a different view region of the 360 degree video bitstream.

6. The system of claim 5, wherein at least two of the plurality of view sequences are encoded with a different projection layout format.

7. The system of claim 5, the system further comprising:
   a rendering device configured to receive the plurality of view sequences as input and render each of the plurality of view sequences using a rendering control input.

8. The system of claim 7, wherein the rendering device is further configured to select at least one of the plurality of view sequences for rendering and exclude at least one of the plurality of view sequences from the rendering.

9. The system of claim 1, wherein the encoding device is further configured to include unrestricted motion compensation signaling in the 360 degree video bitstream to indicate one or more pixels of a view that are beyond a picture boundary of the view.

10. The system of claim 9, wherein the unrestricted motion compensation signaling is located in a sequence header or a picture header of the 360 degree video bitstream.

11. The system of claim 1, wherein a relationship between the intermediate coordinate system and the input picture coordinate system is defined by counter clockwise rotation angles along one or more axis.

12. The system of claim 1, wherein the stitching device is further configured to:
   convert an input projection format of the 360 degree video bitstream to an output projection format that differs from the input projection format.

\* \* \* \* \*